(12) United States Patent
Benassi

(10) Patent No.: US 12,367,016 B2
(45) Date of Patent: Jul. 22, 2025

(54) OBJECT-ORIENTED INFRASTRUCTURE-AS-CODE PLATFORM (OOIACP)

(71) Applicant: CenturyLink Intellectual Property LLC, Broomfield, CO (US)

(72) Inventor: William R. Benassi, Elk River, MN (US)

(73) Assignee: CenturyLink Intellectual Property LLC, Denver, CO (US)

( * ) Notice: Subject to any disclaimer, the term of this patent is extended or adjusted under 35 U.S.C. 154(b) by 397 days.

(21) Appl. No.: 18/092,692

(22) Filed: Jan. 3, 2023

(65) Prior Publication Data

US 2023/0153076 A1    May 18, 2023

Related U.S. Application Data

(63) Continuation-in-part of application No. 17/476,708, filed on Sep. 16, 2021, now Pat. No. 11,593,073.

(Continued)

(51) Int. Cl.
*G06F 8/30* (2018.01)
*G06F 8/51* (2018.01)

(52) U.S. Cl.
CPC .............. *G06F 8/315* (2013.01); *G06F 8/316* (2013.01); *G06F 8/51* (2013.01)

(58) Field of Classification Search
CPC .................................. G06F 8/316; G06F 8/51

(Continued)

(56) References Cited

U.S. PATENT DOCUMENTS 5,960,438 A    9/1999 Chang
7,349,888 B1 *  3/2008 Heidenreich ............ G06N 5/02
                                              706/45

(Continued)

FOREIGN PATENT DOCUMENTS

EP            3000040            3/2016

OTHER PUBLICATIONS

International Preliminary Report on Patentability, dated Jul. 13, 2023, Int'l Appl. No. PCT/US2021/065514, Int'l Filing Date Dec. 29, 2021; 12 pgs.

(Continued)

*Primary Examiner* — Bradford F Wheaton

(57) ABSTRACT

Novel tools and techniques are provided for implementing object-oriented infrastructure-as-code platform ("OOI-ACP") and its functionalities. In various embodiments, when a request to process one or more lifecycle events is received, a computing system may perform: selecting and scaling across a plurality of OOIACP instances; and causing the selected plurality of OOIACP instances to process the one or more lifecycle events. In some cases, each OOIACP instance may include an infrastructure-as-code ("IAC") command line that instantiates component infrastructure among a plurality of component infrastructure to process at least one lifecycle event among the one or more lifecycle events concurrently and independently of other OOIACP instances. In some instances, the first plurality of OOIACP instances may be located within an environment in which the plurality of component infrastructure is located.

19 Claims, 22 Drawing Sheets

Related U.S. Application Data

(60) Provisional application No. 63/138,919, filed on Jan. 19, 2021.

(58) Field of Classification Search
USPC .......................................................... 717/108
See application file for complete search history.

(56) References Cited

U.S. PATENT DOCUMENTS

| | | |
|---|---|---|
| 10,261,945 B1 | 4/2019 | Blackwell |
| 10,367,705 B1 | 7/2019 | Rodriguez |
| 10,938,594 B1 | 3/2021 | Jain |
| 2008/0120602 A1 | 5/2008 | Comstock |
| 2013/0215069 A1 | 8/2013 | Lee |
| 2015/0248301 A1* | 9/2015 | Shani ..................... G06F 8/54 717/163 |
| 2016/0182626 A1 | 6/2016 | Endahl |
| 2016/0217009 A1 | 7/2016 | Farhan |
| 2017/0353531 A1 | 12/2017 | Conn |
| 2018/0288135 A1 | 10/2018 | Narayan |
| 2020/0012480 A1* | 1/2020 | Rizo ..................... G06F 21/577 |
| 2020/0076715 A1 | 3/2020 | Kondapalli et al. |
| 2020/0280511 A1 | 9/2020 | Gapin |
| 2021/0019400 A1* | 1/2021 | Elgressy ................ G06F 9/5072 |
| 2021/0174280 A1* | 6/2021 | Ratnapuri ........ G06Q 10/06315 |
| 2021/0382727 A1 | 12/2021 | Vigil |
| 2022/0229637 A1 | 7/2022 | Benassi |
| 2022/0358055 A1 | 11/2022 | Dai |

OTHER PUBLICATIONS

European Examination Report, dated May 7, 2024, Application No. 21856914.3, filed Dec. 29, 2021, 6 pgs.

European Examination Report, dated Feb. 28, 2025, Application No. 21856914.3, filed Dec. 29, 2021; 5 pgs.

International Search Report and Written Opinion of the International Searching Authority, dated Jun. 2, 2022, Int'l Appl. No. PCT/US21/065514, Int'l Filing Date Dec. 29, 2021, 16 pgs.

* cited by examiner

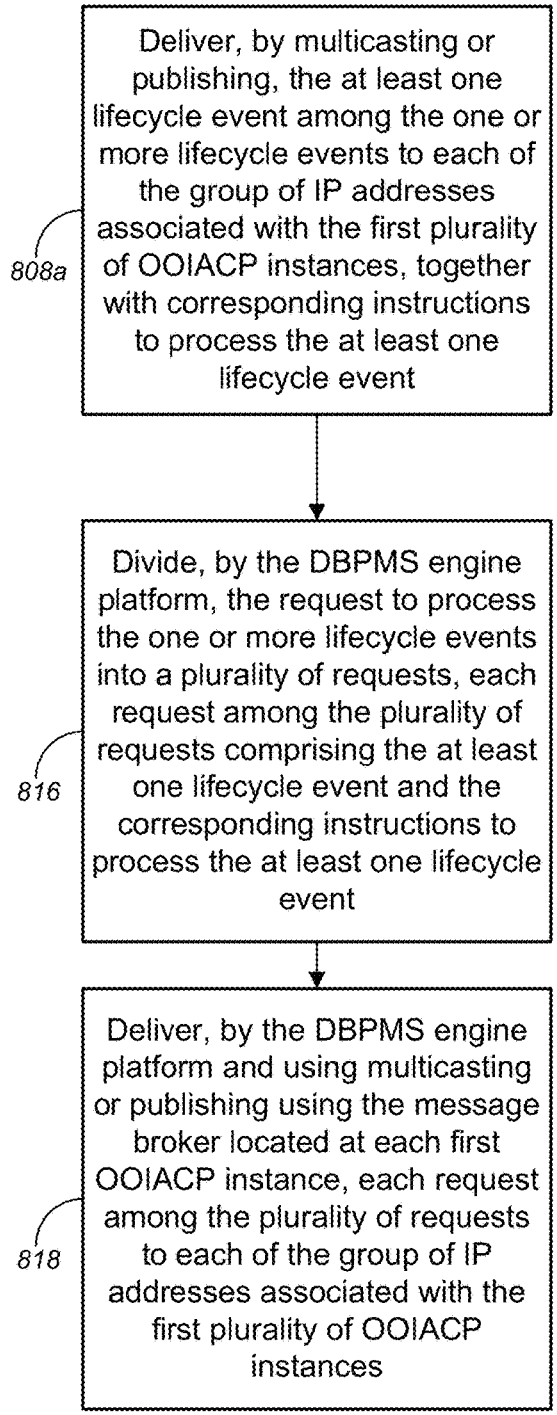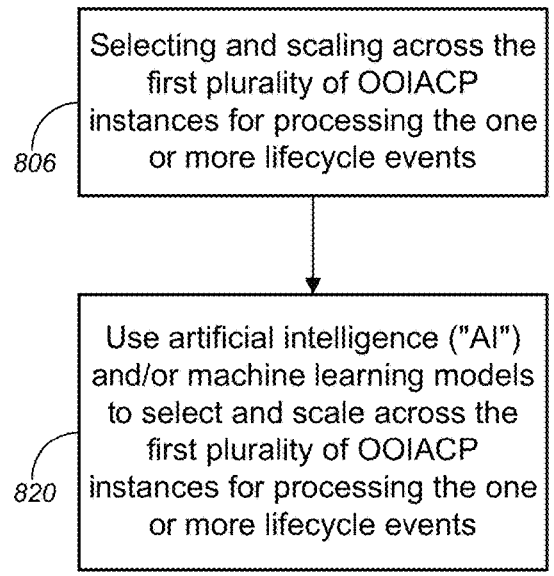
Fig. 8C
Fig. 8D

OBJECT-ORIENTED INFRASTRUCTURE-AS-CODE PLATFORM (OOIACP)

CROSS-REFERENCES TO RELATED APPLICATIONS

This application is a continuation-in-part application of U.S. patent application Ser. No. 17/476,708 (the "'708 Application"), filed Sep. 16, 2021, by William R. Benassi, entitled, "Object-Oriented Infrastructure-as-Code Platform (OOIACP)," which claims priority to U.S. Patent Application Ser. No. 63/138,919 (the "'919 Application"), filed Jan. 19, 2021, by William R. Benassi, entitled, "Object-Oriented Infrastructure-as-Code Platform (OOIACP)," the disclosure of each of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing infrastructure-as-code ("IAC") functionalities, and, more particularly, to methods, systems, and apparatuses for implementing object-oriented infrastructure-as-code platform ("OOIACP") and its functionalities.

BACKGROUND

Conventional infrastructure-as-code ("IAC") software tools (such as Terraform©, or the like) enable provisioning of web services or functions. Such conventional IAC systems, however, are single threaded process systems that are not scalable. Accordingly, such conventional IAC systems, although having some desirable characteristics, are, by themselves, inadequate for use in implementing Internet of Components ("IoC") functionalities.

It is with respect to this general technical environment to which aspects of the present disclosure are directed.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components. For denoting a plurality of components, the suffixes "a" through "n," where n denotes any suitable integer number, and may be either the same or different from the suffix "n" for other components in the same or different figures. For example, for component #1 105a-105n, the integer value of n in 105n may be the same or different from the integer value of n in 110n for component #2 110a-110n, and so on.

FIGS. 8A-8E are flow diagrams illustrating another method for implementing OOIACP and its functionalities, in accordance with various embodiments.

DETAILED DESCRIPTION OF CERTAIN EMBODIMENTS

Overview

Figure 1:
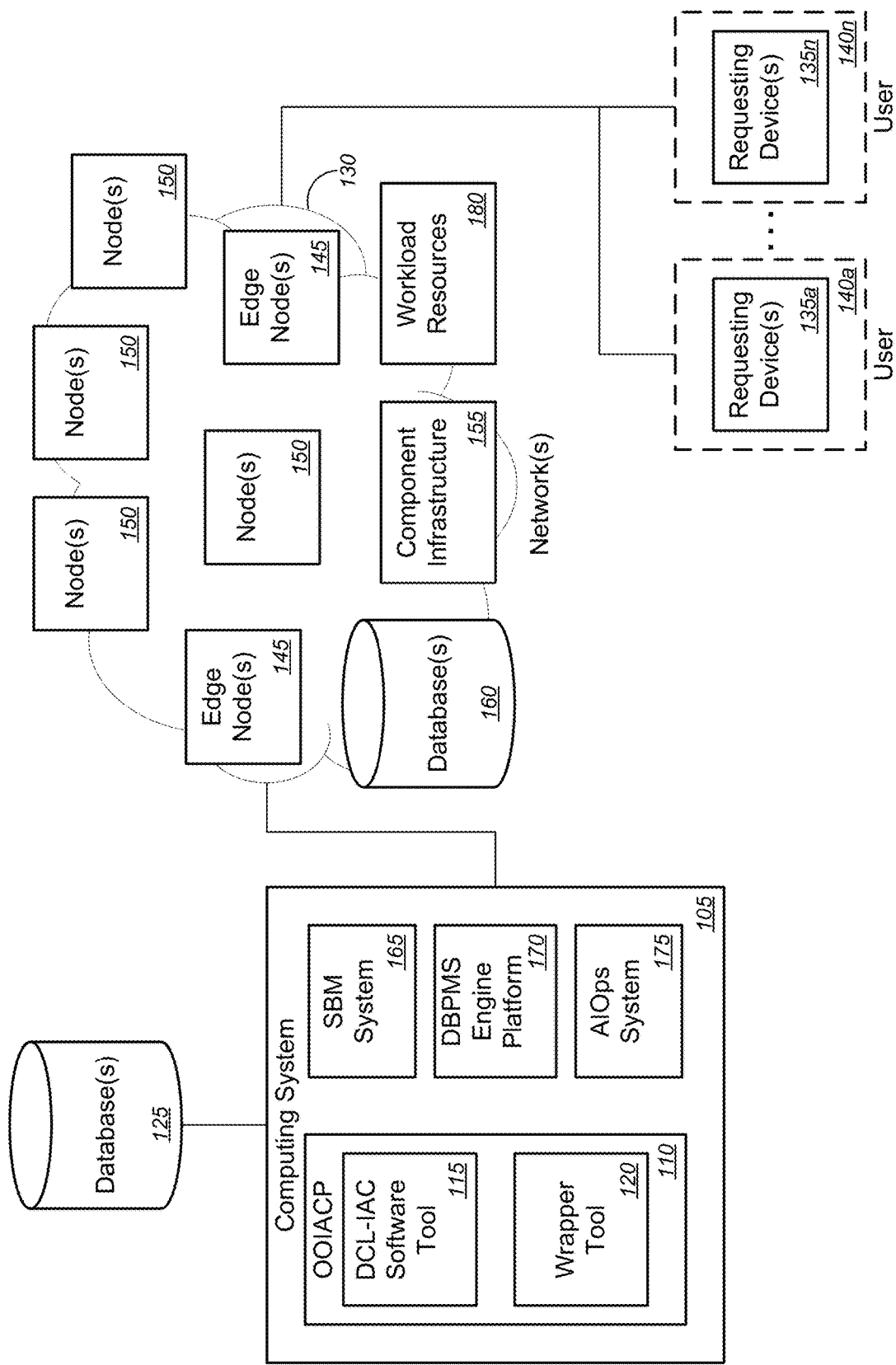
FIG. 1 is a schematic diagram illustrating a system for implementing object-oriented infrastructure-as-code platform ("OOIACP") and its functionalities, in accordance with various embodiments.

Various embodiments provide tools and techniques for implementing infrastructure-as-code ("IAC") functionalities, and, more particularly, to methods, systems, and apparatuses for implementing object-oriented infrastructure-as-code platform ("OOIACP") and its functionalities.

In various embodiments, a computing system may receive, from a requesting device associated with a user, a request to perform a web service function. In some cases, the request to perform the web service function may include, without limitation, one of an operational call or a lifecycle call, or the like. An operational call may refer to a call pertaining to operation of the system (e.g., determining how much RAM is available, determining what systems are being utilized, etc.). A lifecycle call may refer to a call pertaining to standing up, tearing down, and/or updating an instance of an object (e.g., provisioning nodes, provisioning VMs, provisioning databases, etc.).

An object-oriented infrastructure-as-code platform ("OOIACP")—which may include, but is not limited to, a declarative configuration language ("DCL")-based infrastructure-as-code ("IAC") software tool (such as Terraform®, Ansible®, Puppet®, SaltStack®, or the like) and a wrapper tool (e.g., Terragrunt, or the like)—may set one or more semaphores that are used to control access to common resources by multiple processes, based at least in part on the received request; may evaluate one or more system constraints, based at least in part on the received request and based at least in part on the set one or more semaphores; and may use a before-hook functionality to parse the received request to convert the received request into a DCL request and to initiate a call to the IAC software tool of the OOIACP using the DCL request. Here, a semaphore may refer to a variable that is used to control access to a common resource and/or to achieve process synchronization in a multi-process environment. A system constraint may include, without limitation, role based access control ("RBAC")-based constraints, policy-based constraints, and/or the like.

The OOIACP may use a run command to: establish a class hierarchy of objects based on the received request, each class and subclass within the class hierarchy having one or more predefined class behaviors, wherein each subclass may inherit class behaviors of classes to which it belongs and class behaviors of any intermediate subclasses, wherein each class behavior may include, but is not limited to, a set of procedures associated with the request and with an object or instance of a corresponding class, the set of procedures configured to operate on said object or instance of the corresponding class; and perform the requested web service function based on the initiated call to the IAC software tool of the OOIACP using the DCL request and based at least in part on the one or more system constraints, by identifying one or more classes within the class hierarchy associated with the requested web service function, initiating the set of procedures in each of the identified one or more classes, and returning results of the DCL request based on at least one of the initiated set of procedures or the identified one or more classes. The OOIACP may use an after-hook functionality to convert results of the DCL request into a non-DCL result and to send the non-DCL result to the requesting device.

In the various embodiments, by using the wrapper tool (e.g., Terragrunt, or the like) to fill in the gap of the DCL-based IAC software tool (e.g., Terraform®, Ansible®, Puppet®, SaltStack®, or the like), the single threaded limitations of the IAC software tool can be circumvented through the use of object-oriented programming ("OOP") features (e.g., Abstraction, Data Hiding, Inheritance, Polymorphism, etc.). In particular, with the OOIACP, a two-tiered, modular, linked-list standard platform may be used to form a Class. The DCL-based IAC software tool provides object structure and data from its existing intended features, while the wrapper tool provides algorithm and sequence fashioned from its intended features. For example, the DCL-based IAC software tool's run command may be used to fold in any algorithm turning the mainly declarative language of the DCL-based IAC software tool to include algorithm, and thus OOIACP responsibility and behaviors. The wrapper tool before hook may be used to consume the method event, to parse the call, and to decide how to arrange and call the declarative IAC software tool, and then does so, while the wrapper tool after hook may be used to take the results of the declarative call and to massage it back into something that the method can return in the OOIACP interface. As a result, an Internet of Components ("IoC") factory may be achieved that provides an out-of-box API implementation of patterns and underlying automation (in some cases, dynamically constructing single image of base objects within a class hierarchy, or the like), to lifecycle and operate IAC workloads and/or their component infrastructure, that is capable of lifecycling at massive global scale (in some cases, by providing each node with its own IoC factory compared with a single factory in conventional systems, or the like), and that is tool agnostic (in some cases, with externalized dependencies, including the use of multiple dependency trees with systems external to the DCL-based IAC software tool, or the like), or the like.

In some aspects, a computing system may receive, from a requesting device, a request to perform a function. In some cases, the request to perform the function may comprise a request to process one or more lifecycle events. When the request to process the one or more lifecycle events is received, the computing system may perform a first set of tasks comprising: selecting and scaling across a first plurality of OOIACP instances for processing the one or more lifecycle events; and causing the selected first plurality of OOIACP instances to process the one or more lifecycle events. In some cases, each first OOIACP instance among the first plurality of OOIACP instances may comprise an infrastructure-as-code ("IAC") command line that instantiates component infrastructure among a plurality of component infrastructure to process at least one lifecycle event among the one or more lifecycle events concurrently and independently of other OOIACP instances among the first plurality of OOIACP instances. In some instances, the first plurality of OOIACP instances may be located within an environment in which the plurality of component infrastructure is located.

According to some embodiments, the request to perform the function may further comprise a request to process one or more workload events. In such cases, when the request to process one or more workload events is received, a global load balancer of the computing system may perform a second set of tasks comprising: selecting and scaling across a second plurality of OOIACP instances for processing the one or more workload events; and causing the selected second plurality of OOIACP instances to process the one or more workload events. In some instances, each second OOIACP instance among the second plurality of OOIACP instances may instantiate workload resources among a plurality of workload resources to process at least one workload event among the one or more workload events concurrently and independently of other OOIACP instances among the second plurality of OOIACP instances. In some cases, the second plurality of OOIACP instances may be located within the environment in which the plurality of component infrastructure. In some examples, the plurality of workload resources may also be located within said environment.

In some embodiments, the OOIACP may comprise a declarative configuration language ("DCL")-based infrastructure-as-code ("IAC") software tool that provides structure and data functionalities and a wrapper tool that provides algorithm and sequence functionalities to the IAC software tool to convert the IAC software tool into an object-oriented programming ("OOP")-based IAC system. In some instances, the first set of tasks may be performed using at least one of a subject-based multicast ("SBM") system, a distributed business process management system ("DBPMS") engine platform, or an artificial intelligence for information technology operations ("AIOps") system, and/or the like.

According to some embodiments, the context_in file may be customizable for each lifecycle event. In some examples, the subsequent requests may be dynamically changed to perform one or more other functions by changing the one or more custom environment variables contained in the context_in file for each request.

In some embodiments, the request to perform the function may comprise a semantic abstraction comprising class hierarchies that define class relationships among two or more of the one or more lifecycle events, the first plurality of OOIACP instances, or corresponding component infrastructure, and/or the like. In some examples, performing the first set of tasks may further comprise lifecycling one or more classes defined by the semantic abstraction in the request, by lifecycling component infrastructure corresponding to at least one of the one or more classes, one or more related classes of the one or more classes, or one or more subclasses of the one or more classes, and/or the like, based on the class hierarchies. In some instances, the class hierarchies may comprise at least one of an Is-A resource class hierarchy that defines class relationships in terms of inheritance among one or more classes or a Has-A resource class hierarchy that defines properties or compositions of the one or more classes, and/or the like.

According to some embodiments, the request to perform the function may comprise a logical abstraction comprising at least one logical structure that each defines one or more logical relationships among two or more of the one or more lifecycle events, the first plurality of OOIACP instances, or corresponding component infrastructure, and/or the like. In some examples, performing the first set of tasks may further comprise lifecycling the at least one logical structure defined by the logical abstraction in the request, by lifecycling component infrastructure based on the one or more logical relationships defined by the at least one logical structure. In some cases, the logical abstraction may comprise a business process model and notation ("BPMN")-based logical structure.

In various embodiments, coupling OOIACP with multicast—in some cases, tied with a logical subscription making messaging ubiquitous with scale of the network itself—may further lend itself to massive scale. In some examples, the combination of SBM, DBPMS, and OOIACP allows processing of workload and/or lifecycle event workflows to be achieved at massive scale (i.e., at a massive scale of dozens, scores, hundreds, thousands, millions, or more OOIACP instances running independently and concurrently), thereby achieving O(1).

These and other aspects of the object-oriented infrastructure-as-code platform ("OOIACP") and its functionalities are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, web service provisioning technology, infrastructure-as-code ("IAC") technology, Internet of Components ("IoC") technology, and/or the like. In other aspects, certain embodiments, can improve the functioning of user equipment or systems themselves (e.g., web service provisioning systems, IAC systems, IoC systems, etc.), for example, by receiving, with a computing system and from a requesting device, a request to perform a web service function; setting, by the OOIACP, one or more semaphores that are used to control access to common resources by multiple processes, based at least in part on the received request; evaluating, by the OOIACP, one or more system constraints, based at least in part on the received request and based at least in part on the set one or more semaphores; using, by the OOIACP, a before-hook functionality to parse the received request to convert the received request into a DCL request and to initiate a call to the IAC software tool of the OOIACP using the DCL request; using, by the OOIACP, a run command to: establish a class hierarchy of objects based on the received request, each class and subclass within the class hierarchy having one or more predefined class behaviors, wherein each subclass inherits class behaviors of classes to which it belongs and class behaviors of any intermediate subclasses, wherein each class behavior comprises a set of procedures associated with the request and with an object or instance of a corresponding class, the set of procedures configured to operate on said object or instance of the corresponding class; and perform the requested web service function based on the initiated call to the IAC software tool of the OOIACP using the DCL request and based at least in part on the one or more system constraints, by identifying one or more classes within the class hierarchy associated with the requested web service function, initiating the set of procedures in each of the identified one or more classes, and returning results of the DCL request based on at least one of the initiated set of procedures or the identified one or more classes; and using, by the OOIACP, an after-hook functionality to convert results of the DCL request into a non-DCL result and to send the non-DCL result to the requesting device; and/or the like.

In particular, to the extent any abstract concepts are present in the various embodiments, those concepts can be implemented as described herein by devices, software, systems, and methods that involve specific novel functionality (e.g., steps or operations), such as, by using the wrapper tool (e.g., Terragrunt, or the like) to fill in the gap of the DCL-based IAC software tool (e.g., Terraform®, Ansible®, Puppet®, SaltStack®, or the like), the single threaded limitations of the IAC software tool can be circumvented through the use of object-oriented programming ("OOP") features (e.g., Abstraction, Data Hiding, Inheritance, Polymorphism, etc.), where the DCL-based IAC software tool provides object structure and data from its existing intended features, while the wrapper tool provides algorithm and sequence fashioned from its intended features., and/or the like, to name a few examples, that extend beyond mere conventional computer processing operations. These functionalities can produce tangible results outside of the implementing computer system, including, merely by way of example, optimized and dynamic provisioning of web service functions or the like that is capable of massive global scale and parallelism, and/or the like, at least some of which may be observed or measured by customers and/or service providers.

In an aspect, a method might comprise receiving, with a computing system and from a requesting device, a request to perform a web service function, wherein the computing system comprises an object-oriented infrastructure-as-code platform ("OOIACP"), wherein the OOIACP comprises a declarative configuration language ("DCL")-based infrastructure-as-code ("IAC") software tool that provides structure and data functionalities and a wrapper tool that provides algorithm and sequence functionalities to the IAC software tool to convert the IAC software tool into an object-oriented programming ("OOP")-based IAC system, wherein the request to perform the web service function comprises one of an operational call or a lifecycle call. The method may further comprise setting, by the OOIACP, one or more semaphores that are used to control access to common resources by multiple processes, based at least in part on the received request; evaluating, by the OOIACP, one or more system constraints, based at least in part on the received request and based at least in part on the set one or more semaphores; and using, by the OOIACP, a before-hook functionality to parse the received request to convert the received request into a DCL request and to initiate a call to the IAC software tool of the OOIACP using the DCL request.

The method may also comprise using, by the OOIACP, a run command to: establish a class hierarchy of objects based on the received request, each class and subclass within the class hierarchy having one or more predefined class behaviors, wherein each subclass inherits class behaviors of classes to which it belongs and class behaviors of any intermediate subclasses, wherein each class behavior comprises a set of procedures associated with the request and with an object or instance of a corresponding class, the set of procedures configured to operate on said object or instance of the corresponding class; and perform the requested web service function based on the initiated call to the IAC software tool of the OOIACP using the DCL request and based at least in part on the one or more system constraints, by identifying one or more classes within the class hierarchy associated with the requested web service function, initiating the set of procedures in each of the identified one or more classes, and returning results of the DCL request based on at least one of the initiated set of procedures or the identified one or more classes. The method may further comprise using, by the OOIACP, an after-hook functionality to convert results of the DCL request into a non-DCL result and to send the non-DCL result to the requesting device.

In another aspect, a method may comprise receiving, with a computing system and from a requesting device, a request to perform a function, wherein the computing system comprises an object-oriented infrastructure-as-code platform ("OOIACP"), wherein the OOIACP comprises a declarative configuration language ("DCL")-based infrastructure-as-code ("IAC") software tool that provides structure and data functionalities and a wrapper tool that provides algorithm and sequence functionalities to the IAC software tool to convert the IAC software tool into an object-oriented programming ("OOP")-based IAC system.

The method may further comprise using, by the OOIACP, a run command to perform the requested function, by: identifying one or more classes within a class hierarchy associated with the requested function, wherein each class and subclass within the class hierarchy has one or more predefined class behaviors, wherein each subclass inherits class behaviors of classes to which it belongs and class behaviors of any intermediate subclasses, wherein each class behavior comprises a set of procedures associated with the request and with an object or instance of a corresponding class, the set of procedures configured to operate on said object or instance of the corresponding class; and initiating a set of procedures in each of the identified one or more classes.

In some embodiments, the request to perform the function may comprise a request to perform a web service function. Alternatively, or additionally, the request to perform the function may comprise one of an operational call or a lifecycle call. Alternatively, or additionally, the request to perform the function may comprise one of an application programming interface ("API") call or a command line interface ("CLI") call.

According to some embodiments, the method may further comprise setting, by the OOIACP, one or more semaphores that are used to control access to common resources by multiple processes, based at least in part on the received request; and evaluating, by the OOIACP, one or more system constraints, based at least in part on the received request and based at least in part on the set one or more semaphores. In such cases, performing the requested function may be further based at least in part on the one or more system constraints. In some instances, using the run command may further comprise establishing the class hierarchy of objects based on the received request.

In some embodiments, the method may further comprise using, by the OOIACP, a before-hook functionality to parse the received request to convert the received request into a DCL request and to initiate a call to the IAC software tool of the OOIACP using the DCL request. In such cases, performing the requested function may comprise performing the requested function based on the call to the IAC software tool of the OOIACP using the DCL request, and returning results of the DCL request based on at least one of the initiated set of procedures or the identified one or more classes. In some cases, the method may further comprise using, by the OOIACP, an after-hook functionality to convert results of the DCL request into a non-DCL result and to send the non-DCL result to the requesting device.

According to some embodiments, the method may further comprise receiving, with the OOIACP, a request to update or replace at least one behavior in at least one class among the identified one or more classes within the class hierarchy associated with the requested function; updating or replacing, by the OOIACP, the at least one behavior in the at least one class with an updated or replacement behavior, the updated or replacement behavior comprising an updated or replacement set of procedures; and using, by the OOIACP, the run command to repeat performance of the requested function, by initiating the updated or replacement set of procedures in each of the at least one class and initiating the set of procedures in each of the other identified one or more classes.

In yet another aspect, a system might comprise an object-oriented infrastructure-as-code platform ("OOIACP"). The OOIACP may comprise a declarative configuration language ("DCL")-based IAC software tool that provides structure and data functionalities and a wrapper tool that provides algorithm and sequence functionalities to the IAC software tool to convert the IAC software tool into an object-oriented programming ("OOP")-based IAC system. The OOIACP may comprise at least one first processor and a first non-transitory computer readable medium communicatively coupled to the at least one first processor. The first non-transitory computer readable medium might have stored thereon computer software comprising a first set of instructions that, when executed by the at least one first processor, causes the OOIACP to: receive, from a requesting device, a request to perform a function; and use a run command to perform the requested function, by: identifying one or more classes within a class hierarchy associated with the requested function, wherein each class and subclass within the class hierarchy has one or more predefined class behaviors, wherein each subclass inherits class behaviors of classes to which it belongs and class behaviors of any intermediate subclasses, wherein each class behavior comprises a set of procedures associated with the request and with an object or instance of a corresponding class, the set of procedures configured to operate on said object or instance of the corresponding class; and initiating a set of procedures in each of the identified one or more classes.

In some embodiments, the request to perform the function may comprise a request to perform a web service function. Alternatively, or additionally, the request to perform the function may comprise one of an operational call or a lifecycle call. Alternatively, or additionally, the request to perform the function may comprise one of an application programming interface ("API") call or a command line interface ("CLI") call.

According to some embodiments, the first set of instructions, when executed by the at least one first processor, may further cause the OOIACP to: set one or more semaphores that are used to control access to common resources by multiple processes, based at least in part on the received request; and evaluate one or more system constraints, based at least in part on the received request and based at least in part on the set one or more semaphores. In such cases, performing the requested function may be further based at least in part on the one or more system constraints. In some instances, using the run command may further comprise establishing the class hierarchy of objects based on the received request.

In some embodiments, the first set of instructions, when executed by the at least one first processor, may further cause the OOIACP to: use a before-hook functionality to parse the received request to convert the received request into a DCL request and to initiate a call to the IAC software tool of the OOIACP using the DCL request. In such cases, performing the requested function may comprise performing the requested function based on the call to the IAC software tool of the OOIACP using the DCL request, and returning results of the DCL request based on at least one of the initiated set of procedures or the identified one or more classes. According to some embodiments, the first set of instructions, when executed by the at least one first processor, may further cause the OOIACP to: use an after-hook functionality to convert results of the DCL request into a non-DCL result and to send the non-DCL result to the requesting device.

In some embodiments, the first set of instructions, when executed by the at least one first processor, may further cause the OOIACP to: receive a request to update or replace at least one behavior in at least one class among the identified one or more classes within the class hierarchy associated with the requested function; update or replace the at least one behavior in the at least one class with an updated or replacement behavior, the updated or replacement behavior comprising an updated or replacement set of procedures; and use the run command to repeat performance of the requested function, by initiating the updated or replacement set of procedures in each of the at least one class and initiating the set of procedures in each of the other identified one or more classes.

In an aspect, a method may comprise receiving, by a computing system and from a requesting device, a request to perform a function, wherein the computing system may comprise an object-oriented infrastructure-as-code platform ("OOIACP"), wherein the request to perform the function may comprise a request to process one or more lifecycle events; and when the request to process the one or more lifecycle events is received, performing, by the computing system, a first set of tasks comprising: selecting and scaling across a first plurality of OOIACP instances for processing the one or more lifecycle events; and causing the selected first plurality of OOIACP instances to process the one or more lifecycle events. In some cases, each first OOIACP instance among the first plurality of OOIACP instances may comprise an infrastructure-as-code ("IAC") command line that instantiates component infrastructure among a plurality of component infrastructure to process at least one lifecycle event among the one or more lifecycle events concurrently and independently of other OOIACP instances among the first plurality of OOIACP instances. In some instances, the first plurality of OOIACP instances may be located within an environment in which the plurality of component infrastructure is located.

In some embodiments, the OOIACP may comprise a declarative configuration language ("DCL")-based infrastructure-as-code ("IAC") software tool that provides structure and data functionalities and a wrapper tool that provides algorithm and sequence functionalities to the IAC software tool to convert the IAC software tool into an object-oriented programming ("OOP")-based IAC system. In some instances, the first set of tasks may be performed using at least one of a subject-based multicast ("SBM") system, a distributed business process management system ("DBPMS") engine platform, or an artificial intelligence for information technology operations ("AIOps") system, and/or the like.

According to some embodiments, the first set of tasks may be performed using a SBM system. In some examples, selecting and scaling across the first plurality of OOIACP instances for processing the one or more lifecycle events may comprise identifying a subscription interest, from among a set of subscription interests, that corresponds to the one or more lifecycle events; and identifying a class D Internet Protocol ("IP") address space that has been dynamically reserved for the identified subscription interest, the identified class D IP address space corresponding to a group of IP addresses associated with the first plurality of OOIACP instances. In some cases, causing the selected first plurality of OOIACP instances to process the one or more lifecycle events may comprise delivering, by multicasting or publishing, the at least one lifecycle event among the one or more lifecycle events to each of the group of IP addresses associated with the first plurality of OOIACP instances, together with corresponding instructions to process the at least one lifecycle event.

In some instances, each first OOIACP instance among the first plurality of OOIACP instances may comprise a message broker that is used in conjunction with the SBM system for delivery of the at least one lifecycle event among the one or more lifecycle events and delivery of the corresponding instructions to process the at least one lifecycle event. In some cases, the first set of tasks may be further performed using a DBPMS engine platform, where delivering the at least one lifecycle event may comprise dividing, by the DBPMS engine platform, the request to process the one or more lifecycle events into a plurality of requests, each request among the plurality of requests comprising the at least one lifecycle event and the corresponding instructions to process the at least one lifecycle event; and delivering, by the DBPMS engine platform and using multicasting or publishing using the message broker located at each first OOIACP instance, each request among the plurality of requests to each of the group of IP addresses associated with the first plurality of OOIACP instances. In some examples, the DBPMS engine platform may be a non-centralized engine platform including one or more runnable BPMS nodes handling at least one of one or more BPMS events or one or more BPMS services, wherein the one or more runnable BPMS nodes communicate with each other by multicasting the at least one of the one or more BPMS events or the one or more BPMS services using the SBM system.

In some embodiments, processing the at least one lifecycle event may comprise performing at least one create, read/retrieve, update, delete, list, and batch ("CRUDLB") lifecycle event. In some instances, the first set of tasks may be performed using an AIOps system, where selecting and scaling across the first plurality of OOIACP instances for processing the one or more lifecycle events may comprise using artificial intelligence ("AI") and/or machine learning models to select and scale across the first plurality of OOIACP instances for processing the one or more lifecycle events.

According to some embodiments, scaling across the first plurality of OOIACP instances may comprise at least one of: scaling across the first plurality of OOIACP instances each of which is located within a first network among one or more first networks that are associated with a first service provider; scaling across the first plurality of OOIACP instances each of which is located within one of the first network that is associated with the first service provider or a second network among one or more second networks that are associated with a second service provider that is separate from the first service provider; scaling across the first plurality of OOIACP instances each of which is located within the second network that is associated with the second service provider; scaling across the first plurality of OOIACP instances within the one or more first networks; scaling across the first plurality of OOIACP instances between the one or more first networks and the one or more second networks; scaling across the first plurality of OOIACP instances within the one or more second networks; scaling across the first plurality of OOIACP instances within one or more regions of the one or more first networks; scaling across the first plurality of OOIACP instances within one or more regions of the one or more second networks; scaling across the first plurality of OOIACP instances within one or more zones of the one or more first networks; or scaling across the first plurality of OOIACP instances within one or more zones of the one or more second networks; and/or the like.

In some embodiments, the request to perform the function may comprise a representational state transfer ("REST") call, the REST call comprising a context_in file containing one or more custom environment variables. In such cases, the method may further comprise: receiving, at each first OOIACP instance, the request via an Internet of Components ("IoC") factory application programming interface ("API"); storing, using an IoC factory command line interface ("CLI") script at each first OOIACP instance, the context_in file in disk storage; sourcing, using the IoC factory CLI script, the context_in file within a customized environment within the first OOIACP instance; running the IoC factory CLI script in the customized environment, based on the context_in file; retrieving a product suite image from a repository based on the context_in file, the product suite image comprising at least one of a directory of IAC files, a set of resources, a set of modules, or a set of libraries; executing one or more IAC commands against the product suite image; generating component infrastructure, using the IAC commands, based on specifications in the product suite image; logging into the generated component infrastructure; and for each successive layer of the IoC, retrieving one or more product workloads from the repository based on the context_in file; and performing lifecycling of the component infrastructure by running a CRUDLB script on the component infrastructure based on the context_in file.

According to some embodiments, the context_in file may be customizable for each lifecycle event. In some examples, the method may further comprise dynamically changing subsequent requests to perform one or more other functions by changing the one or more custom environment variables contained in the context_in file for each request.

In some embodiments, the request to perform the function may comprise a semantic abstraction comprising class hierarchies that define class relationships among two or more of the one or more lifecycle events, the first plurality of OOIACP instances, or corresponding component infrastructure, and/or the like. In some examples, performing the first set of tasks may further comprise lifecycling one or more classes defined by the semantic abstraction in the request, by lifecycling component infrastructure corresponding to at least one of the one or more classes, one or more related classes of the one or more classes, or one or more subclasses of the one or more classes, and/or the like, based on the class hierarchies. In some instances, the class hierarchies may comprise at least one of an Is-A resource class hierarchy that defines class relationships in terms of inheritance among one or more classes or a Has-A resource class hierarchy that defines properties or compositions of the one or more classes, and/or the like.

According to some embodiments, the request to perform the function may comprise a logical abstraction comprising at least one logical structure that each defines one or more logical relationships among two or more of the one or more lifecycle events, the first plurality of OOIACP instances, or corresponding component infrastructure, and/or the like. In some examples, performing the first set of tasks may further comprise lifecycling the at least one logical structure defined by the logical abstraction in the request, by lifecycling component infrastructure based on the one or more logical relationships defined by the at least one logical structure. In some cases, the logical abstraction may comprise a business process model and notation ("BPMN")-based logical structure.

In some embodiments, the request to perform the function may further comprise a request to process one or more workload events. In such cases, the method may further comprise: when the request to process one or more workload events is received, performing, by a global load balancer of the computing system, a second set of tasks comprising: selecting and scaling across a second plurality of OOIACP instances for processing the one or more workload events; and causing the selected second plurality of OOIACP instances to process the one or more workload events. In some instances, each second OOIACP instance among the second plurality of OOIACP instances may instantiate workload resources among a plurality of workload resources to process at least one workload event among the one or more workload events concurrently and independently of other OOIACP instances among the second plurality of OOIACP instances. In some cases, the second plurality of OOIACP instances may be located within the environment in which the plurality of component infrastructure. In some examples, the plurality of workload resources may also be located within said environment.

In another aspect, a system may comprise a computing system, which may comprise an object-oriented infrastructure-as-code platform ("OOIACP"), at least one first processor, and a first non-transitory computer readable medium communicatively coupled to the at least one first processor. The first non-transitory computer readable medium may have stored thereon computer software comprising a first set of instructions that, when executed by the at least one first processor, causes the computing system to: receive, from a requesting device, a request to perform a function, wherein the request to perform the function comprises a request to process one or more lifecycle events; and when the request to process the one or more lifecycle events is received, perform a first set of tasks comprising: selecting and scaling across a first plurality of OOIACP instances for processing the one or more lifecycle events; and causing the selected first plurality of OOIACP instances to process the one or more lifecycle events, each first OOIACP instance among the first plurality of OOIACP instances comprising an infrastructure-as-code ("IAC") command line that instantiates component infrastructure among a plurality of component infrastructure to process at least one lifecycle event among the one or more lifecycle events concurrently and independently of other OOIACP instances among the first plurality of OOIACP instances, wherein the first plurality of OOIACP instances is located within an environment in which the plurality of component infrastructure is located.

In yet another aspect, a method may comprise receiving, with a computing system and from a requesting device, a request to perform a function, wherein the computing system may comprise an object-oriented infrastructure-as-code platform ("OOIACP"), wherein the request to perform the function may comprise at least one of a request to process one or more lifecycle events or a request to process one or more workload events, and/or the like. The method may also comprise, when the request to process one or more lifecycle events is received, performing, by the computing system using at least one of a subject-based multicast ("SBM") system, a distributed business process management system ("DBPMS") engine platform, or an artificial intelligence for information technology operations ("AIOps") system, the following: selecting and scaling across a first plurality of OOIACP instances for processing the one or more lifecycle events; and causing the selected first plurality of OOIACP instances to process the one or more lifecycle events, each first OOIACP instance among the first plurality of OOIACP instances comprising an infrastructure-as-code ("IAC") command line that instantiates component infrastructure among a plurality of component infrastructure to process at least one lifecycle event among the one or more lifecycle events concurrently and independently of other OOIACP instances among the first plurality of OOIACP instances. The method may further comprise, when the request to process one or more workload events is received, performing, by a global load balancer of the computing system, the following: selecting and scaling across a second plurality of OOIACP instances for processing the one or more workload events; and causing the selected second plurality of OOIACP instances to process the one or more workload events, each second OOIACP instance among the second plurality of OOIACP instances instantiating workload resources among a plurality of workload resources to process at least one workload event among the one or more workload events concurrently and independently of other OOIACP instances among the second plurality of OOIACP instances, wherein the first and second plurality of OOIACP instances may be located within an environment in which the plurality of component infrastructure and the plurality of workload resources are located.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-7 illustrate some of the features of the method, system, and apparatus for implementing infrastructure-as-code ("IAC") functionalities, and, more particularly, to methods, systems, and apparatuses for implementing object-oriented infrastructure-as-code platform ("OOIACP") and its functionalities, as referred to above. The methods, systems, and apparatuses illustrated by FIGS. 1-7 refer to examples of different embodiments that include various components and steps, which can be considered alternatives or which can be used in conjunction with one another in the various embodiments. The description of the illustrated methods, systems, and apparatuses shown in FIGS. 1-7 is provided for purposes of illustration and should not be considered to limit the scope of the different embodiments.

With reference to the figures, FIG. 1 is a schematic diagram illustrating a system 100 for implementing object-oriented infrastructure-as-code platform ("OOIACP") and its functionalities, in accordance with various embodiments.

In the non-limiting embodiment of FIG. 1, system 100 may comprise a computing system 105, which may include, without limitation, an object-oriented infrastructure-as-code platform ("OOIACP") 110. The OOIACP 110 may include, but is not limited to, a declarative configuration language ("DCL")-based infrastructure-as-code ("IAC") software tool 115 (such as Terraform®, Ansible®, Puppet®, SaltStack®, or the like) that provides structure and data functionalities and a wrapper tool 120 (e.g., Terragrunt, or the like) that provides algorithm and sequence functionalities to the IAC software tool to convert the IAC software tool into an object-oriented programming ("OOP")-based IAC system. The system 100 may further comprise a data store(s) or database(s) 125 and a network(s) 130. The database(s) 125 may be local to the computing system 105 or may be external, yet communicatively coupled, to the computing system 105. In other cases, the database(s) 125 may be integrated within the computing system 105.

System 100 may further comprise one or more requesting devices 135a-135n (collectively, "requesting devices 135" or "user devices 135" or the like) that are associated with corresponding users 140a-140n (collectively, "users 140" or the like). In some cases, the requesting device(s) 135 may include, without limitation, one of a laptop computer, a tablet computer, a smart phone, or a mobile phone, and/or the like.

According to some embodiments, network(s) 130 may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 130 may include an access network of the service provider (e.g., an Internet service provider ("ISP")). In another embodiment, the network(s) 130 may include a core network of the service provider and/or the Internet.

In some embodiments, the network(s) 130 may include, but is not limited to, one or more edge nodes 145, one or more nodes (or intermediate nodes) 150, component infrastructure 155, and database(s) 160.

According to some embodiments, computing system 105 may further include, but is not limited to, at least one of a subject-based multicast ("SBM") system 165, a distributed business process management system ("DBPMS") engine platform 170, or an artificial intelligence for information technology operations ("AIOps") system 175, and/or the like. In some instances, the network(s) 130 may further include, without limitation, workload resources 180, and/or the like.

In operation, computing system 105 (and/or OOIACP 110) may receive, from a requesting device 135 associated with a user 140, a request to perform a web service function. In some cases, the request to perform the web service function may include, without limitation, one of an operational call or a lifecycle call, or the like. An operational call may refer to a call pertaining to operation of the system (e.g., determining how much RAM is available, determining what systems are being utilized, etc.). A lifecycle call may refer to a call pertaining to standing up, tearing down, and/or updating an instance of an object (e.g., provisioning nodes, provisioning VMs, provisioning databases, etc.).

The OOIACP may set one or more semaphores that are used to control access to common resources by multiple processes, based at least in part on the received request; may evaluate one or more system constraints, based at least in part on the received request and based at least in part on the set one or more semaphores; and may use a before-hook functionality to parse the received request to convert the received request into a DCL request and to initiate a call to the IAC software tool of the OOIACP using the DCL request. Here, a semaphore may refer to a variable that is used to control access to a common resource and/or to achieve process synchronization in a multi-process environment. A system constraint may include, without limitation, role based access control ("RBAC")-based constraints, policy-based constraints, and/or the like.

In some instances, the RBAC-based constraints may include, but are not limited to, constraints regarding whether the user has a necessary role (e.g., admin, etc.) to access the requested service, database collection, and/or the like. RBAC-based constraints primarily cover authentication (i.e., who you are, etc.) and authorization (i.e., what you can do once the system knows who you are, etc.) in a pre-deterministic static sense (i.e., admin can do x, y, z per original provisioning of such services, etc.). In some cases, the policy-based constraints may include, without limitation, constraints regarding whether the user satisfies policy parameters in the given context to access the given metrics, and/or the like. Policy-based constraints are more dynamic, context driven, and/or non-deterministic (i.e., admin can do x in data center y at his time of day for this data per today's uploaded policy, etc.) and may be reserved for higher order use cases. The point is to apply the right constraint end-to-end to the right degree. The "deeper" one gets from the "client side" into the "server side," the higher order the capability to apply such. In such a case, an open policy agent ("OPA") server may be run on the client side tactically for that given client, but may run on the server side strategically and may apply static policy on the server side. For example, typically the backend simple storage service ("S3") for IAC software tool (e.g., Terraform®) state may be well locked down. All RBAC and/or policy constraints may occur there. In some cases, due to externalizing dependencies between otherwise discrete IAC software tool (e.g., Terraform®) in the OOIACP object, the same IAC software tool state (e.g., Terraform state) may be shipped back into the repositories (e.g., Github repositories, etc.), and may save it along with its respective OOIACP and thus in that instance may use the repository (e.g., Github) RBAC/policy to the granularity of the given OOIACP that its source code controls. In this manner, it is not only applied end-to-end, but is also custom to the OOIACP (rather than one big S3 bucket at the backend). In some embodiments, JSON web token ("JWT") may be used to apply the system constraints to the given degree in layers and may become more custom the further into the server side one goes (i.e., as the packet travels).

The OOIACP may use a run command to: establish a class hierarchy of objects based on the received request, each class and subclass within the class hierarchy (which may include the OOIACP 105, the edge nodes 145, the nodes 150, and/or the component infrastructure 155, or the like) having one or more predefined class behaviors, wherein each subclass may inherit class behaviors of classes to which it belongs and class behaviors of any intermediate subclasses, wherein each class behavior may include, but is not limited to, a set of procedures associated with the request and with an object or instance of a corresponding class, the set of procedures configured to operate on said object or instance of the corresponding class; and perform the requested web service function based on the initiated call to the IAC software tool of the OOIACP using the DCL request and based at least in part on the one or more system constraints, by identifying one or more classes within the class hierarchy associated with the requested web service function, initiating the set of procedures in each of the identified one or more classes, and returning results of the DCL request based on at least one of the initiated set of procedures or the identified one or more classes. The OOIACP may use an after-hook functionality to convert results of the DCL request into a non-DCL result and to send the non-DCL result to the requesting device.

In another aspect, computing system 105 (and/or OOIACP 110) may receive, from a requesting device 135 associated with a user 140, a request to perform a function. The OOIACP may use a run command to perform the requested function, by: identifying one or more classes within a class hierarchy associated with the requested function, wherein each class and subclass within the class hierarchy (which may include the OOIACP 105, the edge nodes 145, the nodes 150, and/or the component infrastructure 155, or the like) may have one or more predefined class behaviors, wherein each subclass may inherit class behaviors of classes to which it belongs and class behaviors of any intermediate subclasses, wherein each class behavior may include, without limitation, a set of procedures associated with the request and with an object or instance of a corresponding class, the set of procedures configured to operate on said object or instance of the corresponding class; and initiating a set of procedures in each of the identified one or more classes.

In some embodiments, the request to perform the function may comprise a request to perform a web service function. Alternatively, or additionally, the request to perform the function may comprise one of an operational call or a lifecycle call. Alternatively, or additionally, the request to perform the function may comprise one of an application programming interface ("API") call or a command line interface ("CLI") call.

According to some embodiments, the OOIACP may set one or more semaphores that are used to control access to common resources by multiple processes, based at least in part on the received request; and evaluating, by the OOIACP, one or more system constraints, based at least in part on the received request and based at least in part on the set one or more semaphores. In such cases, performing the requested function may be further based at least in part on the one or more system constraints. In some instances, using the run command may further comprise establishing the class hierarchy of objects based on the received request.

In some embodiments, the OOIACP may use a before-hook functionality to parse the received request to convert the received request into a DCL request and to initiate a call to the IAC software tool of the OOIACP using the DCL request. In such cases, performing the requested function may comprise performing the requested function based on the call to the IAC software tool of the OOIACP using the DCL request, and returning results of the DCL request based on at least one of the initiated set of procedures or the identified one or more classes. In some cases, the OOIACP may use an after-hook functionality to convert results of the DCL request into a non-DCL result and to send the non-DCL result to the requesting device.

According to some embodiments, the OOIACP may receive a request to update or replace at least one behavior in at least one class among the identified one or more classes within the class hierarchy associated with the requested function; may update or replace the at least one behavior in the at least one class with an updated or replacement behavior, the updated or replacement behavior comprising an updated or replacement set of procedures; may use the run command to repeat performance of the requested function, by initiating the updated or replacement set of procedures in each of the at least one class and initiating the set of procedures in each of the other identified one or more classes.

In some aspects, by using the wrapper tool (e.g., Terragrunt, or the like) to fill in the gap of the DCL-based IAC software tool (e.g., Terraform®, Ansible®, Puppet®, Salt-Stack®, or the like), the single threaded limitations of the IAC software tool can be circumvented through the use of object-oriented programming ("OOP") features (e.g., Abstraction, Data Hiding, Inheritance, Polymorphism, etc.). In particular, with the OOIACP, a two-tiered, modular, linked-list standard platform may be used to form a Class. The DCL-based IAC software tool provides object structure and data from its existing intended features, while the wrapper tool provides algorithm and sequence fashioned from its intended features. For example, the DCL-based IAC software tool's run command may be used to fold in any algorithm turning the mainly declarative language of the DCL-based IAC software tool to include algorithm, and thus OOIACP responsibility and behaviors. The wrapper tool before hook may be used to consume the method event, to parse the call, and to decide how to arrange and call the declarative IAC software tool, and then does so, while the wrapper tool after hook may be used to take the results of the declarative call and to massage it back into something that the method can return in the OOIACP interface. As a result, an Internet of Components ("IoC") factory may be achieved that provides an out-of-box API implementation of patterns and underlying automation (in some cases, dynamically constructing single image of base objects within a class hierarchy, or the like), to lifecycle and operate IAC workloads and/or their component infrastructure, that is capable of lifecycling at massive global scale (in some cases, by providing each node with its own IoC factory compared with a single factory in conventional systems, or the like), and that is tool agnostic (in some cases, with externalized dependencies, including the use of multiple dependency trees with systems external to the DCL-based IAC software tool, or the like), or the like.

To achieve massive scale, nothing but the presentation layer is centralized, and all API or CLI can be replicated and customized down to individual role-based access control ("RBAC") role. For software development life cycle ("SDLC") and operation of the platform, an IoC base API (with N of these per N cluster components) may be used. For SDLC and operation of a factory instance, an IoC factory API (with M of these for every N IoC base API) may be used. For SDLC of a factory product instance, an IoC factory product API (with O of these for every M IoC factory API) may be used. A traffic management system (e.g., Cedexis® (now Citrix Intelligent Traffic Management), or the like) may be used to select the next optimal edge instance for the next lifecycle operation for massive global scale. For IAC lifecycle, discrete workload or component infrastructure or part thereof may be lifecycled with idempotence (i.e., may be lifecycled any number of times without changing the effect) and operated over. For IAC object orientation, the principles of OOP (i.e., Abstraction, Data Hiding, Inheritance, Polymorphism, etc.) may implicitly package behavior and responsibilities confining complexity of the platform to the OOIACP itself and exposed as methods. For RBAC segmentation, lifecycle and operations of IAC may be constrained appropriately on a need basis at massive scale. In some cases, respective OOIACP/IAC state may be protected by RBAC in git. In some instances, the system may rely on GitHub Enterprise features (or the like) to embody source code control system ("SCCS") RBAC at massive scale. For automation of policy, an open policy agent ("OPA") may be injected into lifecycle and operations to proactively mitigate violations, and may be implemented: upon commit in a GitHub Action (or the like); upon lifecycle API call; and/or upon operational API call; or the like.

Because it is based on declarative language, conventional infrastructure-as-code ("IAC") software tools (such as Terraform®, or the like) allow one to very easily define lifecycle infrastructure based on declarative language. However, also because it is based on declarative language, such conventional IAC software tools lack a procedural feature, and those same definitions are relatively static. The OOIACP bridges the gap to make construction of such IAC software tools dynamic through application of procedure within, and outside of, such IAC software tools. Further, the OOIACP reduces the need for duplication of code through formation of object-oriented constructs such as a class hierarchy which uses polymorphism to instantiate the correct "class" for the IAC software tool.

Looking at the example of Terraform® as the IAC software tool being used in conjunction with the OOIACP, as described herein in accordance with the various embodiments, at a high level, Terraform® simply wraps a procedural API from a cloud provider and creates a declarative interface to the procedural API. Terraform® is a declarative programming language that is used to statically describe IAC resources (including, but not limited to, VM Guest, Load Balancer, etc.) so that one can version control workload and component infrastructure as one would code because it is described in the code. Because it is declarative, the typical approach is that one constructs at development time what the end state of the given use case will look like in Terraform®. One can use modules to abstract and parameterize for re-use (as described below), but ultimately the result is a code that is statically developed individually for a given use case. This is a key differentiator between what Terraform® is today and what the OOIACP is able to make it become. The second differentiator is that OOIACP enables massive scale. Terraform© has modules which enables easier composition of that declarative code, which effectively allows one to divide and conquer, enables creation of libraries that one can register with Terraform® as a means of re-use.

For maintenance reasons, Terraform® recommends a nested depth of no more than two in module construction. The main files of a Terraform® deployment are the files that are compiled when one runs the following series of commands: "terraform init" (which downloads Terraform® plugins based on the "*.tf files"), "terraform plan" (which creates a dependency graph which can be saved and reused for the next command), "terraform apply" (which processes through the dependency graph constructing the infrastructure declaratively described within). Once a "terraform apply" is executed, a "tfstate file" is created to reflect what is running as constructed per Terraform®. This state file should be secured and semaphored between users as there is sensitive data to such therein and one can only have one process at a time manipulating the infrastructure it describes. It is in effect a finite state machine, which describes in a stateful file the state of the infrastructure that one can then use for ongoing lifecycle. One could alter the configuration of a VM Guest for example. The way that Terraform® Enterprise implements scale is to put said state in a backed S3 bucket (or the like) that is secured appropriately and semaphored between users. Terraform® has a few constructs built-in for purposes of existence: "count"; "for"; and the like. "Count" enables one to either include or not include a given resource and how many, which are identically configured. "For" does the same, but allows one to configure differently per each instance. A third party wrapper tool (e.g., Terragrunt, or the like) extends Terraform©, by giving a full featured procedural interface to Terraform® internally during construction. The wrapper tool also allows one to keep one's code "DRY" (i.e., without repetitions or duplications) by providing a method to inherit definition and to thus define something once.

Terraform® is used by the OOIACP by constructing an API-first Factory Patterned lifecycle from repositories (e.g., Github repositories, or the like) to dynamically construct and execute Terraform® based on context passed in from "$BODY" of the "REST" call, for instance. By defining the context to instantiate parameterized Terraform®, one can pick one's ports, target environment, naming convention of the instantiated component infrastructure, which Github repository the Terraform® is in, what target cloud, how to use existing state, what the target use case is, cluster details, patterns and which components of said patterns to instantiate, product details and which parts to instantiate, and/or platform details such as what target cloud user to use, etc.

This all may be implemented in a separate (bank of) IoC Factory server(s), which is(are) scaled as one would otherwise scale a strategic platform asset such as when serving clients. All else remains equal, and guidance from Terraform®—such as having one big, secured, shared S3 bucket for the Terraform® state—holds. The IoC Factory does not interfere with such.

OOIACP takes this a step further, by using object-oriented ("OO") approaches to instantiate workload and component infrastructure dynamically instead of based on class hierarchy, taking the "DRY" principle a step further and using inheritance to implement polymorphism and other OO features so that one can use class hierarchies to dynamically construct Terraform® based on context from the API call. In the "subclasses" directory, an n-ary tree exists to represent inheritance (and ultimately potentially multiple inheritance) where the further down the tree one goes the more detail and/or behavior is implemented by simply consolidating each node's individual definition as one traverses down the tree. At each node are the same "*.tf files" implementing said behavior. In the context that is passed in, a variable exists to define where in this tree one may instantiate and the tree may be navigated down to the respective class as described in the context. Along the way, all Terraform® artifacts may be collected and combined appropriately into a single image of the respective Terraform® artifact (e.g., "main.tf," "output.tf," etc.) that is deposited at the level of the tree described. It is there that the Terraform® commands may be invoked to construct the workload and component infrastructure. For example, for code below "main.tf" for a Spring Cloud Gateway, there are (1) items from the root of the class hierarchy implementing the core component infrastructure of a VM Guest with a number of network interfaces and that is overlayed with a base set of images, using Terraform® "count" commands to determine whether or not to include global or local layer 7 and/or layer 7 load balancers, etc., and (2) items from further down in the class hierarchy where a Spring Cloud Gateway is overlayed upon such, thereby making the REST call produce a gateway for the given use case. Although this example is for a Spring Cloud Gateway, the various embodiments are not so limited, and this example instead may be applied to a software load balancer, a database, or whatever else is in the domain of the given class hierarchy one is using, where every artifact is defined once in a class hierarchy across a domain. Ultimately, multiple inheritances may be implemented the process described above occurs N times per given instance of inheritance to consolidate them all.

Here, these still do not interfere with basic Terraform® guidance or operation except in how state is handled. As described above, the "tfstate file" for a given Terraform® run may be deposited from where one runs the "terraform apply." Likewise, Terraform® has constructs to instead place this strategically in the backend between all users.

What happens in OOIACP, however, is that local "tfstate file" is maintained and lifecycled along with the respective OOIACP as the data portion of the Terraform® "object," like how one would see in any OO language using data hiding principles. Through use of policy and RBAC (in GitHub Enterprise, or the like), this state is appropriately protected and can be deposited onto any IoC Factory server to continue lifecycle of what it describes, thereby setting the stage for massive scale, unlike how Terraform® Enterprise does it with its divide and conquer approach using the same shared backend state. OOIACP takes this divide and conquer approach, automatically, to the extreme to ultimately satisfy "Big O notation" of O(1), and is thus capable of massive scale. Herein, "Big O notation" refers to an order of a function or growth rate of the function, which refers to a manner of classifying algorithms according to how their run time or space requirements grow as the input size grows, while "O(1)" refers to a constant time.

To support massive scale, unlike in conventional approaches, the IoC Factory server is not a separate bank of servers hosted and serving all clients. Instead, an IoC Factory server is hosted on each and every component infrastructure compute resource (or its proxy, if the component infrastructure itself does not host an open systems interconnection ("OSI") stack). So, in the above example, not only is a base image and a gateway overlayed on the VM Guest but so is an instance of IoC Factory, which then can be used in a custom manner to lifecycle that which it is hosted with. In the API first approach, OO methods such as "scale up," "scale over," "scale in," etc., may be implemented to scale the given Spring Cloud Gateway and treat as an object like one would in other programming languages. The API would look like this:

(a) /api/rest/ioc/v1/lifecycle/mal/provision/scale/across/ioc/factory/regions ("scale across regions");
(b) /api/rest/ioc/v1/lifecycle/mal/provision/scale/between/ioc/factory/zones ("scale between zones");
(c) /api/rest/ioc/v1/lifecycle/mal/provision/scale/near/ioc/factory/sets ("scale near sets");
(d) /api/rest/ioc/v1/lifecycle/mal/provision/scale/out/ioc/factory/clusters ("scale out clusters");
(e) /api/rest/ioc/v1/lifecycle/mal/provision/scale/over/ioc/factory/clouds ("scale over clouds");
(f) /api/rest/ioc/v1/lifecycle/mal/provision/scale/up/ioc/factory/instances ("scale up instances"); and/or
(g) /api/rest/ioc/v1/lifecycle/mal/provision/scale/in/ioc/factory/iocfactory/me ("scale in me").

Given that each object knows how to implement such APIs, massive scale is possible. Note that the objects may be constructed as discretely as possible with dependency externalized from Terraform®. This is a key point and differentiator from how Terraform® is typically used. By externalizing dependency, one can create multiple dependency trees (compared with Terraform's single dependency tree) for multiple use cases and to implement massive scale. For example, if one wanted to take all load balancers in the company and update some metadata on them, or reconfigure them in some way that does not conflict in dependency with something that uses such, one would then create a dependency data structure of O(x) that could proceed to do that. If one wanted to take a single use case that uses N infrastructure components and needed to update something about it, one would then proceed down that dependency tree to do so. An extreme case may use the dependency data structure to each individual object for an O(1) where one may use a software utility cron (also referred to as a "cron job" or the like; which is a time-based job scheduler in a Unix-like computer operating system, or the like) to start the Terraform® run. If one wanted to perform a command-line package-management utility update (e.g., a Yellowdog Updater, Modified ("YUM") update, or the like) across every single machine in a global company, one may simply use cron to start such on each instance. Massive scale is thereby possible in endless dimensions.

With respect to the details on the mechanics of OOIACP in terms of instantiation and polymorphism, the following provides a non-limiting example:
(1) The event details the class to instantiate in $BODY of the REST call;
(2) Amongst the available class hierarchies across the domain, a Linux "find" command is executed to see where such class sits in each (as multiple inheritance is possible) to capture the path to such in each;
(3) Once said paths are captured, successive Linux "pushd" and "popd" commands may be executed to each node in each path of each class hierarchy;
(4) At each node, the respective artifacts (e.g., "main.tf," "variables.tf," etc.) may be captured and added to the sum "solution set" representing the IaC and other corollary items (e.g., scripts, LUTs, etc.) of the to-be-instantiated class;
(5) Once the final class hierarchy is traversed and one ends up at the target node, the solution set is deposited and it is there that Terraform® is run.

In a non-limiting example, one may have class hierarchies A, B, and C, and the path to the target from each class hierarchy may be as follows:
(i) A=>AA=>AAA=>widgetAAABBBCC;
(ii) B=>BB=>BBB=>widgetAAABBBCC; and
(iii) C=>CC=>widgetAAABBBCC The corresponding "pushd" and/or "popd" commands may be as follows:
(iv) pushd A, popd, pushd A/AA, popd, pushd A/AA/AAA, popd, pushd A/AA/AAA/widgetAAABBBCC, popd, pushd B, popd, pushd B/BB, popd, pushd B/BB/BBB, popd, pushd B/BB/BBB/widgetAAABBBCC, popd, pushd C, popd, pushd C/CC, popd, pushd C/CC/widgetAAABBBCC, deposit solution, and execute Terraform®.

For polymorphism, the respective overloaded method at the respective node may end up being executed.

There is one other differentiator to OOIACP compared with how conventional approaches work, and this pertains to patterns.

As described above, with it being declarative (except what one can do with "count" or "for" commands, or third party wrapper tools like Terragrunt), Terraform® is predisposed to being defined at development time where one creates a template that one can then parameterize and re-use to the extent of the structure as described in the template. Instead, the various embodiments identify patterns of construction that one can then use dynamically to construct the given use case in a "less-deterministic" way.

Take a three tier composite workload for example. In the typical approach, this would be statically defined and then potentially parameterized in Terraform® in a module (template) for re-use, but only re-used in the sense of using this same pattern over and over again with different parameters. And using "count" and "for" commands, one could further determine what to include or exclude from the same pattern. If one wanted only the backend MAL workload compute, one would use the count feature in Terraform® to instantiate only that part of the pattern, but one still would be limited to that single definition of the module or template.

In contrast, using the OOIACP approach, one would instead identify the following patterns:
(A) The target component infrastructure of the use case; and
(B) The corollary component infrastructure that is needed to support item A (and which it is pointless to have without item A).

Using the OOIACP context by defining environment variables in the REST call to provision, one can choose whether or not to spin up the target component infrastructure (e.g., VM Guest) in a new corollary component infrastructure (e.g., network, load balancers, etc.) or in whole or in part to the existing component infrastructure from prior provisioning. One can either specify "new" or the name of the existing (e.g., "edge-acb9312c-5d81-46f0-9660-54c5caf05730" or the like) to determine where this instance of target compute is placed (e.g., what resource group, which key, behind what firewall, on which subnet, etc.). By enabling this in the API and using an upstream "smart" workflow to drive said API, one therefore is not limited to the particular module or template, or portions thereof. One can construct an N-tier deep API gateway by making N calls properly configured with the context sent into the REST call. Likewise, one could instead just spin up a single VM Guest. This is all possible because one has determined the pattern of what is the target in the use case and what is corollary in the use case that only exists because of such. So while it is still deterministic, it is much less so (i.e., unlimited application of the patterns, still parameterized) compared with the typical way this is done (i.e., application of the single pattern parameterized). Another target for a data-based use case could be AWS Elastic Block Storage or the like. One would still need all the networking (corollary), etc., to the target and thus one would have the same flexibility.

In some aspects, the OOIACP may be developed having the following prerequisites: (i) scripts that assume three bare metal machines or servers have been provisioned with the latest operating system ("OS") (e.g., Red Hat Enterprise Linux ("RHEL") 8.3 or greater, or the like) and that the OOIACP has root access to the bare metal machines or servers; and (ii) a /26 publicly accessible network (i.e., a network that provides 64 IPv4 addresses, or the like) has been set up that includes these three bare metal machines or servers, with the remaining IP addresses being used by virtual machines ("VMs") (with static or dynamic IP addresses being used by for the VMs); or the like. The following scripts may be developed with the following scripts: (A) "bare-metal-add-ssh-keys.yml" which may add a group of SSH keys to the bare metal servers, and may include the SSH key for an Ansible control node, or the like; (B) "bare-metal-prepare-servers.yml" which may update the OS to the latest version (e.g., RHEL 8.3 or greater, or the like), and which may install the corresponding virtualization and cockpit (e.g., Red Hat Virtualization and cockpit, or the like), and which may reboot if necessary, or the like; (C) "bare-metal-create-vm-network.yml" which may create the VM Network required for virtualization (e.g., Red Hat virtualization, or the like), or the like; (D) "bare-metal-create-vm-instances.yml" which may create the VM instances on each bare metal server based on a yaml file containing information for each VM, or the like; (E) "bare-metal-add-ssh-keys-to-vms.yml" which may add a group of SSH keys to the VMs, and may include the SSH key for the Ansible control node, or the like; and/or the like. In some cases, once all the above scripts have been performed in sequence, another set of Ansible scripts may be used to register each VM as Satellite hosts, to create a satellite location, to create Open Shift Clusters, and/or to create local storage, or the like.

In some embodiments, an OOIACP provider may be developed that performs the following three functions: (1) stands up (i.e., brings online or brings into server, or the like) bare metal or other component infrastructure that may work against an edge server (e.g., per prerequisites (i) and (ii) above, or the like); (2) stands up software based corollary components (including, but not limited to, load balancers, firewalls, etc.) as pseudo component infrastructure that may work against the edge server (or any other cloud server) and may provide features natively, or the like; and (3) stands up an extensible workload (based on the IoC API) as a new type or flavor of resource that may work against any cloud server (where extensible IoC has a competitive advantage over conventional canned resources against native workloads, or the like; e.g., where a resource may be created, such as a resource called "workload" or the like, that may parameterize what IoC product to lifecycle in, with other workloads already pre-defined in the IoC being named in a similar manner as resources in a "suite" (e.g., all Red Hat Product workloads may be available from the Red Hat Product Suite with workload(s) selectable in context as needed to mix and match, or the like)).

Regarding (3), IoC Factory lifecycles using "product suites" may aggregate, in a given domain, a collection of workloads in a common lifecycle to facilitate stand up of said lifecycle pattern once using the same patterns (e.g., footprints, application management cluster unique identifier ("CUID"), etc.) and then may subsequently (in some cases, forevermore) extend the respective product suite using that same lifecycle patterning. For example, a RedHat product suite may be defined to encompass all RedHat workloads (https://access.redhat.com/documentation/en-us/), where the application CUID "redhat" may be used as the over-arching management CUID (that can delegate to other client application management CUIDs, or the like). In this manner, by aggregating domains using product suites as described above, creation and ongoing maintenance of the OOIACP provider may be greatly simplified. In some instances, a predefined well-known IoC Factory product hierarchy (e.g., Basic, Enterprise, Extreme, etc.) may be used into which the RedHat domain may refactor. Likewise, a well-known IoC Factory footprint may be used into which the RedHat domain may also refactor. According to some embodiments, extension of the product suite may define in certain spots in the IoC infrastructure just another entry for that newly supported RedHat workload. In some embodiments, every resource in the OOIACP provider may be exactly the same beyond naming: (a) the resource may be named after the respective product suite; and (b) the resource may take in one argument (e.g., called "context_in" or the like).

Regarding (b), simplicity of "context_in" or the like may be achieved because every REST-ful call to an IoC API may require only the URL and the context that is passed in through $BODY. That context may simply include a laundry list of potentially hundreds of BASH based environment variables that may be used to overlay the default context of the target prior to processing the CRUDLB (Create, Retrieve, Update, Delete, List, Batch) that it represents.

This "context_in" in that scenario may be propagated between OOIACP instances and may be tweaked during such repeated REST-ful calls as it percolates its way through an ecosystem, where using this approach of $BODY hosting the context sets the stage for that. In some instances, to meet global scale objectives, one can abandon the standard duplicate-a-template approach that is conventionally used in which using IaC results in an ever-increasing nightmare of maintenance the more one does that as one builds out. In OOIACP, class hierarchies of IaC may be constructed, and refactoring such may simply be an update to a given class in such, followed by an automated rebuild and deploy.

In some aspects, a modified business process management system ("BPMS") engine may be used to describe and execute dependencies, thus replacing the otherwise singular dependency tree of Terraform. BPMS may be introduced because of the complexities that may exist for workloads beyond what a simple dependency tree can handle (and even component infrastructure beyond what Terraform can do today). Using BPMS, any complexity in dependency may be described to also include temporal and external events, and such may be much, much more capable than a single dependency tree described in a tfstate file. However, one cannot use BPMS in the traditional sense of a separate engine hosted independently and acting against an ecosystem similar to how that is not done in OOIACP for IaC. Rather, each node may host a BPMS engine (and an IoC Factory) to meet massive scale.

In a new pattern, Mongo (or other repositories) may act as the repository for the BPMS artifacts. Dependency may be described therein with each document in a separate collection representing a separate dependency (i.e., BPMS flow, or the like). Each object running in the platform may perform a Batch retrieve of all the documents in the BPMS collection and may process each in turn, looking for itself as the next item to be executed in the BPMS artifact. If it is not the next item, it may simply drop processing of that dependency. If it is, it may perform such process, and then may perform an update of that BPMS flow indicating completion back into Mongo to record results, and then may proceed to the next document for the next dependency. The net effect here is that the BPMS engine may exist on the node itself where the object is hosted and may process such only for said object when a step is hit involving that object, thus enabling unlimited dependency in cardinality and scale. In some cases, the BPMS may be implemented as a distributed BPMS.

The key to massive scale is to either eliminate or minimize centralization. Here, one may effectively create a BPM engine per node similar to how one has an IoC Factory per node to meet massive scale, and the ability to describe dependency is much more superior in that BPM flow versus a static dependency tree in a tfstate file with a cardinality of the number of nodes that exist.

In some aspects, a target (e.g., VM Guest, or the like) may be placed in a new corollary (e.g., a virtual private cloud ("VPC"), a subnet, or the like) or may be weaved into existing corollaries, in a manner not unlike a Lego® block-like pattern compared with a one-and-done pattern. In some instances, a Terraform® null provider may be used to extend the IoC factory beyond native Terraform® behavior, in some cases, layering new workloads on existing machines in a create, read/retrieve, update, delete, list, and batch ("CRUDLB") system. In some embodiments, orchestration calls may be used to weave in the new VM Guests with the new roles into the corollary setup (e.g., the same subnet, or the like) in the first VM Guest instantiation.

In conventional Terraform® duplicate-a-template approach, a new change must be refactored in an increasing number of places. For example, if one uses a resources 1000 times, and one discovers that one has to fix it or have a new API for it, then one requires to work it in 1000 places. Quite differently, in accordance with the various embodiments, during build time in other cloud systems or providers whose Terraform® API is discrete declarative wrappings to each of their native features, updating a "class" in the hierarchy and "re-building" will automate such builds when one properly patterns the custom extensions during said builds to weave it all back in without human hands. Prior to the "terraform apply," the *.tf file would be constructed, using multiple inheritances, by simply percolating down the class hierarchy tree gathering each node's *.tf along the way to finally construct it at the target class whereupon any customization will be automatically weaved in using simple text manipulation techniques, which is then deployed in the apply command. During coding time using the modified Terraform® provider may include using resources of product suites that aggregate native features, each with one argument . . . context_in . . . and not the individual component infrastructure artifacts therein like in conventional systems. Rather than the complexity of an artifact described in endless Terraform code in every new use case that is harder and harder to maintain over time as it grows, the artifact according to the various embodiments may instead be relatively static, with that complexity instead in the context_in file (e.g., with $BODY passed in during the REST call to the IoC Factory, or the like). The reason this is possible is because the architecture of the component infrastructure and workload is prepatterned into extensible Lego®-like pieces rather than a one-and-done approach, as described above.

Whereas normal Terraform® has a single dependency, the various embodiments may have many dependencies. Dependency may be defined external from a given instance. For example, a dependency of O(1) may be defined for N number (e.g., 500, or the like) of nodes each having a bandwidth to run a Terraform® job outside of its immediate concern or infrastructure. For embodiments having greater complexity (e.g., with human, system, or temporal events, or the like), a distributed BPMS dependency may be designed and executed against the greater complexity embodiments. In such cases, for instance, the native Terraform® lifecycle may be extended to be part of a global supply chain lifecycle, or the like. An IoC Factory may be installed on each of N third party nodes, and parallel IoC jobs may be run targeting service provider edge servers to spin up the N nodes at the service provider edge servers and to spin down the N third party nodes. Per the design of IoC, this may be defined by a dependency of O(1). In such cases, the cost may be N hours (in this example, 500 hours) plus third party node compute spin up time (e.g., N third party nodes×1 hour to spin up service provider bare metal ("BM") servers×the time to spin up the third party nodes), which occurs as a onetime event at inception. In such cases, a distributed BPMS may not be needed because using the cardinality of "count" in Terraform® spinning up N (in this case, 500) short lived identical nodes would not need BPMS.

In some aspects, computing system 105 and/or OOIACP 110 (collectively, "computing system" or the like) may receive, from a requesting device (e.g., requesting device 135 among the one or more requesting device(s) 135a-135n, or the like), a request to perform a function. In some cases, the request to perform the function may comprise a request to process one or more lifecycle events. When the request to process the one or more lifecycle events is received, the computing system may perform a first set of tasks comprising: selecting and scaling across a first plurality of OOIACP instances for processing the one or more lifecycle events; and causing the selected first plurality of OOIACP instances to process the one or more lifecycle events. In some cases, each first OOIACP instance among the first plurality of OOIACP instances may comprise an infrastructure-as-code ("IAC") command line that instantiates component infrastructure among a plurality of component infrastructure to process at least one lifecycle event among the one or more lifecycle events concurrently and independently of other OOIACP instances among the first plurality of OOIACP instances. In some instances, the first plurality of OOIACP instances may be located within an environment in which the plurality of component infrastructure is located (in this case, network(s) 130, or the like).

In some embodiments, the OOIACP may comprise a declarative configuration language ("DCL")-based infrastructure-as-code ("IAC") software tool that provides structure and data functionalities and a wrapper tool that provides algorithm and sequence functionalities to the IAC software tool to convert the IAC software tool into an object-oriented programming ("OOP")-based IAC system. In some instances, the first set of tasks may be performed using at least one of a SBM system (e.g., SBM system 165, or the like), a DBPMS engine platform (e.g., DBPMS engine platform 170, or the like), or an AIOps system (e.g., AIOps system 175, or the like), and/or the like.

According to some embodiments, the first set of tasks may be performed using a SBM system. In some examples, selecting and scaling across the first plurality of OOIACP instances for processing the one or more lifecycle events may comprise identifying a subscription interest, from among a set of subscription interests, that corresponds to the one or more lifecycle events; and identifying a class D Internet Protocol ("IP") address space that has been dynamically reserved for the identified subscription interest, the identified class D IP address space corresponding to a group of IP addresses associated with the first plurality of OOIACP instances. In some cases, causing the selected first plurality of OOIACP instances to process the one or more lifecycle events may comprise delivering, by multicasting or publishing, the at least one lifecycle event among the one or more lifecycle events to each of the group of IP addresses associated with the first plurality of OOIACP instances, together with corresponding instructions to process the at least one lifecycle event.

In some instances, each first OOIACP instance among the first plurality of OOIACP instances may comprise a message broker that is used in conjunction with the SBM system for delivery of the at least one lifecycle event among the one or more lifecycle events and delivery of the corresponding instructions to process the at least one lifecycle event. In some cases, the first set of tasks may be further performed using a DBPMS engine platform, where delivering the at least one lifecycle event may comprise dividing, by the DBPMS engine platform, the request to process the one or more lifecycle events into a plurality of requests, each request among the plurality of requests comprising the at least one lifecycle event and the corresponding instructions to process the at least one lifecycle event; and delivering, by the DBPMS engine platform and using multicasting or publishing using the message broker located at each first OOIACP instance, each request among the plurality of requests to each of the group of IP addresses associated with the first plurality of OOIACP instances. In some examples, the DBPMS engine platform may be a non-centralized engine platform including one or more runnable BPMS nodes handling at least one of one or more BPMS events or one or more BPMS services, wherein the one or more runnable BPMS nodes communicate with each other by multicasting the at least one of the one or more BPMS events or the one or more BPMS services using the SBM system.

In some embodiments, processing the at least one lifecycle event may comprise performing at least one create, read/retrieve, update, delete, list, and batch ("CRUDLB") lifecycle event. In some instances, the first set of tasks may be performed using an AIOps system, where selecting and scaling across the first plurality of OOIACP instances for processing the one or more lifecycle events may comprise using artificial intelligence ("AI") and/or machine learning models to select and scale across the first plurality of OOIACP instances for processing the one or more lifecycle events.

According to some embodiments, scaling across the first plurality of OOIACP instances may include, but is not limited to, at least one of: scaling across the first plurality of OOIACP instances each of which is located within a first network among one or more first networks that are associated with a first service provider; scaling across the first plurality of OOIACP instances each of which is located within one of the first network that is associated with the first service provider or a second network among one or more second networks that are associated with a second service provider that is separate from the first service provider; scaling across the first plurality of OOIACP instances each of which is located within the second network that is associated with the second service provider; scaling across the first plurality of OOIACP instances within the one or more first networks; scaling across the first plurality of OOIACP instances between the one or more first networks and the one or more second networks; scaling across the first plurality of OOIACP instances within the one or more second networks; scaling across the first plurality of OOIACP instances within one or more regions of the one or more first networks; scaling across the first plurality of OOIACP instances within one or more regions of the one or more second networks; scaling across the first plurality of OOIACP instances within one or more zones of the one or more first networks; or scaling across the first plurality of OOIACP instances within one or more zones of the one or more second networks; and/or the like.

In some embodiments, the request to perform the function may comprise a representational state transfer ("REST") call, the REST call comprising a context_in file containing one or more custom environment variables. In such cases, each first OOIACP instance may receive the request via an Internet of Components ("IoC") factory application programming interface ("API"). An IoC factory command line interface ("CLI") script at each first OOIACP instance may store the context_in file in disk storage. The IoC factory CLI script may source the context_in file within a customized environment within the first OOIACP instance. The IoC factory CLI script may be run in the customized environment, based on the context_in file. A product suite image may be retrieved from a repository based on the context_in file, the product suite image including, but not limited to, at least one of a directory of IAC files, a set of resources, a set of modules, or a set of libraries, and/or the like. One or more IAC commands may be executed against the product suite image. Component infrastructure may be generated, using the IAC commands, based on specifications in the product suite image. One may log into the generated component infrastructure. For each successive layer of the IoC, one or more product workloads may be retrieved from the repository based on the context_in file; and lifecycling of the component infrastructure may be performed by running a CRUDLB script on the component infrastructure based on the context_in file.

According to some embodiments, the context_in file may be customizable for each lifecycle event. In some examples, the subsequent requests may be dynamically changed to perform one or more other functions by changing the one or more custom environment variables contained in the context_in file for each request.

In some embodiments, the request to perform the function may comprise a semantic abstraction comprising class hierarchies that define class relationships among two or more of the one or more lifecycle events, the first plurality of OOIACP instances, or corresponding component infrastructure, and/or the like. In some examples, performing the first set of tasks may further comprise lifecycling one or more classes defined by the semantic abstraction in the request, by lifecycling component infrastructure corresponding to at least one of the one or more classes, one or more related classes of the one or more classes, or one or more subclasses of the one or more classes, and/or the like, based on the class hierarchies. In some instances, the class hierarchies may comprise at least one of an Is-A resource class hierarchy that defines class relationships in terms of inheritance among one or more classes (as shown, e.g., in FIG. 7A, or the like) or a Has-A resource class hierarchy that defines properties or compositions of the one or more classes (as shown, e.g., in FIG. 7B, or the like), and/or the like.

According to some embodiments, the request to perform the function may comprise a logical abstraction comprising at least one logical structure that each defines one or more logical relationships among two or more of the one or more lifecycle events, the first plurality of OOIACP instances, or its corresponding component infrastructure, and/or the like. In some examples, performing the first set of tasks may further comprise lifecycling the at least one logical structure defined by the logical abstraction in the request, by lifecycling component infrastructure based on the one or more logical relationships defined by the at least one logical structure. In some cases, the logical abstraction may comprise a business process model and notation ("BPMN")-based logical structure.

In some embodiments, the request to perform the function may further comprise a request to process one or more workload events. In such cases, when the request to process one or more workload events is received, a global load balancer (similar to global load balancer 685 of FIG. 6A, or the like) of the computing system may perform a second set of tasks comprising: selecting and scaling across a second plurality of OOIACP instances for processing the one or more workload events; and causing the selected second plurality of OOIACP instances to process the one or more workload events. In some instances, each second OOIACP instance among the second plurality of OOIACP instances may instantiate workload resources among a plurality of workload resources to process at least one workload event among the one or more workload events concurrently and independently of other OOIACP instances among the second plurality of OOIACP instances. In some cases, the second plurality of OOIACP instances may be located within the environment in which the plurality of component infrastructure. In some examples, the plurality of workload resources may also be located within said environment.

In some aspects, the computing system may receive, from a requesting device, a request to perform a function. In some instances, the request to perform the function may include, without limitation, at least one of a request to process one or more lifecycle events or a request to process one or more workload events, and/or the like. When the request to process one or more lifecycle events is received, the computing system may perform, using at least one of a SBM system, a DBPMS engine platform, or an AIOps system, and/or the like, the following: selecting and scaling across a first plurality of OOIACP instances for processing the one or more lifecycle events; and causing the selected first plurality of OOIACP instances to process the one or more lifecycle events, each first OOIACP instance among the first plurality of OOIACP instances comprising an infrastructure-as-code ("IAC") command line that instantiates component infrastructure among a plurality of component infrastructure to process at least one lifecycle event among the one or more lifecycle events concurrently and independently of other OOIACP instances among the first plurality of OOIACP instances. When the request to process one or more workload events is received, a global load balancer of the computing system may perform the following: selecting and scaling across a second plurality of OOIACP instances for processing the one or more workload events; and causing the selected second plurality of OOIACP instances to process the one or more workload events, each second OOIACP instance among the second plurality of OOIACP instances instantiating workload resources among a plurality of workload resources to process at least one workload event among the one or more workload events concurrently and independently of other OOIACP instances among the second plurality of OOIACP instances, wherein the first and second plurality of OOIACP instances may be located within an environment in which the plurality of component infrastructure and the plurality of workload resources are located.

These and other functions of the system 100 (and its components) are described in greater detail below with respect to FIGS. 2-8.

Figure 2:
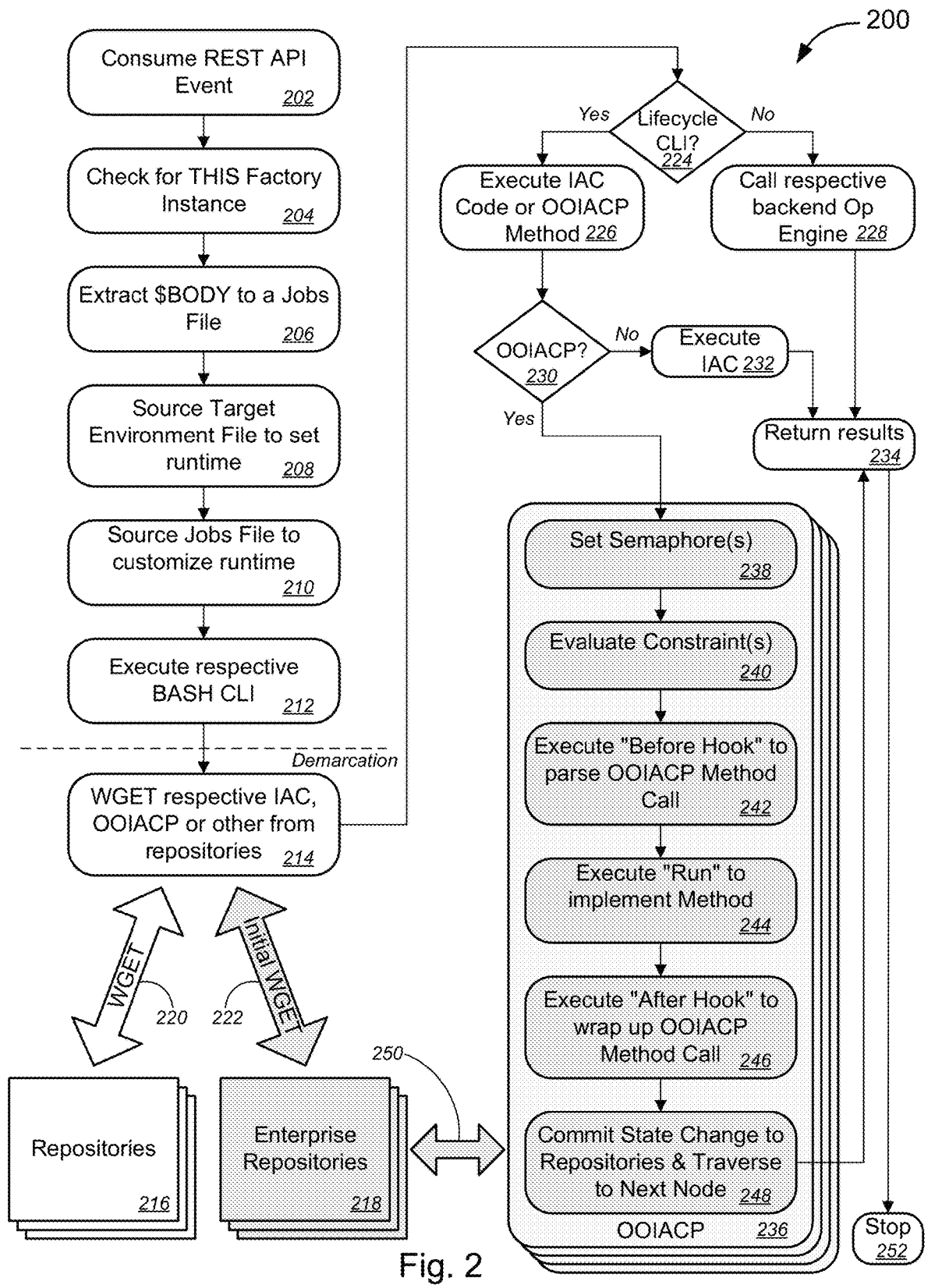
FIG. 2 is a schematic diagram illustrating a non-limiting example of implementation of OOIACP and its functionalities in the context of implementing Internet of Components ("IoC") functionalities, in accordance with various embodiments.

FIG. 2 is a schematic diagram illustrating a non-limiting example 200 of implementation of OOIACP and its functionalities in the context of implementing Internet of Components ("IoC") functionalities, in accordance with various embodiments. According to some embodiments, an application programming interface ("API"), a command line interface ("CLI"), and/or an execution engine may be used to implement the IoC functionalities. In some cases, the API may include, without limitation, a model view controller ("MVC") API (e.g., a Spring© MVC API, or the like), which is an API of a software design pattern that may be used for developing a user interface that divides the related program logic into three interconnected components: (a) a model; (b) a view; and (c) a controller. The model may be a central component of the software design pattern that directly manages the data, logic, and rules of the application, and may be the application's dynamic data structure, independent of the user interface. The view may be any representation of information (e.g., chart, diagram, or table, or the like). The controller may be used to accept input and to convert the input into commands for the model or the view. In some instances, the CLI may include, but is not limited to, a Bourne Again Shell ("BASH") CLI, or the like. In some cases, the execution engine may include, without limitation, a BASH execution engine, or the like.

With reference to the non-limiting embodiment of FIG. 2, the system (such as a Spring® MVC API, or the like), at block 202, may consume a representational state transfer ("REST") API, which is a software architectural style that defines a set of constraints to be used for creating Web services. Here, "consuming a REST API" may refer to use of some of the methods of the API. At block 204, the system (such as BASH CLI, or the like) may check for this factory instance. The system (e.g., the Spring® MVC API, or the like) may extract $BODY (which may contain Linux environment variables, or the like) to a Jobs file (block 206), may source a target environment file to set runtime (block 208), may source a Jobs file to customize runtime (block 210), and may execute respective BASH CLI (block 212). The system (e.g., BASH execution engine, or the like) may utilize a WGET function or program to retrieve an infrastructure-as-code ("IAC") software tool, an object-oriented infrastructure-as-code platform ("OOIACP"), and/or other tools from one or more repositories 216 (e.g., GitHub® repositories, or the like) and/or from one or more enterprise repositories 218 (e.g., GitHub® enterprise repositories, or the like), as shown in FIG. 2 by double-headed arrows 220 and 222, respectively. The one or more repositories 216 may be hosted at a client site (where all states of the IAC software tool (e.g., Terraform®, or the like) may be protected as typically done in the backend), while the one or more enterprise repositories 218 may be hosted at a service provider edge server or the like (for providing massive global scale; where all OOIACP states in the GitHub repositories 218 may be protected by role-based access control ("RBAC"), or the like). The processes at blocks 202-212 represent simplicity in an Internet of Components ("IoC") factory, while the processes starting at block 214 (separated from the processes at blocks 202-212 by a demarcation denoted in FIG. 2 by a dashed line) represent complexity in execution engine.

At block 224, the system may determine whether there is a lifecycle CLI. If so, the system proceeds to the process at block 226. If not, the system proceeds to the process at block 228. At block 226, the system (e.g., the BASH execution engine, or the like) may execute IAC code or OOIACP method. At block 230, the system may determine whether an OOIACP method has been executed. If so, the system proceeds to the processes performed by the OOIACP 236 (which may have been retrieved from the enterprise repositories 218, or the like, as depicted in FIG. 2 by the double-headed arrow 250), which may be initiated via object-oriented programming ("OOP") and an OOIACP Method Call. If not, the system proceeds to the process at block 232, at which the system may execute the IAC (e.g., Terraform® or the like), via structured programming and an IAC CLI call (and using a wrapper tool CLI (such as Terragrunt CLI, or the like)). At block 228, the system (e.g., the BASH execution engine, or the like) may call respective backend operational engine. The system may proceed from the processes at blocks 228 and 232 to the process at block 234. At block 234, the system may return results (e.g., in CDATA text, or the like).

The system (e.g., OOIACP 236, or the like) may set one or more semaphores (block 238), may evaluate one or more constraints (block 240), may execute a "Before Hook" function to parse the OOIACP Method Call (block 242), may execute a "Run" command to implement the Method (block 244), may execute an "After Hook" function to wrap up the OOIACP Method Call (block 246), and may commit state change to the repositories 218 and may traverse to the next node (e.g., node 145 or 150 such as shown in FIG. 1, or the like) (block 248). According to some embodiments, a traffic management system (e.g., Cedexis® (now Citrix Intelligent Traffic Management), or the like) may be used to traverse OOIACP host data structure (i.e., to visit or touch the elements of the host data structure, the elements containing data) to select the next best edge node. The system may then proceed to the process at block 234, at which the system may return results (e.g., in CDATA text, or the like). Thereafter, the system may stop (block 252).

FIGS. 3A-3D (collectively, "FIG. 3") are block diagrams illustrating a class hierarchy and implementation of various non-limiting examples 300, 300', 300", and 300''' of method calls using an object-oriented infrastructure-as-code platform ("OOIACP") 305, in accordance with various embodiments. In some embodiments, the OOIACP 305 may include, but is not limited to, a declarative configuration language ("DCL")-based infrastructure-as-code ("IAC") software tool 310 (such as Terraform®, Ansible®, Puppet®, SaltStack®, or the like) that provides structure and data functionalities and a wrapper tool 315 (e.g., Terragrunt, or the like) that provides algorithm and sequence functionalities to the IAC software tool to convert the IAC software tool into an object-oriented programming ("OOP")-based IAC system. The OOIACP 305 may further include, without limitation, data 320a and behavior 325a (which in this case may include behaviors A, B, and C, or the like).

Referring to the non-limiting embodiments of FIG. 3, the system may build a class hierarchy in which the core infrastructure may include, without limitation, the OOIACP 305, component infrastructure 330, and workload 335. The component infrastructure 330 may include, but is not limited to, data 320b and behavior 325b (which in this case may include behavior D, or the like). Similarly, workload 335 may include, without limitation, data 320c and behavior 325c (which in this case may include behavior G, or the like). According to some embodiments, sub-classes may include, but are not limited to, virtual machine ("VM") or VM Guest 340, network or network node 345, database 350, database 355, and/or the like. The VM Guest 340 may include, but is not limited to, data 320d and behavior 325d (which in this case may include behavior H, or the like). Likewise, the network 345 may include, without limitation, data 320e and behavior 325e (which in this case may include behavior N, or the like). The database 350 (e.g., MongoDB, or the like) may include, but is not limited to, data 320f and behavior 325f (which in this case may include behavior P, or the like). Similarly, the database 355 (e.g., Apache Tomcat®, or the like) may include, without limitation, data 320g and behavior 325g (which in this case may include behavior Q, or the like).

In operation, in response to receiving, from a requesting device, a request to perform a web service function, a method call may be initiated for provisioning a web service function, which may include a DCL request to the OOIACP and which would involve the OOIACP using a run command to establish a class hierarchy of objects (e.g., OOIACP 305, Component Infrastructure 330, Workload 335, VM or VM guest 340, Network or Network Node 345, Database 350, and Database 355, or the like) based on the received request, such as shown in FIGS. 3A-3D. Each class and subclass within the class hierarchy may have one or more predefined class behaviors (i.e., behaviors A, B, C, D, G, H, N, P, and Q, or the like). Each subclass inherits class behaviors of classes to which it belongs and class behaviors of any intermediate subclasses, wherein each class behavior comprises a set of procedures associated with the request and with an object or instance of a corresponding class, the set of procedures configured to operate on said object or instance of the corresponding class. The DCL request may also involve the OOIACP using the run command to perform the requested web service function based on the initiated call to the IAC software tool of the OOIACP using the DCL request and based at least in part on the one or more system constraints, by identifying one or more classes within the class hierarchy associated with the requested web service function, initiating the set of procedures in each of the identified one or more classes, and returning results of the DCL request based on at least one of the initiated set of procedures or the identified one or more classes. The method call may further include converting the DCL request into a non-DCL result and sending the non-DCL result to the requesting device.

Figure 3A:
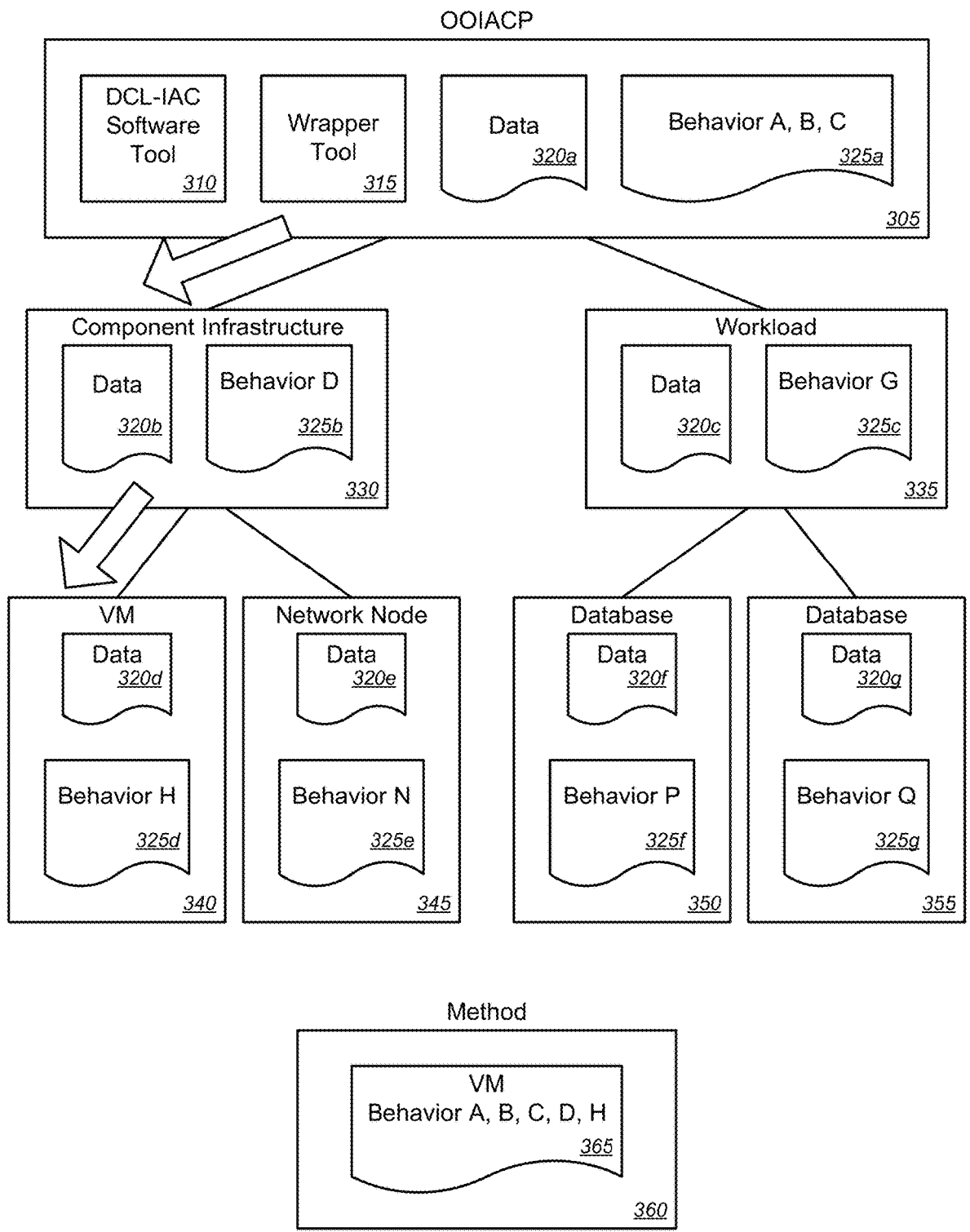
FIGS. 3A-3D are block diagrams illustrating a class hierarchy and implementation of various non-limiting examples of method calls using the OOIACP, in accordance with various embodiments.

For example, with reference to the non-limiting embodiment 300 of FIG. 3A, the method call for provisioning a web service function may include a method call 360 for provisioning a VM guest (e.g., VM or VM guest 340, or the like). As shown in FIG. 3A, the sub-class VM guest 340 inherits the class behaviors of classes to which it belongs—in this case, behaviors A, B, and C of class OOIACP 305 and behavior D of class Component Infrastructure 330. Here, the identified classes within the class hierarchy associated with the requested web service function includes OOIACP 305, Component Infrastructure 330, and VM guest 340, as depicted by arrows in FIG. 3A. As also shown in FIG. 3A, the method call 360 would result in the selected or identified sub-class VM guest 365 having cumulative class behaviors A, B, C, D, and H. The system then initiates the set of procedures corresponding to the cumulative class behaviors A, B, C, D, and H and corresponding to any other procedures in the identified classes OOIACP 305, Component Infrastructure 330, and VM guest 340. The system then returns the results of the DCL request, converting the DCL request into the non-DCL result, and sending the non-DCL result to the requesting device. This may involve also provisioning the VM guest 365.

Figure 3B:
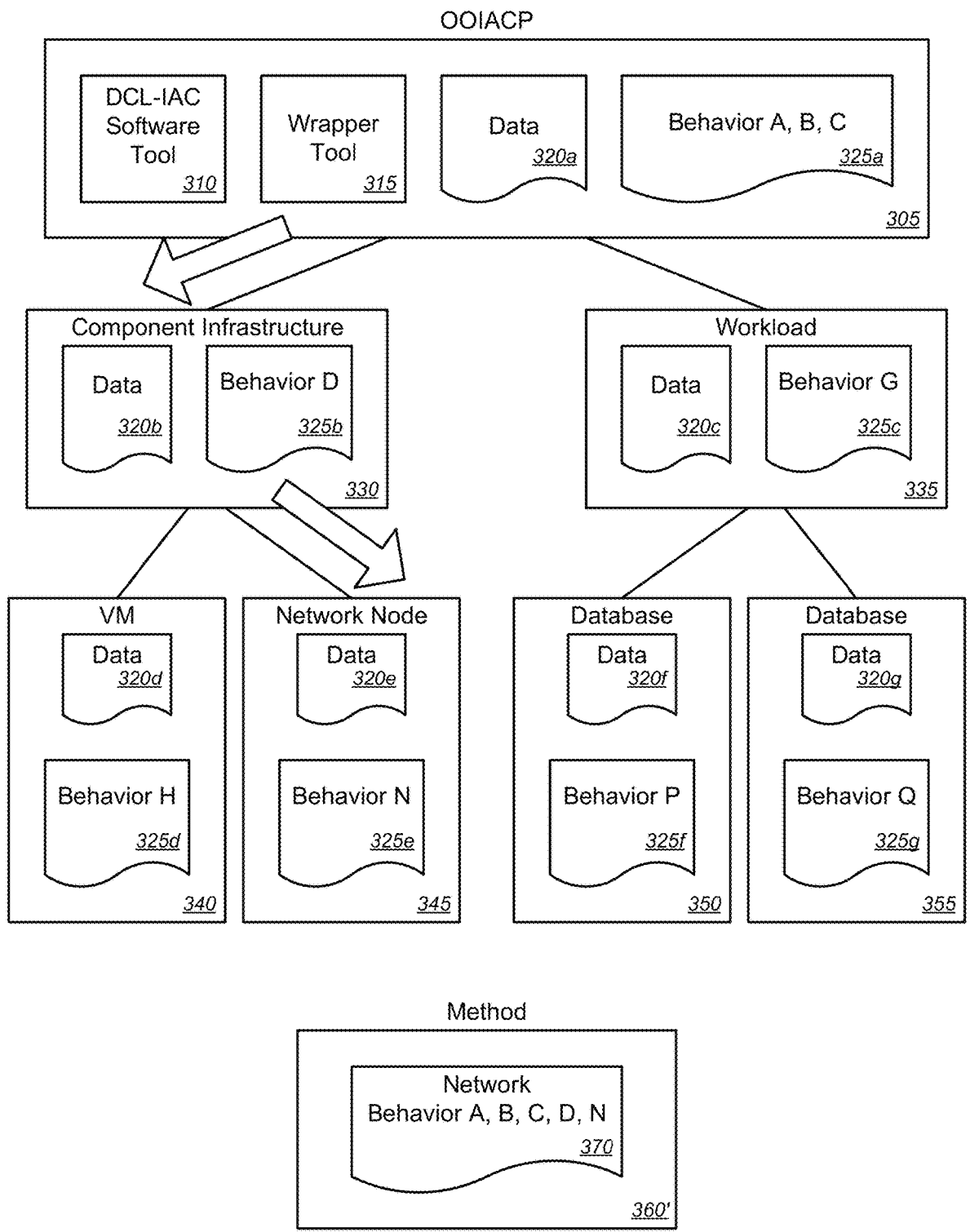

In another example, with reference to the non-limiting embodiment 300' of FIG. 3B, the method call for provisioning a web service function may include a method call 360' for provisioning a Network Node (e.g., Node or Network Node 345, or the like). As shown in FIG. 3B, the sub-class Network Node 345 inherits the class behaviors of classes to which it belongs—in this case, behaviors A, B, and C of class OOIACP 305 and behavior D of class Component Infrastructure 330. Here, the identified classes within the class hierarchy associated with the requested web service function includes OOIACP 305, Component Infrastructure 330, and Network Node 345, as depicted by arrows in FIG. 3B. As also shown in FIG. 3B, the method call 360' would result in the selected or identified sub-class Network Node 370 having cumulative class behaviors A, B, C, D, and N. The system then initiates the set of procedures corresponding to the cumulative class behaviors A, B, C, D, and N and corresponding to any other procedures in the identified classes OOIACP 305, Component Infrastructure 330, and Network Node 345. The system then returns the results of the DCL request, converting the DCL request into the non-DCL result, and sending the non-DCL result to the requesting device. This may involve also provisioning the Network Node 370.

Figure 3C:
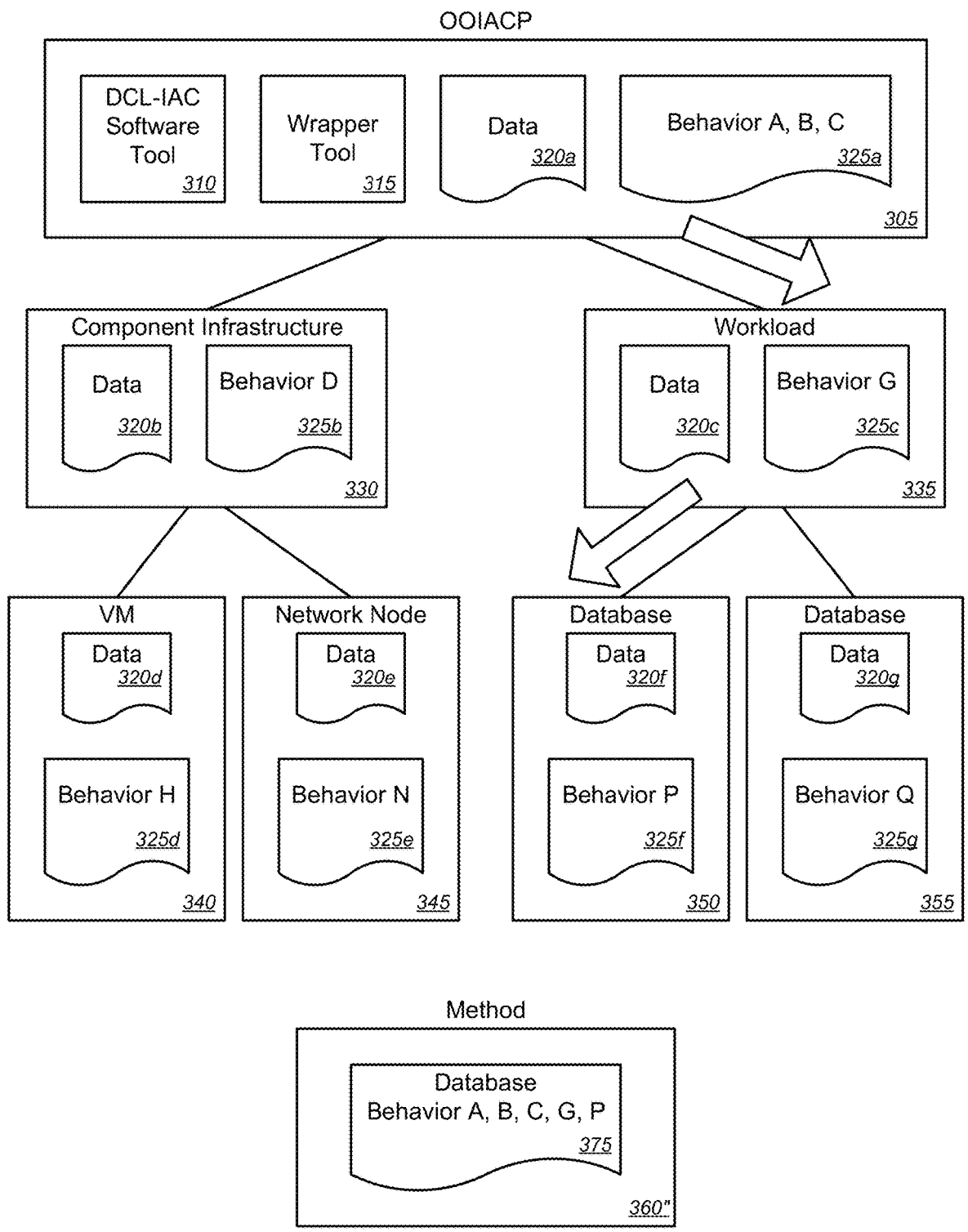

Alternatively, with reference to the non-limiting embodiment 300" of FIG. 3C, the method call for provisioning a web service function may include a method call 360" for provisioning a Database 350 (e.g., MongoDB, or the like). As shown in FIG. 3C, the sub-class Database 350 inherits the class behaviors of classes to which it belongs—in this case, behaviors A, B, and C of class OOIACP 305 and behavior G of class Workload 335. Here, the identified classes within the class hierarchy associated with the requested web service function includes OOIACP 305, Workload 335, and Database 350, as depicted by arrows in FIG. 3C. As also shown in FIG. 3C, the method call 360" would result in the selected or identified sub-class Database 375 having cumulative class behaviors A, B, C, G, and P. The system then initiates the set of procedures corresponding to the cumulative class behaviors A, B, C, G, and P and corresponding to any other procedures in the identified classes OOIACP 305, Workload 335, and Database 350. The system then returns the results of the DCL request, converting the DCL request into the non-DCL result, and sending the non-DCL result to the requesting device. This may involve also provisioning the Database 375.

Figure 3D:
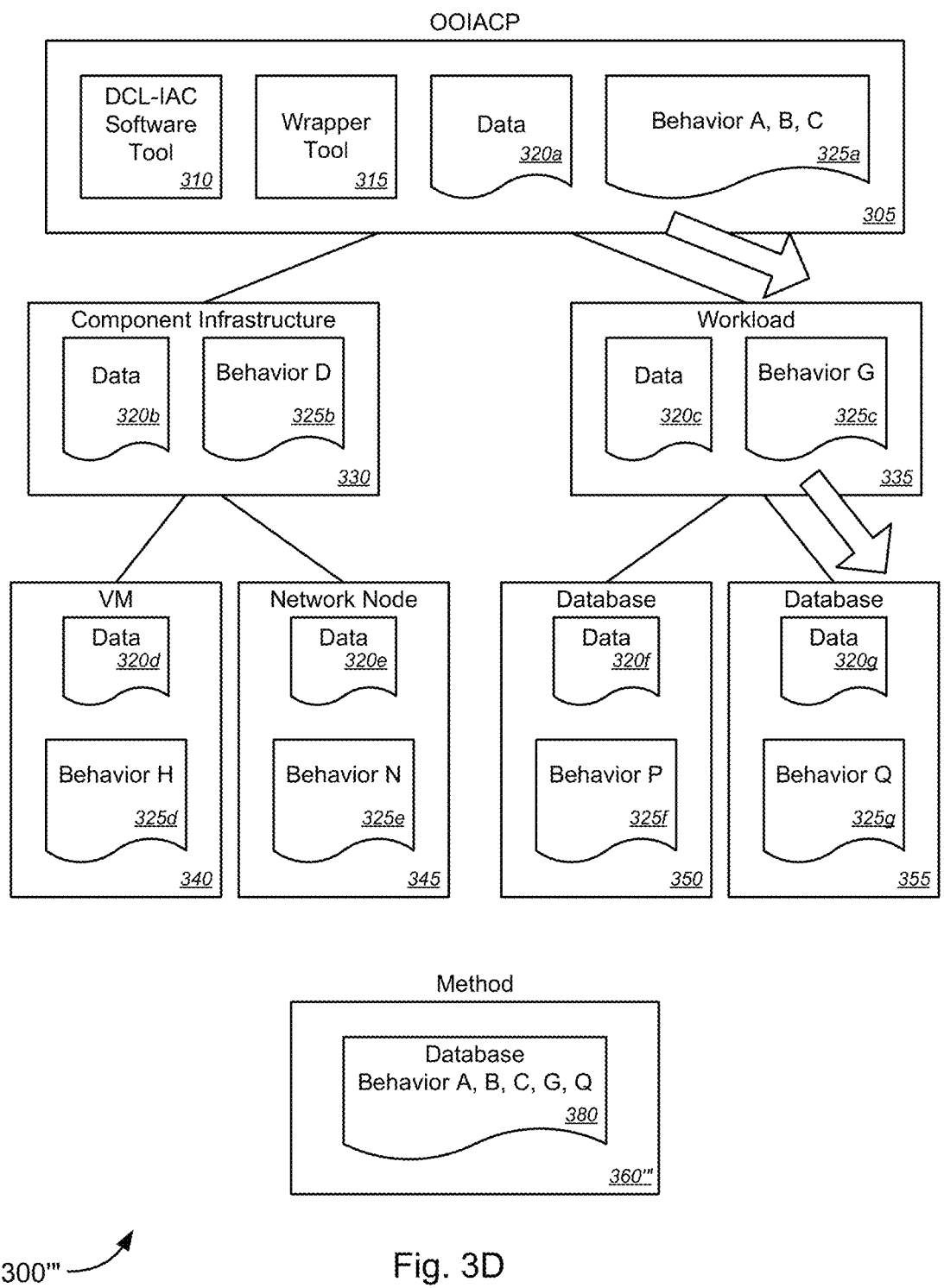

For instance, with reference to the non-limiting embodiment 300''' of FIG. 3D, the method call for provisioning a web service function may include a method call 360''' for provisioning a Database 355 (e.g., Apache Tomcat®, or the like). As shown in FIG. 3D, the sub-class Database 355 inherits the class behaviors of classes to which it belongs—in this case, behaviors A, B, and C of class OOIACP 305 and behavior G of class Workload 335. Here, the identified classes within the class hierarchy associated with the requested web service function includes OOIACP 305, Workload 335, and Database 355, as depicted by arrows in FIG. 3D. As also shown in FIG. 3D, the method call 360''' would result in the selected or identified sub-class Database 380 having cumulative class behaviors A, B, C, G, and Q. The system then initiates the set of procedures corresponding to the cumulative class behaviors A, B, C, G, and Q and corresponding to any other procedures in the identified classes OOIACP 305, Workload 335, and Database 355. The system then returns the results of the DCL request, converting the DCL request into the non-DCL result, and sending the non-DCL result to the requesting device. This may involve also provisioning the Database 380.

Figure 4A:
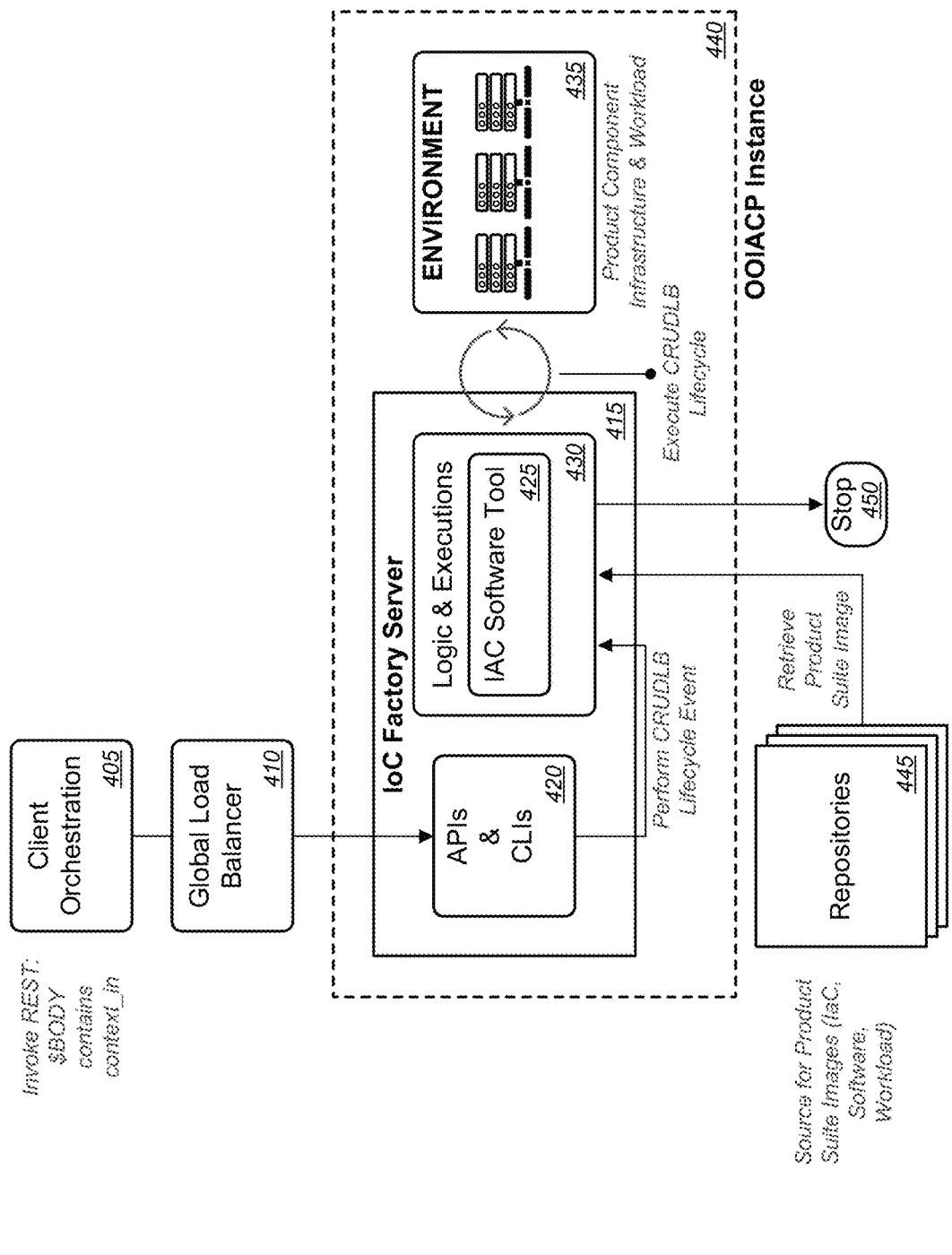
FIGS. 4A and 4B are schematic diagrams illustrating various non-limiting examples of implementation of IoC factory servers in the context of implementing OOIACP and its functionalities, in accordance with various embodiments.
Figure 4B:
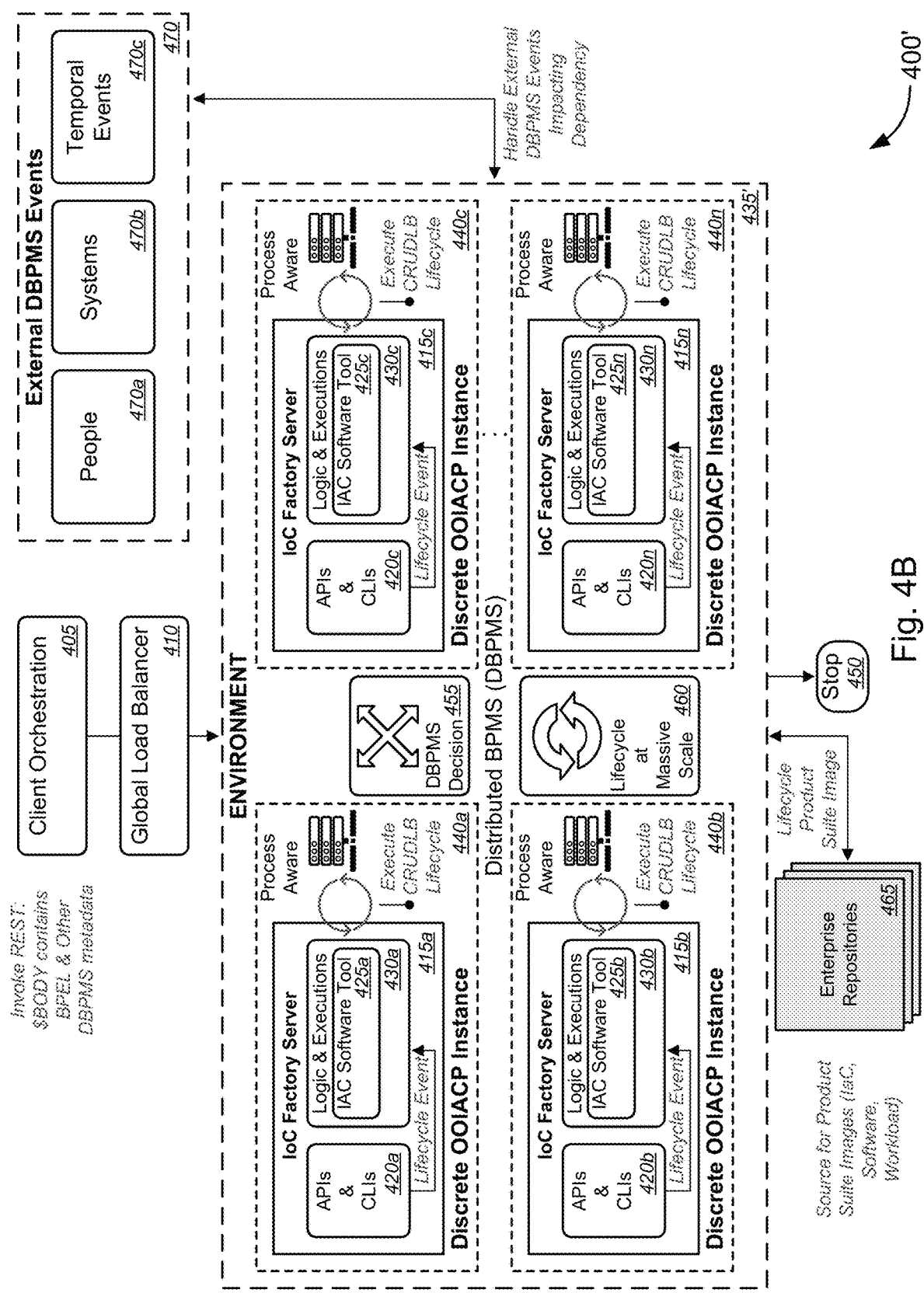

FIGS. 4A and 4B (collectively, "FIG. 4") are schematic diagrams illustrating various non-limiting examples 400 and 400' of implementation of IoC factory servers in the context of implementing OOIACP and its functionalities, in accordance with various embodiments.

With reference to the non-limiting example 400 of FIG. 4A, client orchestration 405 may invoke a representational state transfer ("REST") call to an IoC Factory Server 415 via global load balancer 410 (in some cases, with $BODY containing "context_in," or the like). IoC Factory Server 415 may include, without limitation, one or more application programming interfaces ("APIs") and/or one or more command line interfaces ("CLIs") 420, IAC software tool 425, and a logic and executions system 430. In some embodiments, the REST call may include one of an API call or a CLI call, or the like. The IAC software tool 425 of the logic and executions system 430 may perform a create, read/retrieve, update, delete, list, and batch ("CRUDLB") lifecycle event via APIs and/or CLIs 420, may retrieve product suite image from repositories 445 (similar to repositories 216 of FIG. 2, or the like; which may be a source of product suite images including, but not limited to, IaC, software, and workload, or the like), may execute CRUDLB lifecycle by communicating with Environment 435 (which may include product component infrastructure and workload, or the like). The IoC Factory Server 415 and Environment 435 may be part of an OOIACP instance 440. In some cases, after executing the CRUDLB lifecycle event, the process may stop (at block 450).

Referring to the non-limiting example 400' of FIG. 4B, client orchestration 405 may invoke a REST call to one or more discrete OOIACP instances 440a-440n (collectively, "OOIACP instances 440" or the like) using a distributed business process management system ("DBPMS") engine platform (and not necessarily a single central BPMS engine) within Environment 435' via global load balancer 410 (in some cases, with $BODY containing business process execution language ("BPEL") and/or other DBPMS metadata, or the like). The one or more discrete OOIACP instances 440 may include one or more IoC Factory Servers 415a-415n (collectively, "IoC Factory Servers 415" or the like). For instance, each discrete OOIACP instance 440 (e.g., OOIACP instance 440a, or the like) may include an IoC Factory Server 415 (e.g., IoC Factory Server 415a, or the like). Each IoC Factory Server 415 (e.g., one of IoC Factory Servers 415a-415n, or the like) may include, but is not limited to, one or more APIs and/or one or more CLIs 420 (e.g., one set of APIs and/or CLIs 420a-420n, or the like), IAC software tool 425 (e.g., one of IAC software tools 425a-425n, or the like), and a logic and executions system 430 (e.g., one of logic and executions systems 430a-430n, or the like). The DBPMS engine platform may implement DBPMS decision(s) 455 that include calling each distributed BPMS runnable nodes (in this case, each discrete OOIACP instance 440, or the like) to implement lifecycle event(s) at massive scale 460 with each called distributed BPMS runnable node executing CRUDLB lifecycle events, in some cases, retrieving lifecycle product suite image(s) from enterprise repositories 465 (similar to enterprise repositories 218 of FIG. 2, or the like; which may be a source of product suite images including, but not limited to, IaC, software, and workload, or the like), and/or handling external DBPMS events 470 (include people 470a, systems 470b, and/or temporal events 470c, or the like) that may impact dependency. In some cases, after executing the CRUDLB lifecycle events at massive scale, the process may stop (at block 450).

In some aspects, the various embodiments may provide a mechanism of dependency embodied in BPMS and described in BPEL or business process model and notation ("BPMN"), or the like, that may include human, system, and/or temporal events with cardinality impacting these dependencies over and above native Terraform dependency mechanisms (which may order localized IAC resources, or the like) in order to lifecycle IAC at massive scale. In some embodiments, this may use BPEL as the passed-around artifact between runnable nodes that as a set represent the DBPMS engine platform itself, which may now be process-aware nodes configured to act as part of the DBPMS engine platform rather than simply as endpoints of operation called from an otherwise heavily centralized BPMS engine. Rather than some BPMS engine performing calls to one then another node, the DBPMS runnable nodes may call each other in the described process sequence as the process is implemented. In this case, no single central BPMS engine is used. Likewise, categories of operation may exist so as to migrate tasks to the candidate list of runnable nodes best suited to lifecycle the IAC in that task.

The DBPMS may achieve massive scale in all respects that is pertinent to the IAC lifecycle use case through enhancing traditional Terraform singular dependency schemes on aggregate IAC by instead enveloping IAC with a BPMS based scheme allowing unlimited dependency that now includes Human/System/Temporal events in the lifecycle of discrete IAC. According to some embodiments, the architecture may include a non-centralized engine (e.g., a DBPMS engine platform, instead of a traditional BPMS engine, or the like), a non-commercial off-the-shelf ("non-COTS") system (and thus do not require a license, or the like), the DBPMS engine platform including one or more runnable nodes handling BPMS events and/or services, one or more finite state machines ("FSMs") (e.g., FSM of Terraform and Mongo instances) that may become the runnable nodes hosting the given task, subject-based multicast ("SBM") system for all communications between runnable nodes (in some cases, using an N-ary broadcast approach rather than a peer-to-peer ("P2P") approach, or the like), one or more components (e.g., Mongo components, FSM components, etc.), one or more gateway load balancing ("GLB") interfaces, one or more documents, and/or the like.

In some cases, the FSM may include Mongo initial entry point, which may be "smart" for higher order BPEL operation (e.g., managing events and exceptions, parallel flows of process execution, transaction rollback, or the like), while FSM may be "dumb" to simply enact IAC events that it receives (e.g., IAC events with notification of start and completion, etc.). In some instances, the multicast system may address "trunks" events using physical bands, while the FSM and/or Mongo may express subject interest (creating a logical "circuit" off trunks to route message last mile for best network economy, etc.), with set forms (e.g., subject=logical set/circuit; multicast service=physical band; multicast network=physical scope; multicast daemon=physical connection point; etc.; where DEST can include specific instance of runnable node or category of nodes selected per best metric experienced, etc.). In some cases, the Mongo components may include a database (e.g., container of data and higher order behavior for DBPMS engine instance, with a collection(s) including a container(s) for state for DBPMS running process (one document per process) and a document(s) including a container(s) for discrete process of orchestration (e.g., described in BPEL, or the like) and metadata beyond the container(s) to facilitate DBPMS, etc.) and a spring layer above state to implement higher order behavior of DBPMS actions. In some instances, the FSM components may include an OOIACP(s) and a spring layer above the OOIACP(s) to implement lower order behavior of DBPMS actions. In some cases, the GLB may interface to an initial Mongo node(s) of DBPMS to best place respective to client invoking and to set criteria for an initial event(s) that kicks off orchestration (in some cases, with Mongo being a first node task, or the like). Documents (e.g., BPEL process, or the like) may migrate per ongoing metrics to optimize Mongo instances and/or FSM instances (in some cases, determined by Mongo instances, or the like) when a category is used in subject name, or the like. FSM may dump events into a job file(s) and may automatically process with no ability to migrate events.

A non-limiting example event may include: (1) a BPMS process instance being initiated by a client to GLB containing BPEL definition (e.g., in XML, or the like) and DBPMS metadata (e.g., in JSON, or the like) to optimize runnable nodes (e.g., optimal Mongo runnable nodes, or the like), based on past experience, or the like; (2) a Mongo runnable node may enact BPMS process sequence and may multicast out selecting best metric response from other Mongo nodes associated with a target or a category of target; (3) a BPEL document may transfer to said Mongo node and may be used thereafter per metric for process type in that part of the process; (4) the Mongo node may sent to selected target for tasks; (5) target or category of target destination may perform tasks and may acknowledge completion and next steps in multicast, or the like; and (6) the next runnable node may select or determine if the next runnable node in sequence and dependency traversal may continue.

Figure 5A:
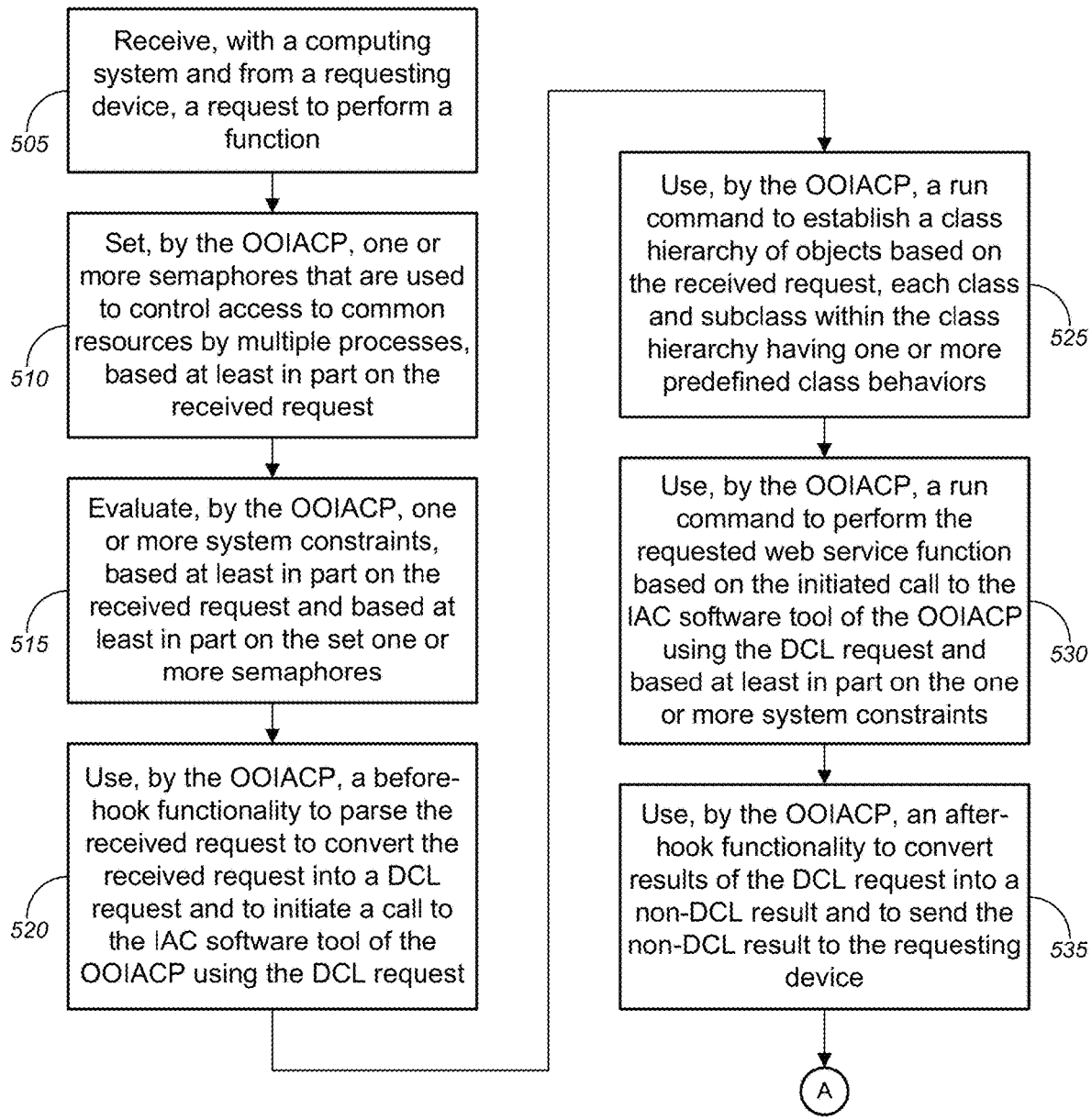
FIGS. 5A-5C are flow diagrams illustrating a method for implementing OOIACP and its functionalities, in accordance with various embodiments.
Figure 5B:
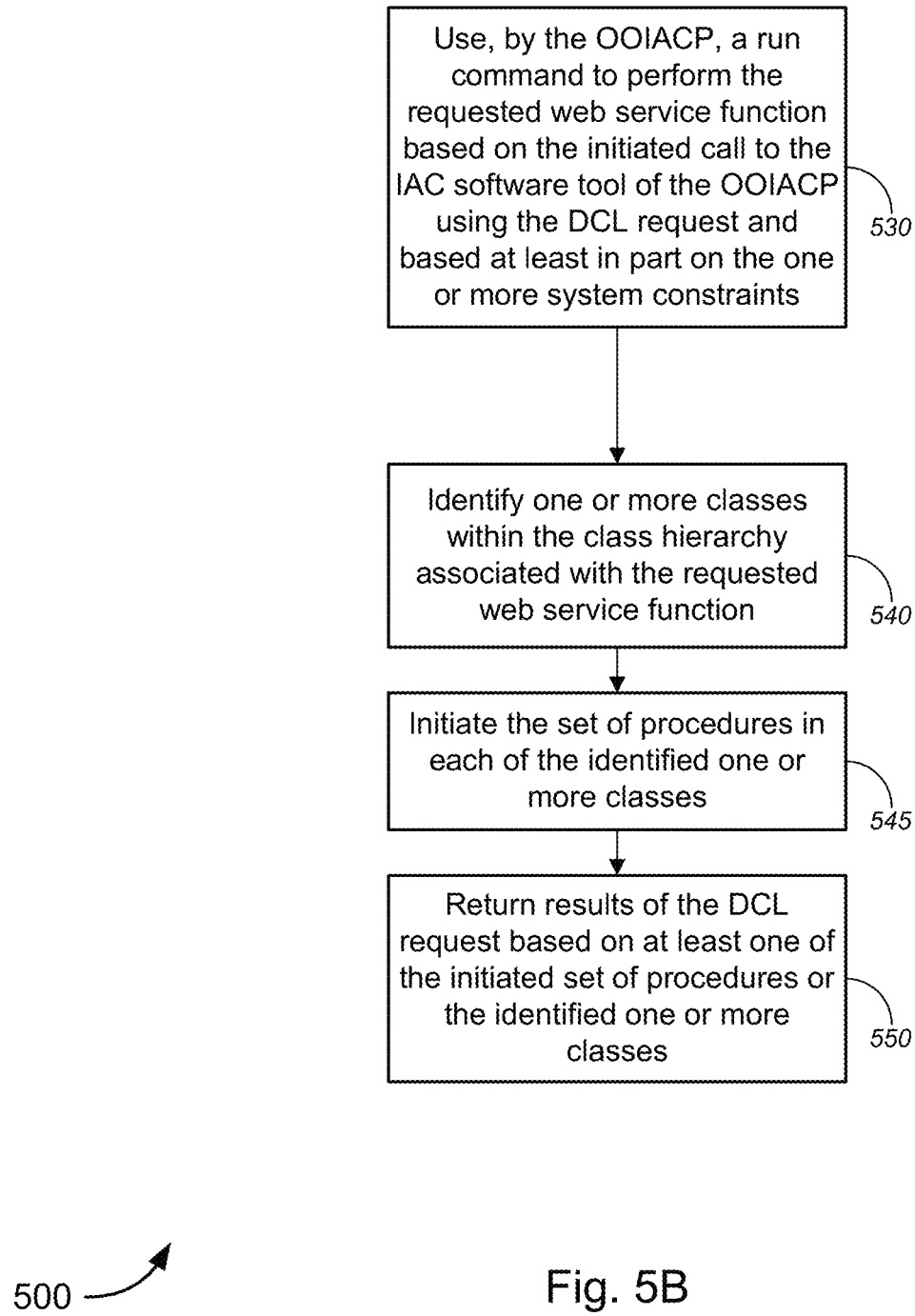
Figure 5C:
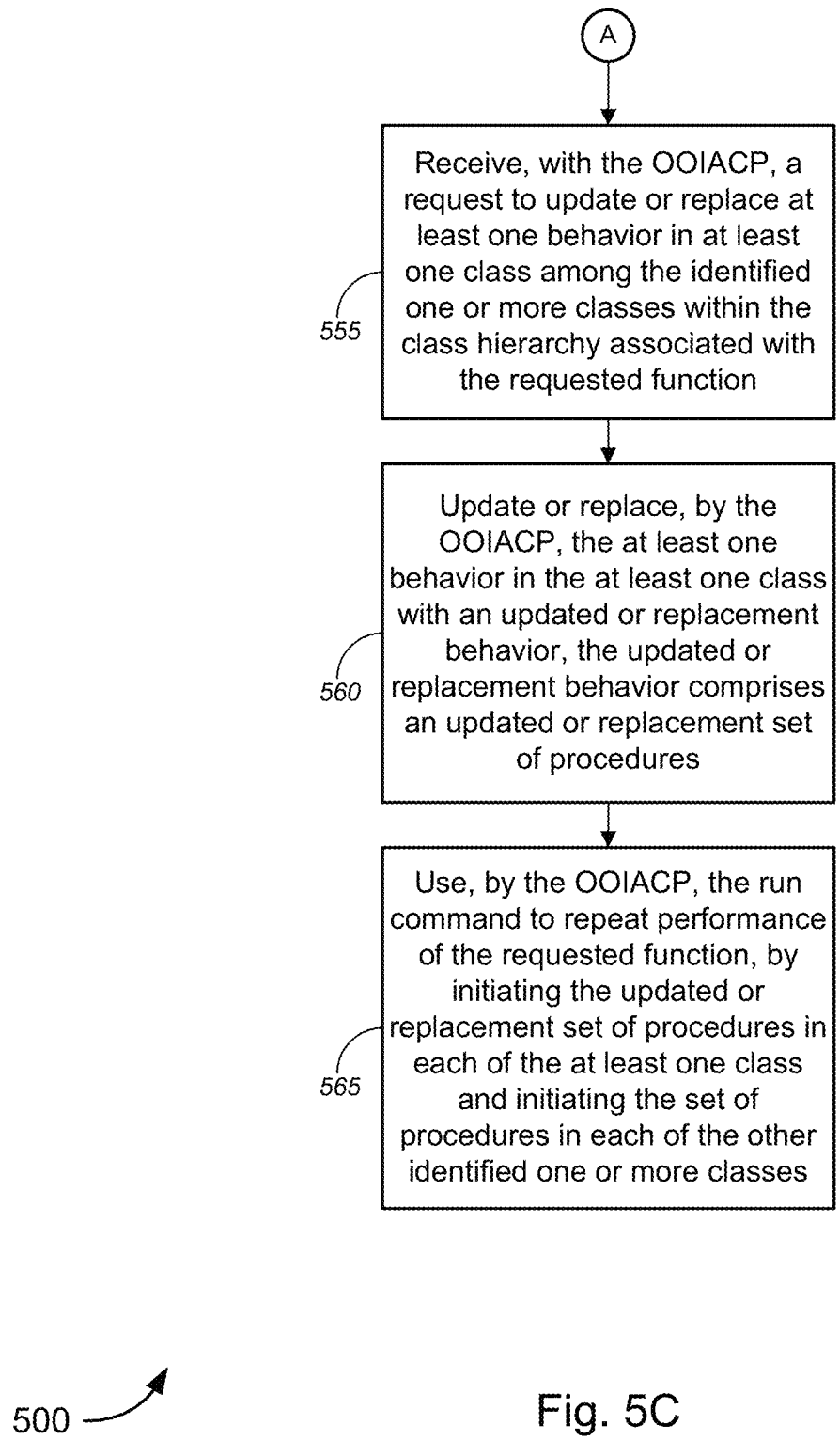

FIGS. 5A-5C (collectively, "FIG. 5") are flow diagrams illustrating a method 500 for implementing OOIACP and its functionalities, in accordance with various embodiments. Method 500 of FIG. 5A continues onto FIG. 5C following the circular marker denoted, "A."

While the techniques and procedures are depicted and/or described in a certain order for purposes of illustration, it should be appreciated that certain procedures may be reordered and/or omitted within the scope of various embodiments. Moreover, while the method 500 illustrated by FIG. 5 can be implemented by or with (and, in some cases, are described below with respect to) the systems, examples, or embodiments 100, 200, 300, 300', 300", 300'", 400, and 400' of FIGS. 1, 2, 3A, 3B, 3C, 3D, 4A, and 4B, respectively (or components thereof), such methods may also be implemented using any suitable hardware (or software) implementation. Similarly, while each of the systems, examples, or embodiments 100, 200, 300, 300', 300", 300'", 400, and 400' of FIGS. 1, 2, 3A, 3B, 3C, 3D, 4A, and 4B, respectively (or components thereof), can operate according to the method 500 illustrated by FIG. 5 (e.g., by executing instructions embodied on a computer readable medium), the systems, examples, or embodiments 100, 200, 300, 300', 300", 300'", 400, and 400' of FIGS. 1, 2, 3A, 3B, 3C, 3D, 4A, and 4B can each also operate according to other modes of operation and/or perform other suitable procedures.

In the non-limiting embodiment of FIG. 5A, method 500, at block 505, may comprise receiving, with a computing system and from a requesting device, a request to perform a function. In some cases, the request to perform the function may comprise a request to perform a web service function. Alternatively, or additionally, the request to perform function may comprise one of an operational call or a lifecycle call. Alternatively, or additionally, the request to perform the function comprises one of an application programming interface ("API") call or a command line interface ("CLI") call.

According to some embodiments, the computing system may comprise an object-oriented infrastructure-as-code platform ("OOIACP"). In some instances, the OOIACP may include, without limitation, a declarative configuration language ("DCL")-based infrastructure-as-code ("IAC") software tool that provides structure and data functionalities and a wrapper tool that provides algorithm and sequence functionalities to the IAC software tool to convert the IAC software tool into an object-oriented programming ("OOP")-based IAC system.

At block 510, method 500 may comprise setting, by the OOIACP, one or more semaphores that are used to control access to common resources by multiple processes, based at least in part on the received request. As described above, a semaphore is a variable that is used to control access to a common resource and/or to achieve process synchronization in a multi-process environment.

Method 500 may further comprise, at block 515, evaluating, by the OOIACP, one or more system constraints, based at least in part on the received request and based at least in part on the set one or more semaphores. Also as described above, the system constraints may include, without limitation, role based access control ("RBAC")-based constraints, policy-based constraints, and/or the like.

Method 500 may further comprise using, by the OOIACP, a before-hook functionality to parse the received request to convert the received request into a DCL request and to initiate a call to the IAC software tool of the OOIACP using the DCL request (block 520).

At block 525, method 500 may comprise using, by the OOIACP, a run command to establish a class hierarchy of objects based on the received request, each class and subclass within the class hierarchy having one or more predefined class behaviors. Each subclass inherits class behaviors of classes to which it belongs and class behaviors of any intermediate subclasses. Each class behavior may include, but is not limited to, a set of procedures associated with the request and with an object or instance of a corresponding class, the set of procedures configured to operate on said object or instance of the corresponding class.

Method 500, at block 530, may comprise using, by the OOIACP, a run command to perform the requested web service function based on the initiated call to the IAC software tool of the OOIACP using the DCL request and based at least in part on the one or more system constraints. With reference to FIG. 5B, using the run command to perform the requested web service function (at block 530) may comprise using, by the OOIACP, a run command to perform the requested web service function, by identifying one or more classes within the class hierarchy associated with the requested web service function (block 540), initiating the set of procedures in each of the identified one or more classes (block 545), and returning results of the DCL request based on at least one of the initiated set of procedures or the identified one or more classes (block 550).

At block 535, method 500 may comprise using, by the OOIACP, an after-hook functionality to convert results of the DCL request into a non-DCL result and to send the non-DCL result to the requesting device. Method 500 might continue onto the process at optional block 555 in FIG. 5C following the circular marker denoted, "A."

At optional block 555 in FIG. 5C (following the circular marker denoted, "A"), method 500 might comprise receiving, with the OOIACP, a request to update or replace at least one behavior in at least one class among the identified one or more classes within the class hierarchy associated with the requested function. Method 500, at block 560, may comprise updating or replacing, by the OOIACP, the at least one behavior in the at least one class with an updated or replacement behavior, the updated or replacement behavior comprising an updated or replacement set of procedures. Method 500 may further comprise, at block 565, using, by the OOIACP, the run command to repeat performance of the requested function, by initiating the updated or replacement set of procedures in each of the at least one class and initiating the set of procedures in each of the other identified one or more classes.

Figure 6A:
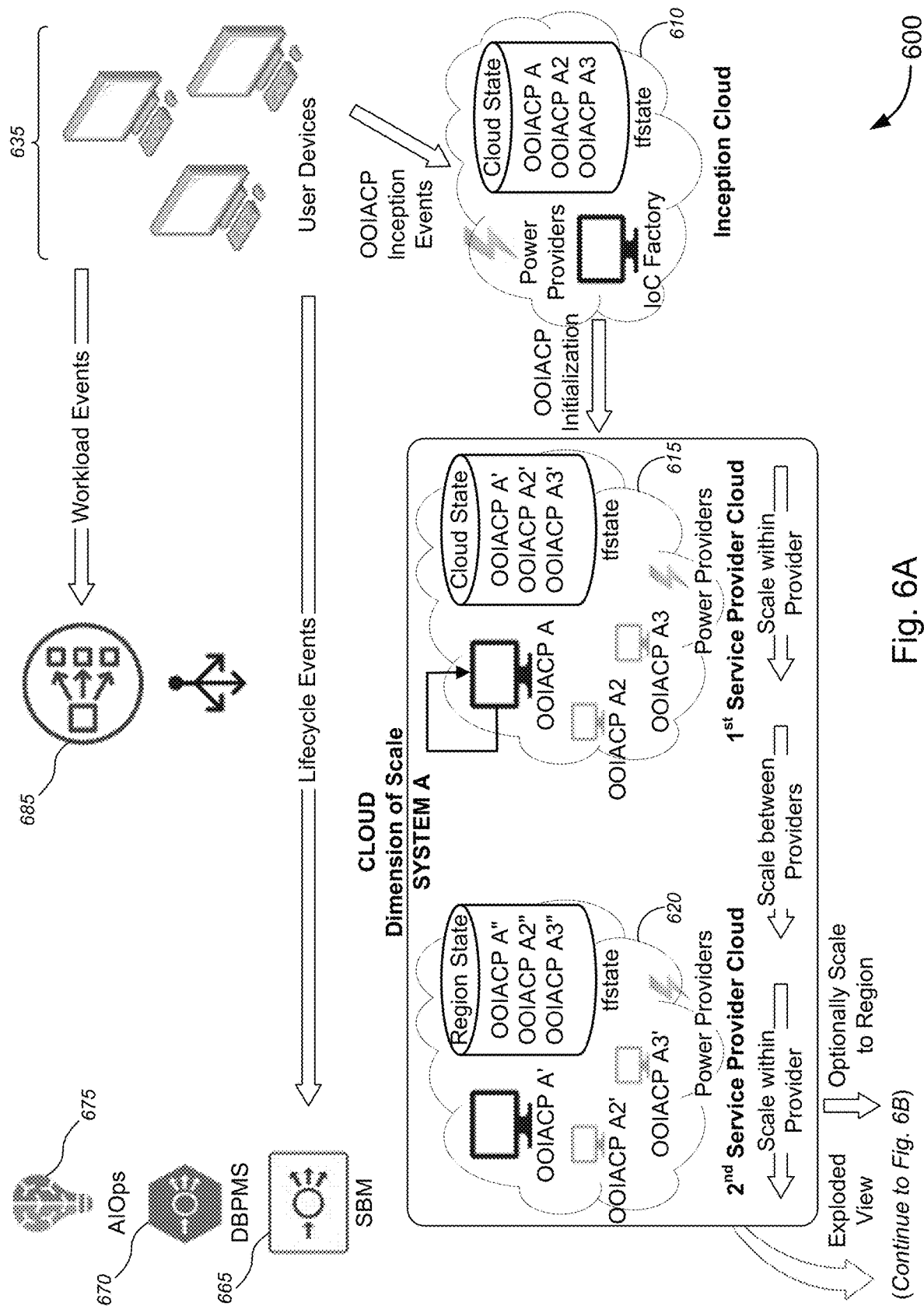
FIGS. 6A-6C are schematic diagrams illustrating a system for implementing OOIACP initialization and implementing selection and scaling of OOIACP instances for processing lifecycle events and workload events, in accordance with various embodiments.
Figure 6B:
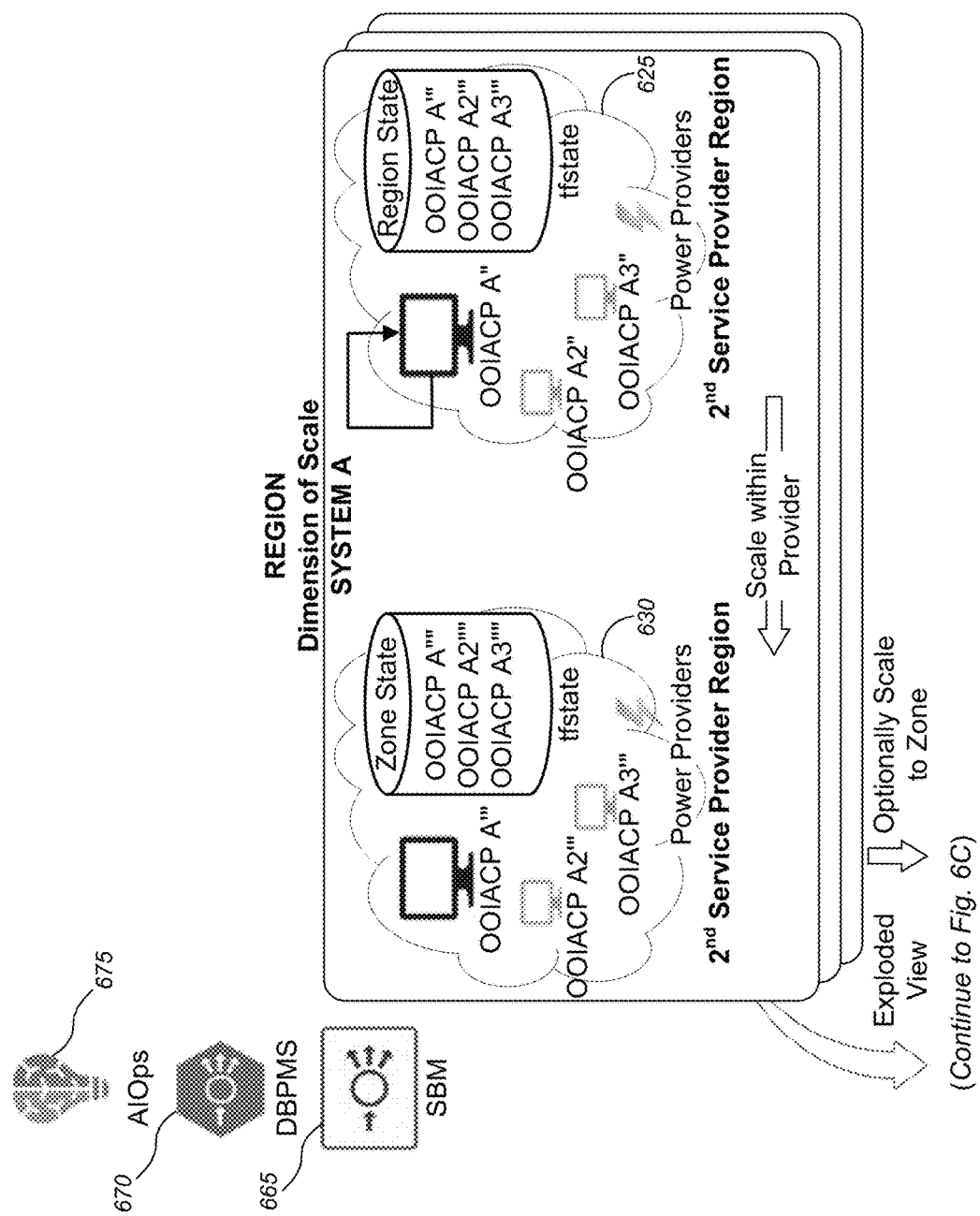
Figure 6C:
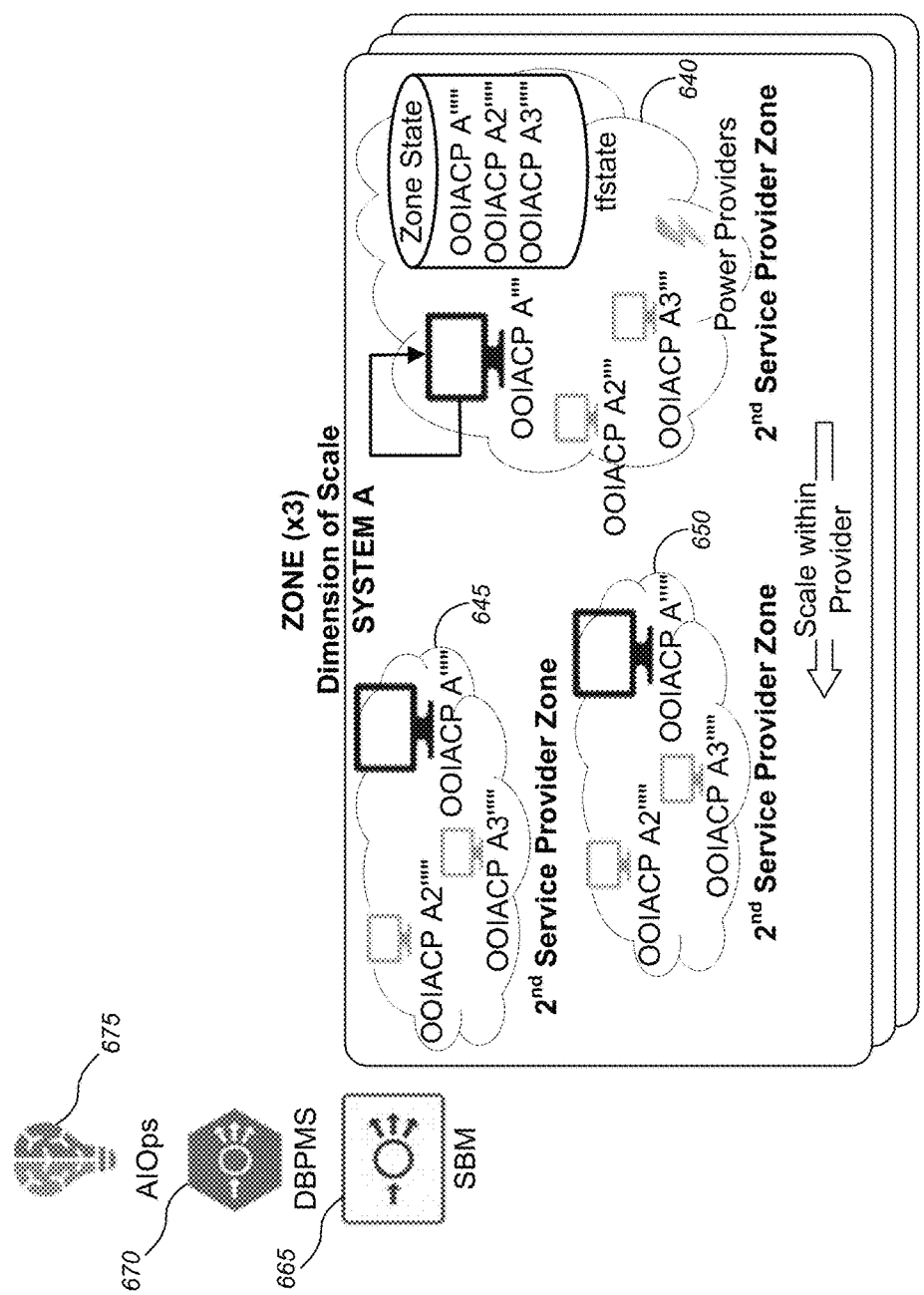

FIGS. 6A-6C (collectively, "FIG. 6") are schematic diagrams illustrating a system 600 for implementing OOIACP initialization and implementing selection and scaling of OOIACP instances for processing lifecycle events and workload events, in accordance with various embodiments.

With reference to FIG. 6A, in some embodiments, a user device(s) 635 among a plurality of user devices (similar to requesting device(s) 135a-135n of FIG. 1, or the like) may send OOIACP inception events to inception cloud 610, which may include, without limitation, an IoC factory(ies), one or more first power providers, and/or a first database(s) that may store one or more first tfstate files (as described above) that may be used to initiate and/or initialize one or more first OOIACP instances of a cloud state. In some cases, the IoC factory(ies) may initiate and/or initialize a plurality of OOIACP instances at any suitable dimension of scale (including, but not limited to, cloud, region, zone, workspace, and/or state dimensions of scale, or the like), in some cases, using the one or more first power providers.

For example, at the cloud dimension of scale, in system A, one or more first OOIACP instances (in this case, OOIACP A, OOIACP A2, OOIACP A3, and/or the like) may be initiated and/or initialized within cloud network, cloud space, or provider cloud 615 of a first service provider (as shown, e.g., in FIG. 6A, or the like), in some cases, at a workspace instance dimension of scale (e.g., with preselected, regular expression ("regex"), and/or meta characters, etc.). The provider cloud 615 of the first service provider may include one or more first OOIACP instances (e.g., OOIACP A, OOIACP A2, OOIACP A3, and/or the like), one or more second power providers, and/or a second database(s) that may store one or more second tfstate files that may be used to initiate and/or initialize one or more second OOIACP instances (in this case, OOIACP A', OOI-ACP A2', OOIACP A3', and/or the like) within cloud network, cloud space, or provider cloud 620 of a second service provider (as shown, e.g., in FIG. 6A, or the like). In some cases, the provider cloud 620 of the second service provider may include one or more second OOIACP instances (e.g., OOIACP A', OOIACP A2', OOIACP A3', and/or the like), one or more third power providers, and/or a third database(s) that may store one or more third tfstate files that may be used to initiate and/or initialize one or more third OOIACP instances (in this case, OOIACP A", OOIACP A2", OOI-ACP A3", and/or the like) within network region 625 of the second service provider (as shown, e.g., in FIG. 6B, or the like). The OOIACP instances may be scaled (in some cases, at a massive scale of dozens, scores, hundreds, thousands, millions, or more) within the provider cloud 615, within the provider cloud 620, or between provider clouds 615 and 620, or the like. In some cases, the system may scale to pre-selected, regex, and/or meta characters or to a computed region (or default dimension of scale) within the provider network, or the like. In the non-limiting example of FIG. 6A, and as shown by the downward arrows, the provider cloud 620 may optionally scale to the region dimension of scale, as shown, e.g., in exploded view in FIG. 6B.

As shown in FIG. 6B, at the region dimension of scale, in system A, one or more third OOIACP instances (e.g., OOIACP A", OOIACP A2", OOIACP A3", and/or the like) may be initiated and/or initialized within the network region 625 of the second service provider (as shown, e.g., in FIG. 6B, or the like), in some cases, at a workspace instance dimension of scale (e.g., with pre-selected, regex, and/or meta characters, etc.). The network region 625 of the second service provider may include the one or more third OOIACP instances (e.g., OOIACP A", OOIACP A2", OOIACP A3", and/or the like), one or more fourth power providers, and/or a fourth database(s) that may store one or more fourth tfstate files that may be used to initiate and/or initialize one or more fourth OOIACP instances (in this case, OOIACP A''', OOI-ACP A2''', OOIACP A3''', and/or the like) within network region 630 of the second service provider (as shown, e.g., in FIG. 6B, or the like). In some cases, the network region 630 of the second service provider may include one or more fourth OOIACP instances (in this case, OOIACP A''', OOI-ACP A2''', OOIACP A3''', and/or the like), one or more fifth power providers, and/or a fifth database(s) that may store one or more fifth tfstate files that may be used to initiate and/or initialize one or more fifth OOIACP instances (in this case, OOIACP A'''', OOIACP A2'''', OOIACP A3'''', and/or the like) within network zone 635 of the second service provider (as shown, e.g., in FIG. 6C, or the like). The OOIACP instances may be scaled (in some cases, at a massive scale of dozens, scores, hundreds, thousands, millions, or more) within the network regions 625 and/or 630, or the like. In some cases, the system may scale to pre-selected, regex, and/or meta characters or to a computed region (or default dimension of scale) within the provider network, or the like. In the non-limiting example of FIG. 6B, and as shown by the downward arrows, the network region 630 may optionally scale to the zone dimension of scale, as shown, e.g., in exploded view in FIG. 6C.

As shown in FIG. 6C, at the zone dimension of scale, in system A, one or more fifth OOIACP instances (in this case, OOIACP A'''', OOIACP A2'''', OOIACP A3'''', and/or the like) may be initiated and/or initialized within the network zones 640, 645, and/or 650 of the second service provider (as shown, e.g., in FIG. 6C, or the like), in some cases, at a workspace instance dimension of scale (e.g., with pre-selected, regex, and/or meta characters, etc.). The network zone 640 of the second service provider may include the one or more fifth OOIACP instances (e.g., OOIACP A'''', OOI-ACP A2'''', OOIACP A3'''', and/or the like), one or more sixth power providers, and/or a sixth database(s) that may store one or more sixth tfstate files that may be used to initiate and/or initialize one or more sixth OOIACP instances (in this case, OOIACP A'''''', OOIACP A2'''''', OOIACP A3'''''', and/or the like) within each of network zones 645 and 650 of the second service provider (as shown, e.g., in FIG. 6C, or the like). In some cases, each of network zones 645 and 650 of the second service provider may include one or more sixth OOIACP instances (e.g., OOIACP A'''''', OOIACP A2'''''', OOIACP A3'''''', and/or the like). The OOIACP instances may be scaled (in some cases, at a massive scale of dozens, scores, hundreds, thousands, millions, or more) within the network zones 640, 645, and/or 650, or the like.

Turning back to the non-limiting example of FIG. 6A, when a request to process one or more lifecycle events is received from the user devices 635, at least one of a SBM system 665 (similar to SBM system 165 of FIG. 1, or the like), a DBPMS engine platform 670 (similar to DBPMS engine platform 675, or the like), or an AIOps system 675 (similar to AIOps system 175 of FIG. 1, or the like), and/or the like, may perform the following set of tasks: selecting and scaling across a first plurality of OOIACP instances, among the first, second, third, fourth, fifth, and/or sixth OOIACP instances for processing the one or more lifecycle events; and causing the selected first plurality of OOIACP instances to process the one or more lifecycle events, each such OOIACP instance instantiating component infrastructure among a plurality of component infrastructure to process at least one lifecycle event among the one or more lifecycle events concurrently and independently of other such OOIACP instances, the first plurality of OOIACP instances being located within the environment in which the plurality of component infrastructure is located (in this case, provider clouds 615 and/or 620, network regions 625 and/or 630, and/or network zones 635, 645, and/or 650, or the like). In some instances, the AIOps system 675 may provide non-deterministic operational workflow to process the one or more lifecycle events, while the DBPMS engine platform 670 may provide deterministic business lifecycle workflow to process the one or more lifecycle events. In some examples, the SBM system 665 may provide subject matter multicasting of the request to the first plurality of OOIACP instances, in some cases, using current subscriptions that mirror resident Terraform® Workspaces at any point in time including cross cutting subscriptions. For cross cutting OOI-ACP concern events, subject matter multicast may be used to event in the publication/subscription ("pub/sub") system, to request or reply to any spot in the dimension of scale hierarchy including to individual workspaces. The OOIACP platform provides elasticity within dimensions of scale, including, but not limited to, cloud, region, zone, workspace, cluster, set, instance, me, etc. In some cases, the OOIACP platform may optionally lifecycle target (via its respective workspace) at any dimension of scale.

When a request to process one or more workload events is received from the user devices 635, global load balancer 685 may perform the following set of tasks: selecting and scaling across a second plurality of OOIACP instances, among the first, second, third, fourth, fifth, and/or sixth OOIACP instances for processing the one or more workload events; and causing the selected second plurality of OOIACP instances to process the one or more workload events, each such OOIACP instance instantiating workload resources among a plurality of workload resources to process at least one workload event among the one or more workload events concurrently and independently of other such OOIACP instances, the second plurality of OOIACP instances being located within the environment in which the plurality of component infrastructure and the plurality of workload resources are located (in this case, provider clouds 615 and/or 620, network regions 625 and/or 630, and/or network zones 635, 645, and/or 650, or the like). In some cases, the first and second plurality of OOIACP instances may be the same plurality of OOIACP instances. In other cases, the first and second plurality of OOIACP instances may be different sets of OOIACP instances (either with some OOIACP instances being the same between the two sets while others are different, or with no overlap of OOIACP instances (i.e., no same OOIACP instances) across the two sets, or the like).

Figure 7A:
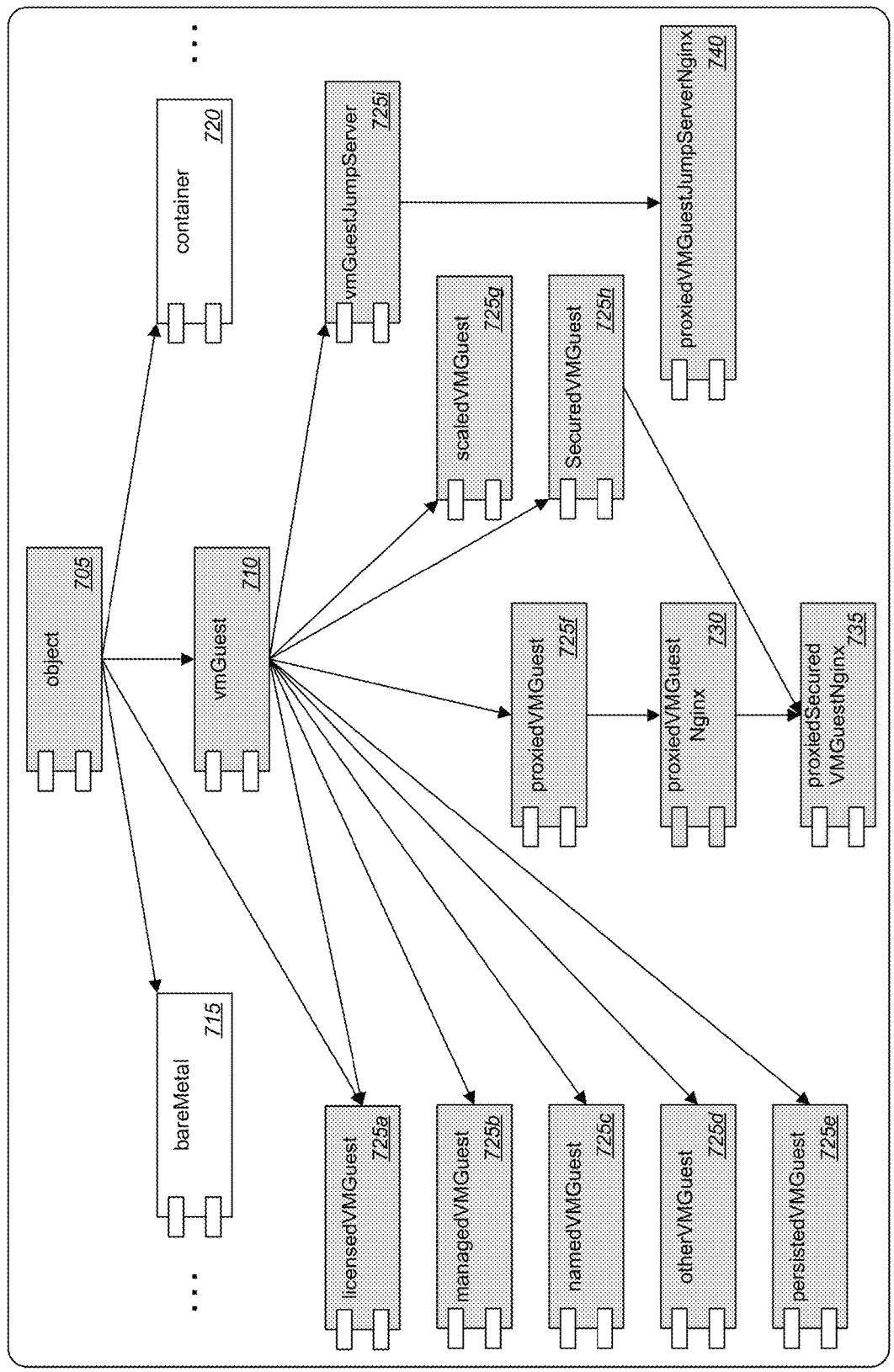
FIGS. 7A and 7B are block diagrams illustrating non-limiting examples of Is-A and Has-A resource class hierarchies, in accordance with various embodiments.
Figure 7B:
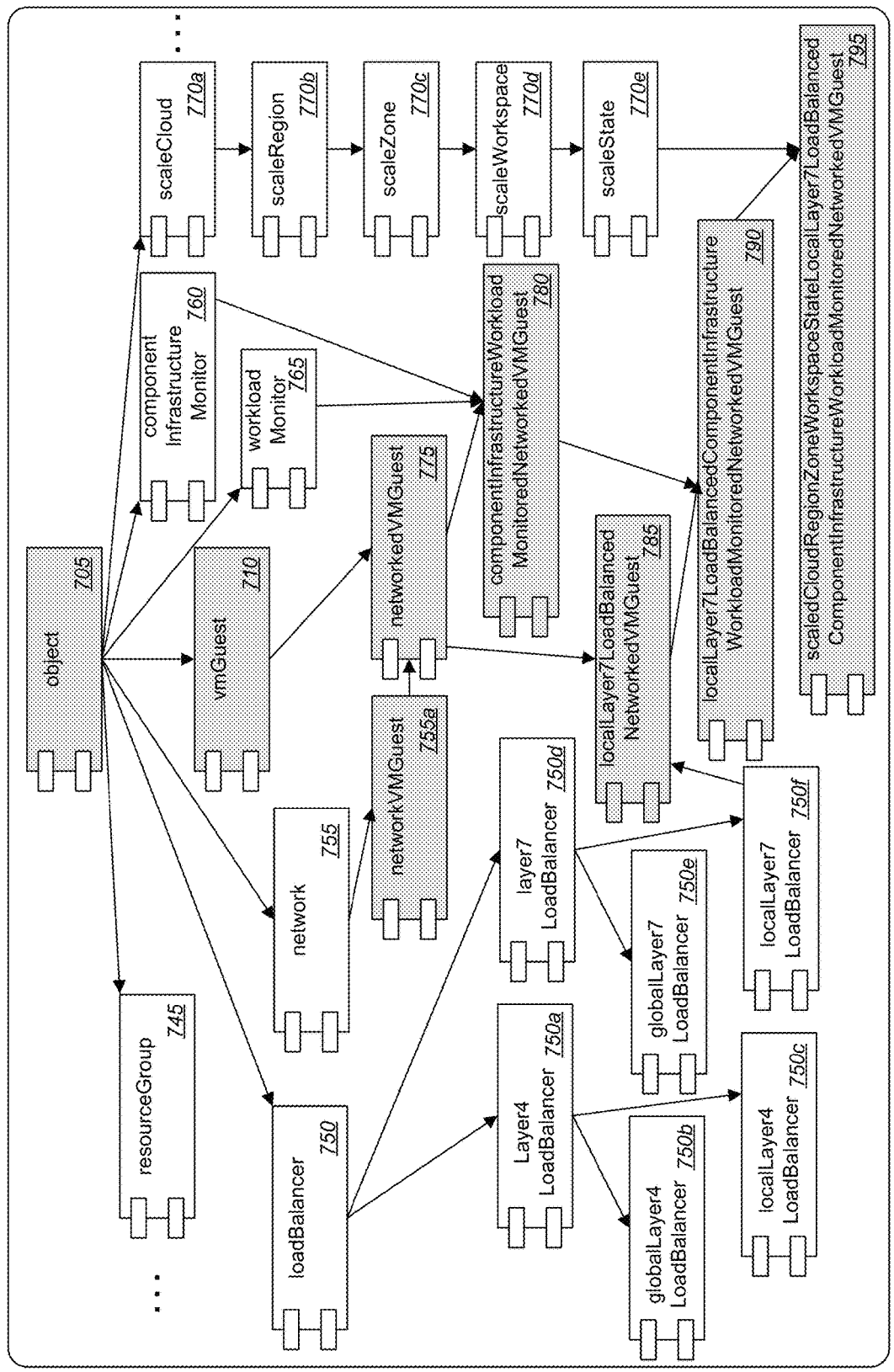

FIGS. 7A and 7B (collectively, "FIG. 7") are block diagrams illustrating non-limiting examples 700 of Is-A and Has-A resource class hierarchies, in accordance with various embodiments. Is-A resource class hierarchies may define class relationships in terms of inheritance among one or more classes (as shown, e.g., in FIG. 7A, or the like), while Has-A resource class hierarchies may define properties or compositions of the one or more classes.

As shown in the non-limiting example of FIG. 7A, an example Is-A resource class hierarchy is at least partially shown for a virtual machine ("VM") Guest class, which may include, but is not limited to, at least one of object class 705, VM guest class 710, bare metal class 715, container class 720, licensed VM guest class 725a, managed VM guest class 725b, named VM guest class 725c, other VM guest class 725d, persisted VM guest class 725e, proxied VM guest class 725f, scaled VM guest class 725g, secured VM guest class 725h, VM guest jump server class 725i, proxied VM guest Nginx class 730, proxied secured VM guest Nginx class 735, or proxied VM guest jump server Nginx class 740, and/or the like. In this case, VM guest class 710 is a base class that contains required resource arguments (e.g., Terraform® arguments, or the like), while optional resource arguments within the specified resources may be introduced in classes extending from the base class (in this case, classes or subclasses licensed VM guest class 725a, managed VM guest class 725b, named VM guest class 725c, other VM guest class 725d, persisted VM guest class 725e, proxied VM guest class 725f, scaled VM guest class 725g, secured VM guest class 725h, and/or VM guest jump server class 725i, or the like). In some cases, VM guest class 710, bare metal class 715, and container class 720 may represent targets. In some instances, classes or subclasses proxied VM guest Nginx class 730, proxied secured VM guest Nginx class 735, proxied VM guest jump server Nginx class 740 may introduce NGINX workload images. In some examples, classes or subclasses such as proxied VM guest jump server Nginx class 740, or the like, may each represent a class extending the base class by introducing sub-modules beyond the specified resource module. In some cases, classes or subclasses such as proxied secured VM guest Nginx class 735, or the like, may each be a composite class that may be specified in the context_in file(s) and that combines all inherited classes that the IoC Factory may lexically analyze the name of and may automatically include the respective parent classes in the provisioned class. These various embodiments thus illustrate the multiple inheritance functionality or feature that may be achieved using the Is-A resource class hierarchy.

Referring to the non-limiting example of FIG. 7B, an example Has-A resource class hierarchy is at least partially shown for a virtual machine ("VM") Guest class, which may include, but is not limited to, at least one of object class 705, VM guest class 710, resource group class 745, load balancer class 750, network class 755, component infrastructure monitor 760, workload monitor 765, various dimension of scale classes 770 (including, but not limited to, scale cloud class 770a, scale region class 770b, scale zone class 770c, scale workspace class 770d, or scale state class 770e, and/or the like), layer 4 load balancer class 750a, global layer 4 load balancer class 750b, local layer 4 load balancer class 750c, layer 7 load balancer class 750d, global layer 7 load balancer class 750e, local layer 7 load balancer class 750f, network VM guest class 755a, networked VM guest class 775, component infrastructure workload monitored networked VM guest class 780, local layer 7 load balanced networked VM guest class 785, local layer 7 load balanced component infrastructure workload monitored networked VM guest class 790, or scaled cloud region zone workspace state local layer 7 load balanced component infrastructure workload monitored networked VM guest class 795, and/or the like. In this case, as in FIG. 7A, VM guest class 710 is a base class. In some instances, object class 705 may be composed of or may have properties of, e.g., VM guest class 710, resource group class 745, load balancer class 750, network class 755, component infrastructure monitor 760, workload monitor 760, and various dimension of scale classes 770. In some cases, classes or subclasses global layer 4 load balancer class 750b and local layer 4 load balancer class 750c may inherit or include properties from class or subclass layer 4 load balancer class 750a. Similarly, classes or subclasses global layer 7 load balancer class 750e and local layer 7 load balancer class 750f may inherit or include properties from class or subclass layer 7 load balancer class 750d. In some examples, classes or subclasses layer 4 load balancer class 750a and layer 7 load balancer class 750d may inherit or include properties from class or subclass load balancer class 750.

In some instances, network VM guest class 755a may inherit or include properties from class or subclass network 755, while networked VM guest class 775 may inherit or include properties from classes or subclasses VM guest class 710 and network VM guest class 755a. In some cases, component infrastructure workload monitored networked VM guest class 780 may inherit or include properties from classes or subclasses component infrastructure monitor 760, workload monitor 765, and networked VM guest class 775. In some examples, local layer 7 load balanced networked VM guest class 785 may inherit or include properties from classes or subclasses local layer 7 load balancer class 750f and networked VM guest class 775. In some instances, local layer 7 load balanced component infrastructure workload monitored networked VM guest class 790 may inherit or include properties from classes or subclasses component infrastructure workload monitored networked VM guest class 780 and local layer 7 load balanced networked VM guest class 785. In some cases, scaled cloud region zone workspace state local layer 7 load balanced component infrastructure workload monitored networked VM guest class 795 may inherit or include properties from classes or subclasses scale cloud class 770a, scale region class 770b, scale zone class 770c, scale workspace class 770d, scale state class 770e, and local layer 7 load balanced component infrastructure workload monitored networked VM guest class 790.

The following Terraform® constructs may be used to mimic object oriented ("OO") functionality in Terraform®. The "count" meta-argument may be used in any given resource, and provides for elasticity, by letting a user dictate whether a given resource is spun up or not regardless whether the user codes it into the Terraform® code. In such a case, the Terraform© modules may not actually be used until the user sets this count value to greater than 0. This enables the user to set the polymorphic extent but not instantiate a given module unless the event dictates such. According to some embodiments, "remote_exec" and/or "local_exec" provisioners may also be used that allows the user to introduce dynamic behavior and/or algorithm into the object. State is already there with tfstate and it is already discrete to the object by default in terms of how Terraform® works. This allows the user to be re-entrant into the IoC Factory for when the user wants to implement my "scale_cloud" class or the like. For example, for scaling from Azure® to AWS®, the context_in file may already describe all the target clouds that could be used to lifecycle to. By changing the context_in file of the event that has just stood up the component infrastructure thereof in Azure® provider cloud to now indicate to use the AWS provider cloud, one of these "remote_exec" or "local_exec" provisioners may be used to recursively call the IoC Factory again with the slightly modified context to stand up identical or similar component infrastructure in the AWS® provider cloud that had been stood up in Azure® provider cloud during the parent event. In some embodiments, "dependency" may be used to provide hierarchy in the sense that the user can provision one thing before the user provisions another. For instance, in the Has-A resource class hierarchy (which describes a composite object, etc.) the user may first provision the surrounding component infrastructure (e.g., subnet) to the target (e.g., VM Guest), then the user may provision the target and place it there. The user may then provision the add-ons (e.g., monitoring components, or the like) and hook those add-ons in (in some cases, these add-ons may be referred to as the "nouns" or the like). The user may subsequently go to the "verbs" for scale, and may take a sum composite object and may make a re-entrant call to the IoC Factory to do the same in a new target, and so on.

For implementation of the Is-A class resource hierarchy itself this is done in three respects. First, for each resource, the required Terraform® arguments may be made as part of the base class. The optional Terraform® arguments may be categorized into sub-classes, grouping each respective set of Terraform® arguments to form each sub-class, in some cases, within the given Terraform® resource. Second, beyond the Terraform® resource, sub-modules of other Terraform® resources may be allowed to any degree thereby implementing subclasses in a general-to-specific approach as one may otherwise see in OO approaches (e.g., VM Guest=>VM Guest Jump Server, or the like). Third, workload may be included by categorizing which workloads apply to a given hierarchy and including the remote/local execs layering on the hierarchy in the IoC scheme to complete the story. For example, the subclass "proxied VM guest" may further be sub-classed into "proxied VM guest NGINX" to include the ability in said class to layer on the NGINX workloads and thus partake in the proxy that is not only defined in the component infrastructure but also in the workload itself.

FIGS. 8A-8E (collectively, "FIG. 8") are flow diagrams illustrating another method 800 for implementing OOIACP and its functionalities, in accordance with various embodiments. Method 800 of FIG. 8A continues onto FIG. 8E following the circular marker denoted, "A," and returns to FIG. 8A following the circular marker denoted, "B."

While the techniques and procedures are depicted and/or described in a certain order for purposes of illustration, it should be appreciated that certain procedures may be reordered and/or omitted within the scope of various embodiments. Moreover, while the method 800 illustrated by FIG. 8 can be implemented by or with (and, in some cases, are described below with respect to) the systems, examples, or embodiments 100, 200, 300, 300', 300", 300''', 400, 400', 600, and 700 of FIGS. 1, 2, 3A, 3B, 3C, 3D, 4A, 4B, 6A-6C, and 7A-7B, respectively (or components thereof), such methods may also be implemented using any suitable hardware (or software) implementation. Similarly, while each of the systems, examples, or embodiments 100, 200, 300, 300', 300", 300''', 400, 400', 600, and 700 of FIGS. 1, 2, 3A, 3B, 3C, 3D, 4A, 4B, 6A-6C, and 7A-7B, respectively (or components thereof), can operate according to the method 800 illustrated by FIG. 8 (e.g., by executing instructions embodied on a computer readable medium), the systems, examples, or embodiments 100, 200, 300, 300', 300", 300''', 400, 400', 600, and 700 of FIGS. 1, 2, 3A, 3B, 3C, 3D, 4A, 4B, 6A-6C, and 7A-7B can each also operate according to other modes of operation and/or perform other suitable procedures.

Figure 8A:
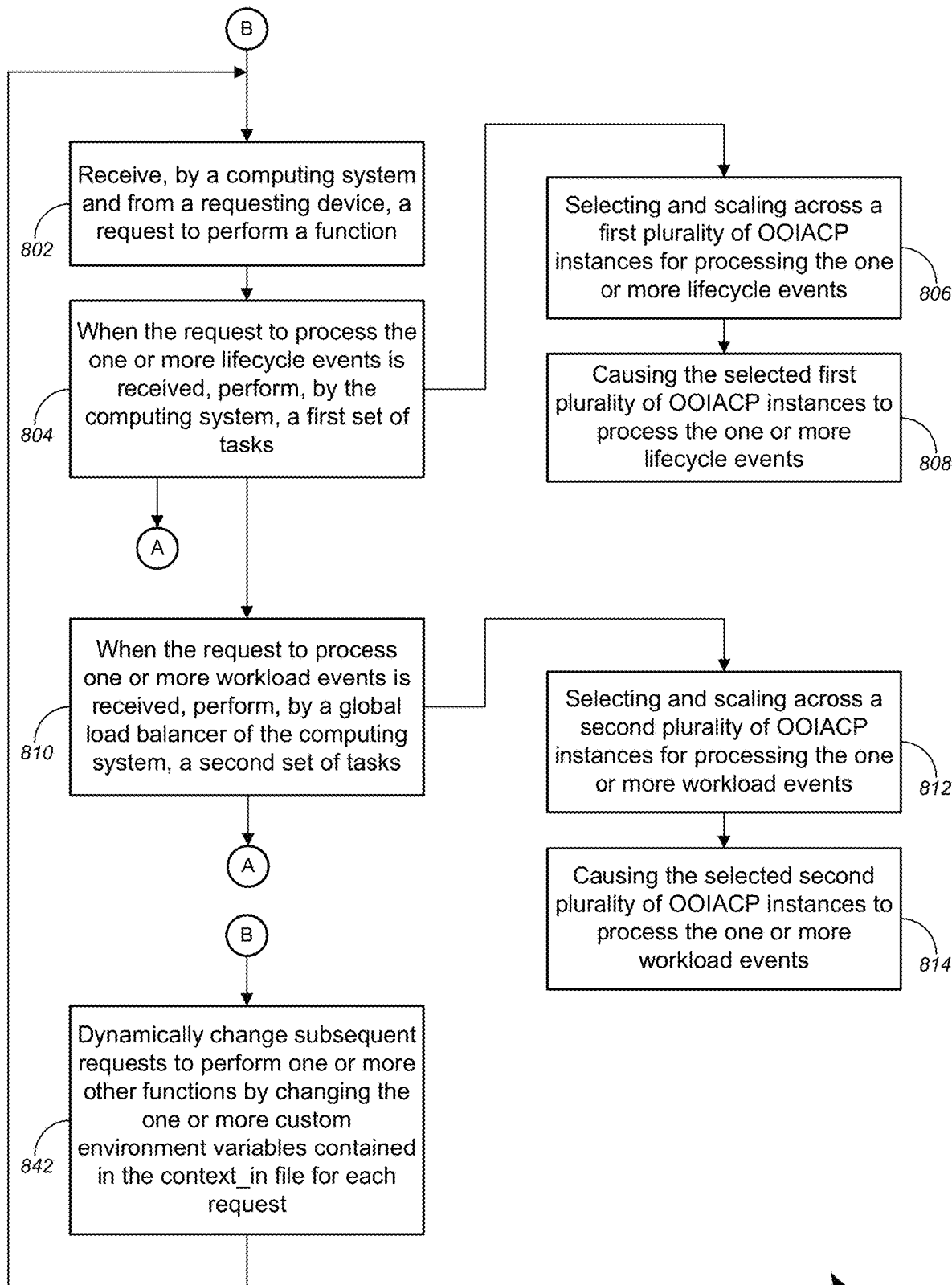

In the non-limiting embodiment of FIG. 8A, method 800, at block 802, may comprise receiving, by a computing system and from a requesting device, a request to perform a function. In some instances, the computing system may include, without limitation, an object-oriented infrastructure-as-code platform ("OOIACP"), or the like. In some cases, the request to perform the function may include, but is not limited to, a request to process one or more lifecycle events, or the like.

At block 804, method 800 may comprise, when the request to process the one or more lifecycle events is received, performing, by the computing system, a first set of tasks comprising: selecting and scaling across a first plurality of OOIACP instances for processing the one or more lifecycle events (block 806); and causing the selected first plurality of OOIACP instances to process the one or more lifecycle events (block 808). In some cases, each first OOIACP instance among the first plurality of OOIACP instances may include an infrastructure-as-code ("IAC") command line that instantiates component infrastructure among a plurality of component infrastructure to process at least one lifecycle event among the one or more lifecycle events concurrently and independently of other OOIACP instances among the first plurality of OOIACP instances. In some instances, the first plurality of OOIACP instances may be located within an environment in which the plurality of component infrastructure is located.

In some examples, method 800 may continue from the process at block 804 onto the process at block 810. In other examples, method 800 may continue onto the process at block 822 in FIG. 8E following the circular marker denoted, "A," before returning to the process at block 802 or at block 842 in FIG. 8A, as indicated by the circular marker denoted, "B."

In some embodiments, the OOIACP may include a declarative configuration language ("DCL")-based infrastructure-as-code ("IAC") software tool that provides structure and data functionalities and a wrapper tool that provides algorithm and sequence functionalities to the IAC software tool to convert the IAC software tool into an object-oriented programming ("OOP")-based IAC system. In some instances, the first set of tasks may be performed using at least one of a subject-based multicast ("SBM") system, a distributed business process management system ("DBPMS") engine platform, or an artificial intelligence for information technology operations ("AIOps") system, and/or the like.

In some embodiments, the request to perform the function may further comprise a request to process one or more workload events. In such cases, method 800 may, at block 810, comprise, when the request to process one or more workload events is received, performing, by a global load balancer of the computing system, a second set of tasks comprising: selecting and scaling across a second plurality of OOIACP instances for processing the one or more workload events (block 812); and causing the selected second plurality of OOIACP instances to process the one or more workload events (block 814). In some instances, each second OOIACP instance among the second plurality of OOIACP instances may instantiate workload resources among a plurality of workload resources to process at least one workload event among the one or more workload events concurrently and independently of other OOIACP instances among the second plurality of OOIACP instances. In some cases, the second plurality of OOIACP instances may be located within the environment in which the plurality of component infrastructure. In some examples, the plurality of workload resources may also be located within said environment.

Figure 8B:
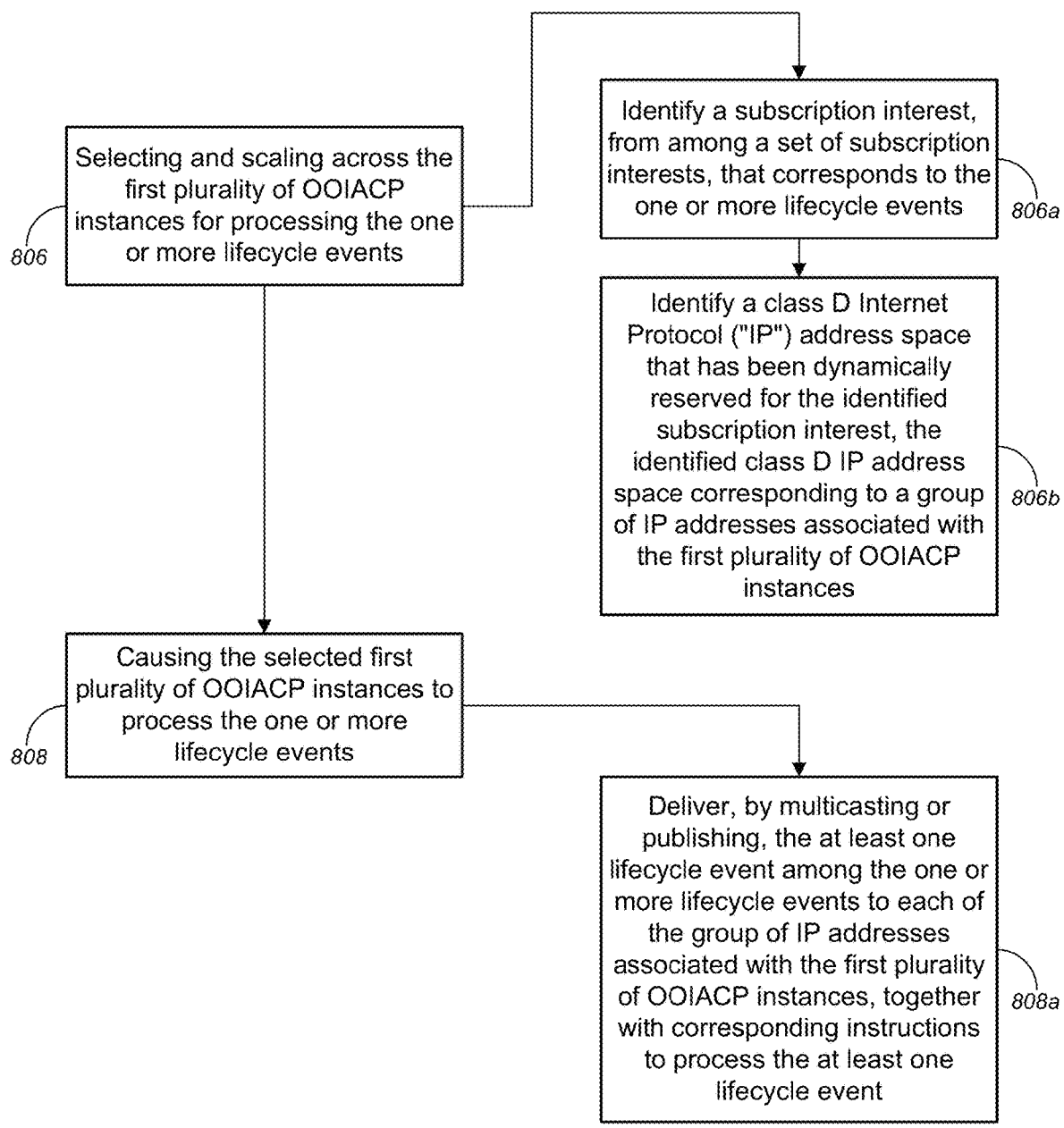
Figure 8E:
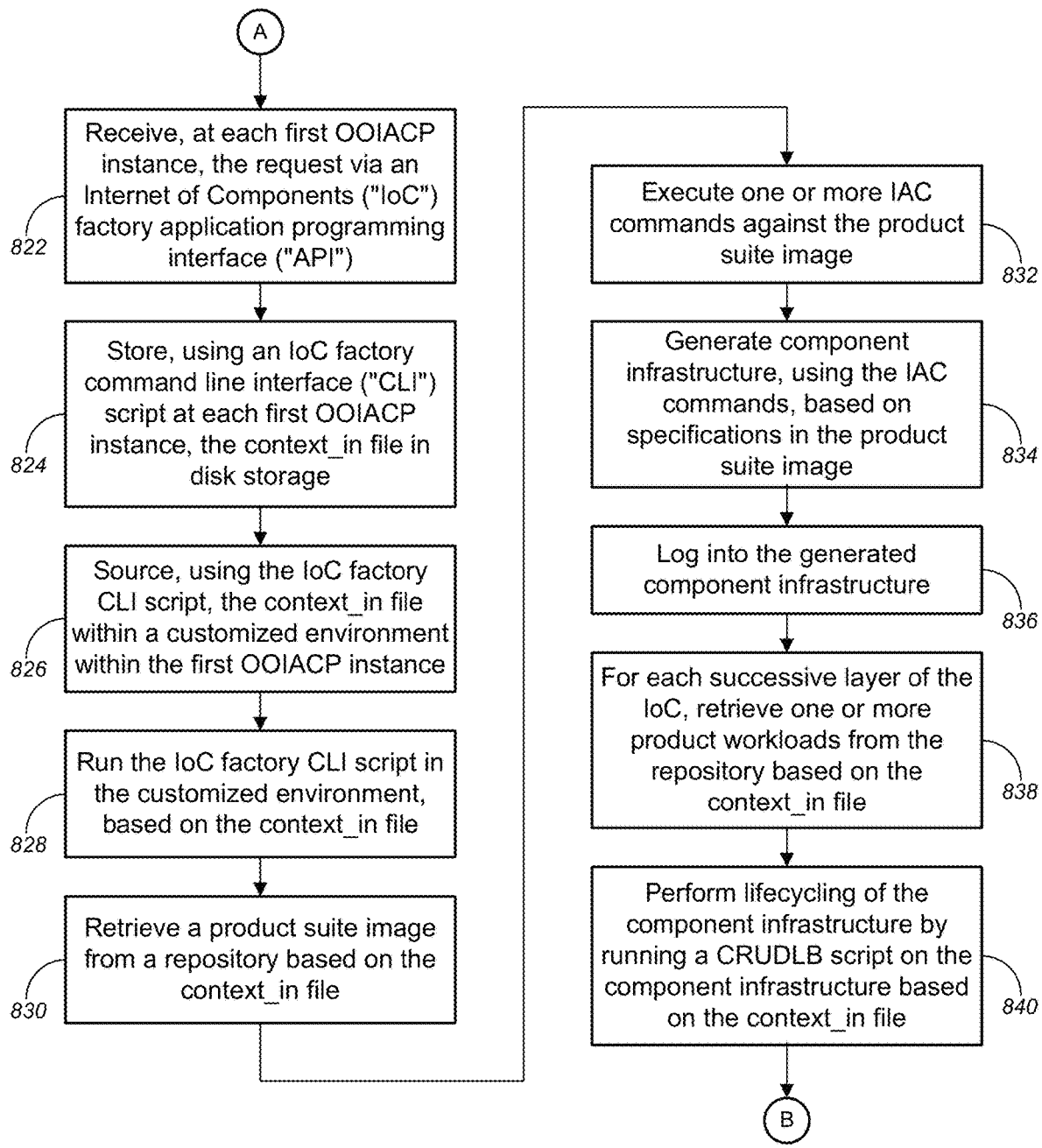

Method 800 may continue onto the process at block 822 in FIG. 8E following the circular marker denoted, "A," before returning to the process at block 802 or at block 842 in FIG. 8A, as indicated by the circular marker denoted, "B."

With reference to the non-limiting example of FIG. 8B, according to some embodiments, the first set of tasks may be performed using a SBM system. In some examples, selecting and scaling across the first plurality of OOIACP instances for processing the one or more lifecycle events (at block 806) may comprise identifying a subscription interest, from among a set of subscription interests, that corresponds to the one or more lifecycle events (block 806a); and identifying a class D Internet Protocol ("IP") address space that has been dynamically reserved for the identified subscription interest, the identified class D IP address space corresponding to a group of IP addresses associated with the first plurality of OOIACP instances (block 806b). In some cases, causing the selected first plurality of OOIACP instances to process the one or more lifecycle events (block 808) may comprise delivering, by multicasting or publishing, the at least one lifecycle event among the one or more lifecycle events to each of the group of IP addresses associated with the first plurality of OOIACP instances, together with corresponding instructions to process the at least one lifecycle event (block 808a).

In some instances, each first OOIACP instance among the first plurality of OOIACP instances may comprise a message broker that is used in conjunction with the SBM system for delivery of the at least one lifecycle event among the one or more lifecycle events and delivery of the corresponding instructions to process the at least one lifecycle event. In some cases, the first set of tasks may be further performed using a DBPMS engine platform, where delivering the at least one lifecycle event (at block 808a) may comprise dividing, by the DBPMS engine platform, the request to process the one or more lifecycle events into a plurality of requests, each request among the plurality of requests comprising the at least one lifecycle event and the corresponding instructions to process the at least one lifecycle event (at block 816); and delivering, by the DBPMS engine platform and using multicasting or publishing using the message broker located at each first OOIACP instance, each request among the plurality of requests to each of the group of IP addresses associated with the first plurality of OOIACP instances (at block 818). In some examples, the DBPMS engine platform may be a non-centralized engine platform including one or more runnable BPMS nodes handling at least one of one or more BPMS events or one or more BPMS services. In some cases, the one or more runnable BPMS nodes communicate with each other by multicasting the at least one of the one or more BPMS events or the one or more BPMS services using the SBM system.

In some embodiments, processing the at least one lifecycle event may comprise performing at least one create, read/retrieve, update, delete, list, and batch ("CRUDLB") lifecycle event. In some instances, referring to the non-limiting example of FIG. 8D, the first set of tasks may be performed using an AIOps system, where selecting and scaling across the first plurality of OOIACP instances for processing the one or more lifecycle events (at block 806) may comprise using artificial intelligence ("AI") and/or machine learning models to select and scale across the first plurality of OOIACP instances for processing the one or more lifecycle events (block 820).

According to some embodiments, scaling across the first plurality of OOIACP instances may include, without limitation, at least one of: scaling across the first plurality of OOIACP instances each of which is located within a first network among one or more first networks that are associated with a first service provider; scaling across the first plurality of OOIACP instances each of which is located within one of the first network that is associated with the first service provider or a second network among one or more second networks that are associated with a second service provider that is separate from the first service provider; scaling across the first plurality of OOIACP instances each of which is located within the second network that is associated with the second service provider; scaling across the first plurality of OOIACP instances within the one or more first networks; scaling across the first plurality of OOIACP instances between the one or more first networks and the one or more second networks; scaling across the first plurality of OOIACP instances within the one or more second networks; scaling across the first plurality of OOIACP instances within one or more regions of the one or more first networks; scaling across the first plurality of OOIACP instances within one or more regions of the one or more second networks; scaling across the first plurality of OOIACP instances within one or more zones of the one or more first networks; or scaling across the first plurality of OOIACP instances within one or more zones of the one or more second networks; and/or the like.

In some embodiments, the request to perform the function may comprise a representational state transfer ("REST") call, the REST call including a context_in file containing one or more custom environment variables. In such cases, the method 800 (following circular marker denoted, "A," in FIG. 8A) may further comprise: receiving, at each first OOIACP instance, the request via an Internet of Components ("IoC") factory application programming interface ("API") (block 822); storing, using an IoC factory command line interface ("CLI") script at each first OOIACP instance, the context_in file in disk storage (block 824); sourcing, using the IoC factory CLI script, the context_in file within a customized environment within the first OOIACP instance (block 826); running the IoC factory CLI script in the customized environment, based on the context_in file (block 828); retrieving a product suite image from a repository based on the context_in file (block 830), the product suite image including at least one of a directory of IAC files, a set of resources, a set of modules, or a set of libraries, and/or the like; executing one or more IAC commands against the product suite image (block 832); generating component infrastructure, using the IAC commands, based on specifications in the product suite image (block 834); logging into the generated component infrastructure (block 836); and for each successive layer of the IoC, retrieving one or more product workloads from the repository based on the context_in file (block 838); and performing lifecycling of the component infrastructure by running a CRUDLB script on the component infrastructure based on the context_in file (block 840).

Method 800 may return to the process at block 802 in FIG. 8A, as indicated by the circular marker denoted, "B." In other examples, method 800 may continue onto the process at block 842 in FIG. 8A, as indicated by the circular marker denoted, "B."

According to some embodiments, the context_in file may be customizable for each lifecycle event. In some examples, the method may further comprise, at block 842, dynamically changing subsequent requests to perform one or more other functions by changing the one or more custom environment variables contained in the context_in file for each request. Method 800 may return to the process at block 802.

In some embodiments, the request to perform the function may comprise a semantic abstraction comprising class hierarchies that define class relationships among two or more of the one or more lifecycle events, the first plurality of OOIACP instances, or corresponding component infrastructure, and/or the like. In some examples, performing the first set of tasks may further comprise lifecycling one or more classes defined by the semantic abstraction in the request, by lifecycling component infrastructure corresponding to at least one of the one or more classes, one or more related classes of the one or more classes, or one or more subclasses of the one or more classes, and/or the like, based on the class hierarchies. In some instances, the class hierarchies may comprise at least one of an Is-A resource class hierarchy that defines class relationships in terms of inheritance among one or more classes or a Has-A resource class hierarchy that defines properties or compositions of the one or more classes, and/or the like.

According to some embodiments, the request to perform the function may comprise a logical abstraction comprising at least one logical structure that each defines one or more logical relationships among two or more of the one or more lifecycle events, the first plurality of OOIACP instances, or corresponding component infrastructure, and/or the like. In some examples, performing the first set of tasks may further comprise lifecycling the at least one logical structure defined by the logical abstraction in the request, by lifecycling component infrastructure based on the one or more logical relationships defined by the at least one logical structure. In some cases, the logical abstraction may comprise a business process model and notation ("BPMN")-based logical structure.

Exemplary System and Hardware Implementation

Figure 9:
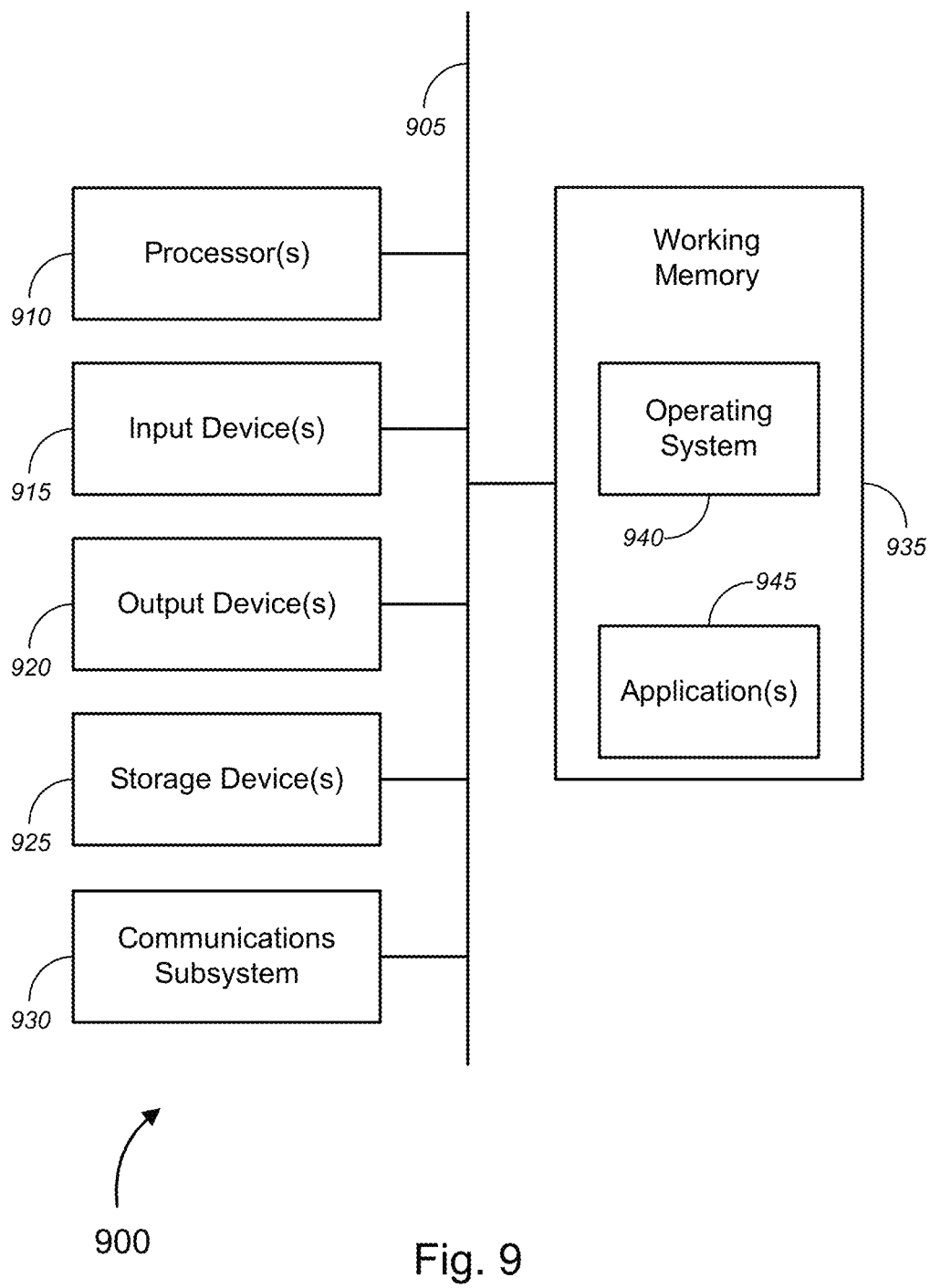
FIG. 9 is a block diagram illustrating an exemplary computer or system hardware architecture, in accordance with various embodiments.

FIG. 9 is a block diagram illustrating an exemplary computer or system hardware architecture, in accordance with various embodiments. FIG. 9 provides a schematic illustration of one embodiment of a computer system 900 of the service provider system hardware that can perform the methods provided by various other embodiments, as described herein, and/or can perform the functions of computer or hardware system (i.e., computing system 105, object-oriented infrastructure-as-code platforms ("OOIACP") 110, 248, and 305, requesting devices 135*a*-135*n* or user devices 635, nodes 145, 150, and 345, component infrastructure 155 and 330, a subject-based multicast ("SBM") system(s) 165 and 665, a distributed business process management system ("DBPMS") engine platform(s) 170 and 670, an artificial intelligence for information technology operations ("AIOps") system(s) 175 and 675, and workload resources 180 and 680, and global load balancer 685, etc.), as described above. It should be noted that FIG. 9 is meant only to provide a generalized illustration of various components, of which one or more (or none) of each may be utilized as appropriate. FIG. 9, therefore, broadly illustrates how individual system elements may be implemented in a relatively separated or relatively more integrated manner.

The computer or hardware system 900—which might represent an embodiment of the computer or hardware system (i.e., computing system 105, OOIACP 110, 248, and 305, requesting devices 135*a*-135*n* or user devices 635, nodes 145, 150, and 345, component infrastructure 155 and 330, a SBM system(s) 165 and 665, a DBPMS engine platform(s) 170 and 670, an AIOps system(s) 175 and 675, and workload resources 180 and 680, and global load balancer 685, etc.), described above with respect to FIGS. 1-8—is shown comprising hardware elements that can be electrically coupled via a bus 905 (or may otherwise be in communication, as appropriate). The hardware elements may include one or more processors 910, including, without limitation, one or more general-purpose processors and/or one or more special-purpose processors (such as microprocessors, digital signal processing chips, graphics acceleration processors, and/or the like); one or more input devices 915, which can include, without limitation, a mouse, a keyboard, and/or the like; and one or more output devices 920, which can include, without limitation, a display device, a printer, and/or the like.

The computer or hardware system 900 may further include (and/or be in communication with) one or more storage devices 925, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 900 might also include a communications subsystem 930, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 930 may permit data to be exchanged with a network (such as the network described below, to name one example), with other computer or hardware systems, and/or with any other devices described herein. In many embodiments, the computer or hardware system 900 will further comprise a working memory 935, which can include a RAM or ROM device, as described above.

The computer or hardware system 900 also may comprise software elements, shown as being currently located within the working memory 935, including an operating system 940, device drivers, executable libraries, and/or other code, such as one or more application programs 945, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 925 described above. In some cases, the storage medium might be incorporated within a computer system, such as the system 900. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 900 and/or might take the form of source and/or installable code, which, upon compilation and/or installation on the computer or hardware system 900 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 900) to perform methods in accordance with various embodiments of the invention. According to a set of embodiments, some or all of the procedures of such methods are performed by the computer or hardware system 900 in response to processor 910 executing one or more sequences of one or more instructions (which might be incorporated into the operating system 940 and/or other code, such as an application program 945) contained in the working memory 935. Such instructions may be read into the working memory 935 from another computer readable medium, such as one or more of the storage device(s) 925. Merely by way of example, execution of the sequences of instructions contained in the working memory 935 might cause the processor(s) 910 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 900, various computer readable media might be involved in providing instructions/code to processor(s) 910 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 925. Volatile media includes, without limitation, dynamic memory, such as the working memory 935. In some alternative embodiments, a computer readable medium may take the form of transmission media, which includes, without limitation, coaxial cables, copper wire, and fiber optics, including the wires that comprise the bus 905, as well as the various components of the communication subsystem 930 (and/or the media by which the communications subsystem 930 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 900. These signals, which might be in the form of electromagnetic signals, acoustic signals, optical signals, and/or the like, are all examples of carrier waves on which instructions can be encoded, in accordance with various embodiments of the invention.

The communications subsystem 930 (and/or components thereof) generally will receive the signals, and the bus 905 then might carry the signals (and/or the data, instructions, etc. carried by the signals) to the working memory 935, from which the processor(s) 905 retrieves and executes the instructions. The instructions received by the working memory 935 may optionally be stored on a storage device 925 either before or after execution by the processor(s) 910.

Figure 10:
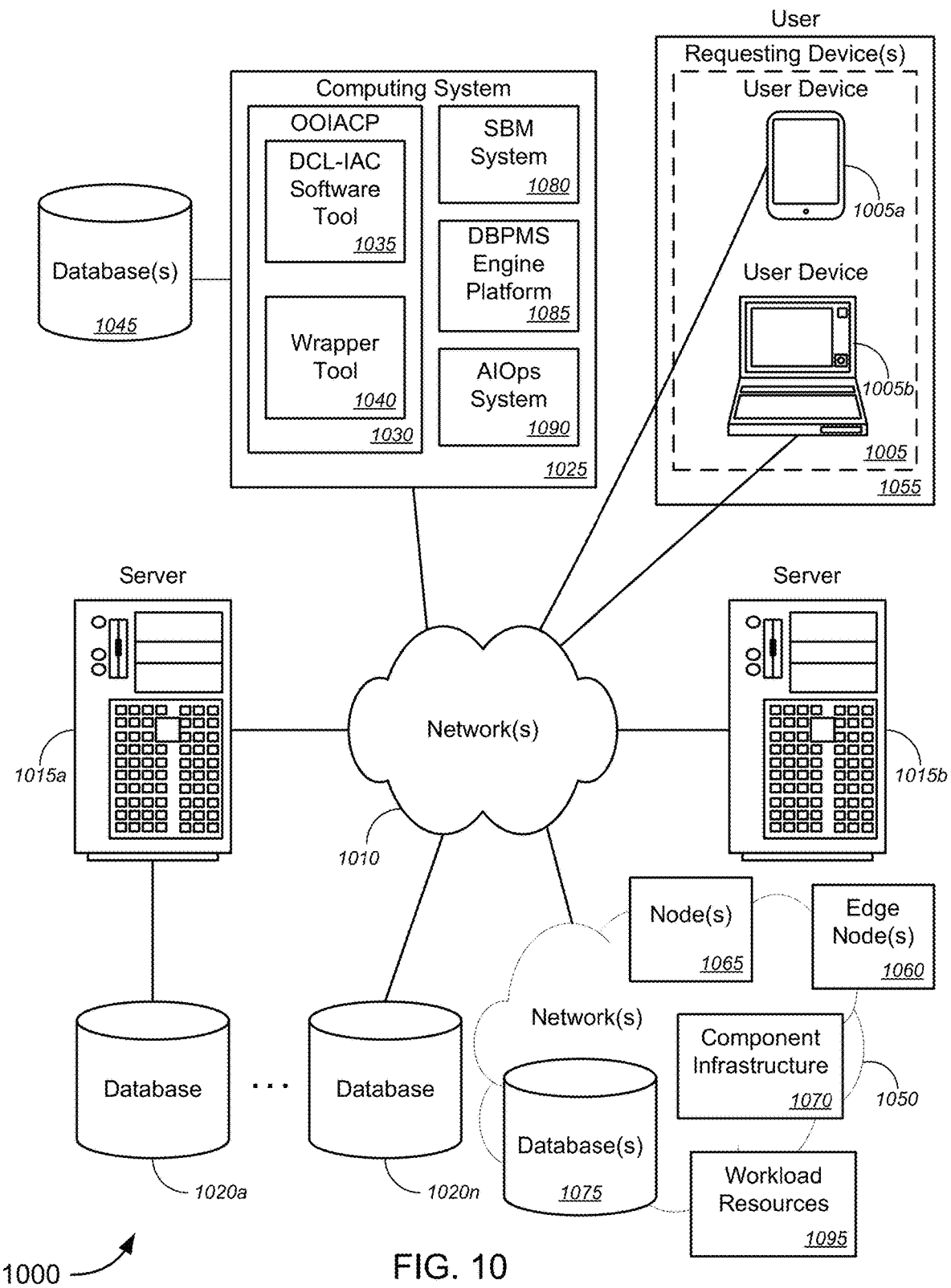
FIG. 10 is a block diagram illustrating a networked system of computers, computing systems, or system hardware architecture, which can be used in accordance with various embodiments.

As noted above, a set of embodiments comprises methods and systems for implementing infrastructure-as-code ("IAC") functionalities, and, more particularly, to methods, systems, and apparatuses for implementing object-oriented infrastructure-as-code platform ("OOIACP") and its functionalities. FIG. 10 illustrates a schematic diagram of a system 1000 that can be used in accordance with one set of embodiments. The system 1000 can include one or more user computers, user devices, or customer devices 1005. A user computer, user device, or customer device 1005 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 1005 can also have any of a variety of applications, including one or more applications configured to perform methods provided by various embodiments (as described above, for example), as well as one or more office applications, database client and/or server applications, and/or web browser applications. Alternatively, a user computer, user device, or customer device 1005 can be any other electronic device, such as a thin-client computer, Internet-enabled mobile telephone, and/or personal digital assistant, capable of communicating via a network (e.g., the network(s) 1010 described below) and/or of displaying and navigating web pages or other types of electronic documents. Although the exemplary system 1000 is shown with two user computers, user devices, or customer devices 1005, any number of user computers, user devices, or customer devices can be supported.

Certain embodiments operate in a networked environment, which can include a network(s) 1010. The network(s) 1010 can be any type of network familiar to those skilled in the art that can support data communications using any of a variety of commercially-available (and/or free or proprietary) protocols, including, without limitation, TCP/IP, SNA™, IPX™ AppleTalk™, and the like. Merely by way of example, the network(s) 1010 (similar to network(s) 130 of FIG. 1 and network(s) 610, 615, 620, 625, 630, 640, 645, and 650 of FIGS. 6A-6C, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 1015. Each of the server computers 1015 may be configured with an operating system, including, without limitation, any of those discussed above, as well as any commercially (or freely) available server operating systems. Each of the servers 1015 may also be running one or more applications, which can be configured to provide services to one or more clients 1005 and/or other servers 1015.

Merely by way of example, one of the servers 1015 might be a data server, a web server, a cloud computing device(s), or the like, as described above. The data server might include (or be in communication with) a web server, which can be used, merely by way of example, to process requests for web pages or other electronic documents from user computers 1005. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 1005 to perform methods of the invention.

The server computers 1015, in some embodiments, might include one or more application servers, which can be configured with one or more applications accessible by a client running on one or more of the client computers 1005 and/or other servers 1015. Merely by way of example, the server(s) 1015 can be one or more general purpose computers capable of executing programs or scripts in response to the user computers 1005 and/or other servers 1015, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 1005 and/or another server 1015. In some embodiments, an application server can perform one or more of the processes for implementing infrastructure-as-code ("IAC") functionalities, and, more particularly, to methods, systems, and apparatuses for implementing object-oriented infrastructure-as-code platform ("OOIACP") and its functionalities, as described in detail above. Data provided by an application server may be formatted as one or more web pages (comprising HTML, JavaScript, etc., for example) and/or may be forwarded to a user computer 1005 via a web server (as described above, for example). Similarly, a web server might receive web page requests and/or input data from a user computer 1005 and/or forward the web page requests and/or input data to an application server. In some cases, a web server may be integrated with an application server.

In accordance with further embodiments, one or more servers 1015 can function as a file server and/or can include one or more of the files (e.g., application code, data files, etc.) necessary to implement various disclosed methods, incorporated by an application running on a user computer 1005 and/or another server 1015. Alternatively, as those skilled in the art will appreciate, a file server can include all necessary files, allowing such an application to be invoked remotely by a user computer, user device, or customer device 1005 and/or server 1015.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1020a-1020n (collectively, "databases 1020"). The location of each of the databases 1020 is discretionary: merely by way of example, a database 1020a might reside on a storage medium local to (and/or resident in) a server 1015a (and/or a user computer, user device, or customer device 1005). Alternatively, a database 1020n can be remote from any or all of the computers 1005, 1015, so long as it can be in communication (e.g., via the network 1010) with one or more of these. In a particular set of embodiments, a database 1020 can reside in a storage-area network ("SAN") familiar to those skilled in the art. (Likewise, any necessary files for performing the functions attributed to the computers 1005, 1015 can be stored locally on the respective computer and/or remotely, as appropriate.) In one set of embodiments, the database 1020 can be a relational database, such as an Oracle database, that is adapted to store, update, and retrieve data in response to SQL-formatted commands. The database might be controlled and/or maintained by a database server, as described above, for example.

According to some embodiments, system 1000 may further comprise a computing system 1025 (similar to computing system 105 of FIG. 1, or the like), object-oriented infrastructure-as-code platforms ("OOIACP") 1030 (similar to OOIACP 110, 248, and 305 of FIGS. 1-3, or the like), a declarative configuration language ("DCL")-based infrastructure-as-code ("IAC") software tool 1035 (similar to DCL-based IAC software tools 115 and 310 of FIGS. 1 and 3, or the like) and a wrapper tool 1040 (similar to wrapper tools 120 and 315 of FIGS. 1 and 3, or the like), database(s) 1045 (similar to database(s) 125 of FIG. 1, or the like), and network(s) 1050 (similar to network(s) 130 of FIG. 1 and network(s) 610, 615, 620, 625, 630, 640, 645, and 650 of FIGS. 6A-6C, or the like). Requesting devices 1005 that are associated with a user 1055 (similar to users 140a-140n of FIG. 1, or the like) may comprise user devices 1005a and 1005b (similar to requesting devices 135a-135n of FIG. 1 and user devices 635 of FIG. 6A, or the like), which may be as described above. Network(s) 1050 may comprise one or more edge nodes 1060 (similar to edge nodes or nodes 145 and 345 of FIGS. 1 and 3, or the like), one or more nodes 1065 (similar to nodes 150 and 345 of FIGS. 1 and 3, or the like), component infrastructure 1070 (similar to component infrastructure 155 and 330 of FIGS. 1 and 3, or the like), database(s) 1075 (similar to databases 160, 350, and 355 of FIGS. 1 and 3, or the like), a subject-based multicast ("SBM") system(s) (similar to SBM system(s) 165 and 665 of FIGS. 1 and 6A-6C, or the like), a distributed business process management system ("DBPMS") engine platform(s) (similar to DBPMS engine platform(s) 170 and 670 of FIGS. 1 and 6A-6C, or the like), an artificial intelligence for information technology operations ("AIOps") system(s) (similar to AIOps system(s) 175 and 675 of FIGS. 1 and 6A-6C, or the like), and workload resources 1095 (similar to workload resources 180 and 680 of FIGS. 1 and 6A-6C, or the like).

In operation, computing system 1025 (and/or OOIACP 1030) may receive, from a requesting device 1005 associated with a user 1055, a request to perform a web service function. In some cases, the request to perform the web service function may include, without limitation, one of an operational call or a lifecycle call, or the like. An operational call may refer to a call pertaining to operation of the system (e.g., determining how much RAM is available, determining what systems are being utilized, etc.). A lifecycle call may refer to a call pertaining to standing up, tearing down, and/or updating an instance of an object (e.g., provisioning nodes, provisioning VMs, provisioning databases, etc.).

The OOIACP may set one or more semaphores that are used to control access to common resources by multiple processes, based at least in part on the received request; may evaluate one or more system constraints, based at least in part on the received request and based at least in part on the set one or more semaphores; and may use a before-hook functionality to parse the received request to convert the received request into a DCL request and to initiate a call to the IAC software tool of the OOIACP using the DCL request. Here, a semaphore may refer to a variable that is used to control access to a common resource and/or to achieve process synchronization in a multi-process environment. A system constraint may include, without limitation, role based access control ("RBAC")-based constraints, policy-based constraints, and/or the like.

The OOIACP may use a run command to: establish a class hierarchy of objects based on the received request, each class and subclass within the class hierarchy (which may include the OOIACP 1025, the edge nodes 1060, the nodes 1065, and/or the component infrastructure 1070, or the like) having one or more predefined class behaviors, wherein each subclass may inherit class behaviors of classes to which it belongs and class behaviors of any intermediate subclasses, wherein each class behavior may include, but is not limited to, a set of procedures associated with the request and with an object or instance of a corresponding class, the set of procedures configured to operate on said object or instance of the corresponding class; and perform the requested web service function based on the initiated call to the IAC software tool of the OOIACP using the DCL request and based at least in part on the one or more system constraints, by identifying one or more classes within the class hierarchy associated with the requested web service function, initiating the set of procedures in each of the identified one or more classes, and returning results of the DCL request based on at least one of the initiated set of procedures or the identified one or more classes. The OOIACP may use an after-hook functionality to convert results of the DCL request into a non-DCL result and to send the non-DCL result to the requesting device.

In another aspect, computing system 1025 (and/or OOIACP 1030) may receive, from a requesting device 1005 associated with a user 1055, a request to perform a function. The OOIACP may use a run command to perform the requested function, by: identifying one or more classes within a class hierarchy associated with the requested function, wherein each class and subclass within the class hierarchy (which may include the OOIACP 1025, the edge nodes 1060, the nodes 1065, and/or the component infrastructure 1070, or the like) may have one or more predefined class behaviors, wherein each subclass may inherit class behaviors of classes to which it belongs and class behaviors of any intermediate subclasses, wherein each class behavior may include, without limitation, a set of procedures associated with the request and with an object or instance of a corresponding class, the set of procedures configured to operate on said object or instance of the corresponding class; and initiating a set of procedures in each of the identified one or more classes.

In some embodiments, the request to perform the function may comprise a request to perform a web service function. Alternatively, or additionally, the request to perform the function may comprise one of an operational call or a lifecycle call. Alternatively, or additionally, the request to perform the function may comprise one of an application programming interface ("API") call or a command line interface ("CLI") call.

According to some embodiments, the OOIACP may set one or more semaphores that are used to control access to common resources by multiple processes, based at least in part on the received request; and evaluating, by the OOIACP, one or more system constraints, based at least in part on the received request and based at least in part on the set one or more semaphores. In such cases, performing the requested function may be further based at least in part on the one or more system constraints. In some instances, using the run command may further comprise establishing the class hierarchy of objects based on the received request.

In some embodiments, the OOIACP may use a before-hook functionality to parse the received request to convert the received request into a DCL request and to initiate a call to the IAC software tool of the OOIACP using the DCL request. In such cases, performing the requested function may comprise performing the requested function based on the call to the IAC software tool of the OOIACP using the DCL request, and returning results of the DCL request based on at least one of the initiated set of procedures or the identified one or more classes. In some cases, the OOIACP may use an after-hook functionality to convert results of the DCL request into a non-DCL result and to send the non-DCL result to the requesting device.

According to some embodiments, the OOIACP may receive a request to update or replace at least one behavior in at least one class among the identified one or more classes within the class hierarchy associated with the requested function; may update or replace the at least one behavior in the at least one class with an updated or replacement behavior, the updated or replacement behavior comprising an updated or replacement set of procedures; may use the run command to repeat performance of the requested function, by initiating the updated or replacement set of procedures in each of the at least one class and initiating the set of procedures in each of the other identified one or more classes.

In some aspects, a computing system may receive, from a requesting device, a request to perform a function. In some cases, the request to perform the function may comprise a request to process one or more lifecycle events. When the request to process the one or more lifecycle events is received, the computing system may perform a first set of tasks comprising: selecting and scaling across a first plurality of OOIACP instances for processing the one or more lifecycle events; and causing the selected first plurality of OOIACP instances to process the one or more lifecycle events. In some cases, each first OOIACP instance among the first plurality of OOIACP instances may comprise an infrastructure-as-code ("IAC") command line that instantiates component infrastructure among a plurality of component infrastructure to process at least one lifecycle event among the one or more lifecycle events concurrently and independently of other OOIACP instances among the first plurality of OOIACP instances. In some instances, the first plurality of OOIACP instances may be located within an environment in which the plurality of component infrastructure is located.

According to some embodiments, the request to perform the function may further comprise a request to process one or more workload events. In such cases, when the request to process one or more workload events is received, a global load balancer of the computing system may perform a second set of tasks comprising: selecting and scaling across a second plurality of OOIACP instances for processing the one or more workload events; and causing the selected second plurality of OOIACP instances to process the one or more workload events. In some instances, each second OOIACP instance among the second plurality of OOIACP instances may instantiate workload resources among a plurality of workload resources to process at least one workload event among the one or more workload events concurrently and independently of other OOIACP instances among the second plurality of OOIACP instances. In some cases, the second plurality of OOIACP instances may be located within the environment in which the plurality of component infrastructure. In some examples, the plurality of workload resources may also be located within said environment.

In some embodiments, the OOIACP may comprise a declarative configuration language ("DCL")-based infrastructure-as-code ("IAC") software tool that provides structure and data functionalities and a wrapper tool that provides algorithm and sequence functionalities to the IAC software tool to convert the IAC software tool into an object-oriented programming ("OOP")-based IAC system. In some instances, the first set of tasks may be performed using at least one of a SBM system (e.g., SBM system 1080, or the like), a DBPMS engine platform (e.g., DBPMS engine platform 1085, or the like), or an AIOps system (e.g., AIOps system 1090, or the like), and/or the like.

According to some embodiments, the context_in file may be customizable for each lifecycle event. In some examples, the subsequent requests may be dynamically changed to perform one or more other functions by changing the one or more custom environment variables contained in the context_in file for each request.

In some embodiments, the request to perform the function may comprise a semantic abstraction comprising class hierarchies that define class relationships among two or more of the one or more lifecycle events, the first plurality of OOIACP instances, or corresponding component infrastructure, and/or the like. In some examples, performing the first set of tasks may further comprise lifecycling one or more classes defined by the semantic abstraction in the request, by lifecycling component infrastructure corresponding to at least one of the one or more classes, one or more related classes of the one or more classes, or one or more subclasses of the one or more classes, and/or the like, based on the class hierarchies. In some instances, the class hierarchies may comprise at least one of an Is-A resource class hierarchy that defines class relationships in terms of inheritance among one or more classes or a Has-A resource class hierarchy that defines properties or compositions of the one or more classes, and/or the like.

According to some embodiments, the request to perform the function may comprise a logical abstraction comprising at least one logical structure that each defines one or more logical relationships among two or more of the one or more lifecycle events, the first plurality of OOIACP instances, or corresponding component infrastructure, and/or the like. In some examples, performing the first set of tasks may further comprise lifecycling the at least one logical structure defined by the logical abstraction in the request, by lifecycling component infrastructure based on the one or more logical relationships defined by the at least one logical structure. In some cases, the logical abstraction may comprise a business process model and notation ("BPMN")-based logical structure.

These and other functions of the system 1000 (and its components) are described in greater detail above with respect to FIGS. 1-5.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without-certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   receiving, by a computing system and from a requesting device, a request to perform a function, wherein the computing system comprises an object-oriented infrastructure-as-code platform ("OOIACP"), wherein the request to perform the function comprises a request to process one or more lifecycle events; and
   when the request to process the one or more lifecycle events is received, performing, by the computing system, a first set of tasks comprising:
   selecting and scaling across a first plurality of OOIACP instances for processing the one or more lifecycle events; and
   causing the selected first plurality of OOIACP instances to process the one or more lifecycle events, each first OOIACP instance among the first plurality of OOIACP instances comprising an infrastructure-as-code ("IAC") command line that instantiates component infrastructure among a plurality of component infrastructure to process at least one lifecycle event among the one or more lifecycle events concurrently and independently of other OOIACP instances among the first plurality of OOIACP instances, wherein the first plurality of OOIACP instances is located within an environment in which the plurality of component infrastructure is located,
   wherein the request to perform the function comprises a representational state transfer ("REST") call, the REST call comprising a context_in file containing one or more custom environment variables, wherein the method further comprises:
   receiving, at each first OOIACP instance, the request to perform the function via an Internet of Components ("IoC") factory application programming interface ("API");
   storing, using an IoC factory command line interface ("CLI") script at each first OOIACP instance, the context_in file in disk storage;
   sourcing, using the IoC factory CLI script, the context_in file within a customized environment within the first OOIACP instance;
   running the IoC factory CLI script in the customized environment, based on the context_in file;
   retrieving a product suite image from a repository based on the context_in file, the product suite image comprising at least one of a directory of IAC files, a set of resources, a set of modules, or a set of libraries;
   executing one or more IAC commands against the product suite image;
   generating component infrastructure, using the IAC commands, based on specifications in the product suite image;
   logging into the generated component infrastructure; and
   for each successive layer of the IoC, retrieving one or more product workloads from the repository based on the context_in file; and performing lifecycling of the generated component infrastructure by running a create, read/retrieve, update, delete, list and batch ("CRUDLB") script on the generated component infrastructure based on the context_in file.

2. The method of claim 1, wherein the OOIACP comprises a declarative configuration language ("DCL")-based infrastructure-as-code ("IAC") software tool that provides structure and data functionalities and a wrapper tool that provides algorithm and sequence functionalities to the IAC software tool to convert the IAC software tool into an object-oriented programming ("OOP") based IAC system.

3. The method of claim 1, wherein the first set of tasks is performed using at least one of a subject-based multicast ("SBM") system, a distributed business process management system ("DBPMS") engine platform, or an artificial intelligence for information technology operations ("AIOps") system.

4. The method of claim 1, wherein the first set of tasks is performed using a SBM system, wherein selecting and scaling across the first plurality of OOIACP instances for processing the one or more lifecycle events comprises:
   identifying a subscription interest, from among a set of subscription interests, that corresponds to the one or more lifecycle events; and
   identifying a class D Internet Protocol ("IP") address space that has been dynamically reserved for the identified subscription interest, the identified class D IP address space corresponding to a group of IP addresses associated with the first plurality of OOIACP instances.

5. The method of claim 4, wherein causing the selected first plurality of OOIACP instances to process the one or more lifecycle events comprises:
   delivering, by multicasting or publishing, the at least one lifecycle event among the one or more lifecycle events to each of the group of IP addresses associated with the first plurality of OOIACP instances, together with corresponding instructions to process the at least one lifecycle event.

6. The method of claim 5, wherein each first OOIACP instance among the first plurality of OOIACP instances further comprises a message broker that is used in conjunction with the SBM system for delivery of the at least one lifecycle event among the one or more lifecycle events and delivery of the corresponding instructions to process the at least one lifecycle event.

7. The method of claim 6, wherein the first set of tasks is further performed using a DBPMS engine platform, wherein delivering the at least one lifecycle event comprises:
dividing, by the DBPMS engine platform, the request to process the one or more lifecycle events into a plurality of requests, each request among the plurality of requests comprising the at least one lifecycle event and the corresponding instructions to process the at least one lifecycle event; and
delivering, by the DBPMS engine platform and using multicasting or publishing using the message broker located at each first OOIACP instance, each request among the plurality of requests to each of the group of IP addresses associated with the first plurality of OOIACP instances.

8. The method of claim 7, wherein the DBPMS engine platform is a non-centralized engine platform including one or more runnable business process management system ("BPMS") nodes handling at least one of one or more BPMS events or one or more BPMS services, wherein the one or more runnable BPMS nodes communicate with each other by multicasting the at least one of the one or more BPMS events or the one or more BPMS services using the SBM system.

9. The method of claim 1, wherein processing the at least one lifecycle event comprises performing at least one create, read/retrieve, update, delete, list, and batch ("CRUDLB") lifecycle event.

10. The method of claim 1, wherein the first set of tasks is performed using an AIOps system, wherein selecting and scaling across the first plurality of OOIACP instances for processing the one or more lifecycle events comprises:
using artificial intelligence ("AI") and/or machine learning models to select and scale across the first plurality of OOIACP instances for processing the one or more lifecycle events.

11. The method of claim 1, wherein scaling across the first plurality of OOIACP instances comprises at least one of:
scaling across the first plurality of OOIACP instances each of which is located within a first network among one or more first networks that are associated with a first service provider;
scaling across the first plurality of OOIACP instances each of which is located within one of the first network that is associated with the first service provider or a second network among one or more second networks that are associated with a second service provider that is separate from the first service provider;
scaling across the first plurality of OOIACP instances each of which is located within the second network that is associated with the second service provider;
scaling across the first plurality of OOIACP instances within the one or more first networks;
scaling across the first plurality of OOIACP instances between the one or more first networks and the one or more second networks;
scaling across the first plurality of OOIACP instances within the one or more second networks;
scaling across the first plurality of OOIACP instances within one or more regions of the one or more first networks;
scaling across the first plurality of OOIACP instances within one or more regions of the one or more second networks;
scaling across the first plurality of OOIACP instances within one or more zones of the one or more first networks; or
scaling across the first plurality of OOIACP instances within one or more zones of the one or more second networks.

12. The method of claim 1, wherein the context_in file is customizable for each lifecycle event, wherein the method further comprises:
dynamically changing subsequent requests to perform one or more other functions by changing the one or more custom environment variables contained in the context_in file for each request.

13. The method of claim 1, wherein the request to perform the function comprises a semantic abstraction comprising class hierarchies that define class relationships among two or more of the one or more lifecycle events, the first plurality of OOIACP instances, or corresponding component infrastructure, wherein performing the first set of tasks further comprises lifecycling one or more classes defined by the semantic abstraction in the request to perform the function, by lifecycling component infrastructure corresponding to at least one of the one or more classes, one or more related classes of the one or more classes, or one or more subclasses of the one or more classes, based on the class hierarchies.

14. The method of claim 13, wherein the class hierarchies comprise at least one of an Is-A resource class hierarchy that defines class relationships in terms of inheritance among one or more classes or a Has-A resource class hierarchy that defines properties or compositions of the one or more classes.

15. The method of claim 1, wherein the request to perform the function comprises a logical abstraction comprising at least one logical structure that each defines one or more logical relationships among two or more of the one or more lifecycle events, the first plurality of OOIACP instances, or corresponding component infrastructure, wherein performing the first set of tasks further comprises lifecycling the at least one logical structure defined by the logical abstraction in the request to perform the function, by lifecycling component infrastructure based on the one or more logical relationships defined by the at least one logical structure.

16. The method of claim 15, wherein the logical abstraction comprises a business process model and notation ("BPMN")-based logical structure.

17. The method of claim 1, wherein the request to perform the function further comprises a request to process one or more workload events, wherein the method further comprises:
when the request to process one or more workload events is received, performing, by a global load balancer of the computing system, a second set of tasks comprising:
selecting and scaling across a second plurality of OOIACP instances for processing the one or more workload events; and
causing the selected second plurality of OOIACP instances to process the one or more workload events, each second OOIACP instance among the second plurality of OOIACP instances instantiating workload resources among a plurality of workload resources to process at least one workload event among the one or more workload events concurrently and independently of other OOIACP instances among the second plurality of OOIACP instances, wherein the second plurality of OOIACP instances is located within the environment in which the plurality of component infrastructure is located, wherein the plurality of workload resources are also located within said environment.

18. A system, comprising:
a computing system, comprising:
an object-oriented infrastructure-as-code platform("OOIACP");
at least one first processor; and
a first non-transitory computer readable medium communicatively coupled to the at least one first processor, the first non-transitory computer readable medium having stored thereon computer software comprising a first set of instructions that, when executed by the at least one first processor, causes the computing system to:
receive, from a requesting device, a request to perform a function, wherein the request to perform the function comprises a request to process one or more lifecycle events; and
when the request to process the one or more lifecycle events is received, perform a first set of tasks comprising:
selecting and scaling across a first plurality of OOIACP instances for processing the one or more lifecycle events; and
causing the selected first plurality of OOIACP instances to process the one or more lifecycle events, each first OOIACP instance among the first plurality of OOIACP instances comprising an infrastructure-as-code ("IAC") command line that instantiates component infrastructure among a plurality of component infrastructure to process at least one lifecycle event among the one or more lifecycle events concurrently and independently of other OOIACP instances among the first plurality of OOIACP instances, wherein the first plurality of OOIACP instances is located within an environment in which the plurality of component infrastructure is located,
wherein the request to perform the function comprises a representational state transfer ("REST") call, the REST call comprising a context_in file containing one or more custom environment variables, wherein the instructions, when executed by the at least one first processor, further causes the computing system to:
receiving, at each first OOIACP instance, the request to perform the function via an Internet of Components ("IoC") factory application programming interface ("API");
storing, using an IoC factory command line interface ("CLI") script at each first OOIACP instance, the context_in file in disk storage;
sourcing, using the IoC factory CLI script, the context_in file within a customized environment within the first OOIACP instance;
running the IoC factory CLI script in the customized environment, based on the context_in file;
retrieving a product suite image from a repository based on the context_in file, the product suite image comprising at least one of a directory of IAC files, a set of resources, a set of modules, or a set of libraries;
executing one or more IAC commands against the product suite image;
generating component infrastructure, using the IAC commands, based on specifications in the product suite image;
logging into the generated component infrastructure; and
for each successive layer of the IoC, retrieving one or more product workloads from the repository based on the context_in file; and performing lifecycling of the generated component infrastructure by running a create, read/retrieve, update, delete, list and batch ("CRUDLB") script on the generated component infrastructure based on the context_in file.

19. A method, comprising:
receiving, with a computing system and from a requesting device, a request to perform a function, wherein the computing system comprises an object-oriented infrastructure-as-code platform ("OOIACP"), wherein the request to perform the function comprises at least one of a request to process one or more lifecycle events or a request to process one or more workload events;
when the request to process one or more lifecycle events is received, performing, by the computing system using at least one of a subject-based multicast ("SBM") system, a distributed business process management system("DBPMS") engine platform, or an artificial intelligence for information technology operations ("AIOps") system, the following:
selecting and scaling across a first plurality of OOIACP instances for processing the one or more lifecycle events; and
causing the selected first plurality of OOIACP instances to process the one or more lifecycle events, each first OOIACP instance among the first plurality of OOIACP instances comprising an infrastructure-as-code ("IAC") command line that instantiates component infrastructure among a plurality of component infrastructure to process at least one lifecycle event among the one or more lifecycle events concurrently and independently of other OOIACP instances among the first plurality of OOIACP instances; and
when the request to process one or more workload events is received, performing, by a global load balancer of the computing system, the following:
selecting and scaling across a second plurality of OOIACP instances for processing the one or more workload events; and
causing the selected second plurality of OOIACP instances to process the one or more workload events, each second OOIACP instance among the second plurality of OOIACP instances instantiating workload resources among a plurality of workload resources to process at least one workload event among the one or more workload events concurrently and independently of other OOIACP instances among the second plurality of OOIACP instances, wherein the first and second plurality of OOIACP instances are located within an environment in which the plurality of component infrastructure and the plurality of workload resources are located,
wherein the request to perform the function comprises a representational state transfer ("REST") call, the REST call comprising a context_in file containing one or more custom environment variables, wherein the method further comprises:
receiving, at each first OOIACP instance, the request to perform the function via an Internet of Components ("IoC") factory application programming interface ("API");
storing, using an IoC factory command line interface ("CLI") script at each first OOIACP instance, the context_in file in disk storage;
sourcing, using the IoC factory CLI script, the context_in file within a customized environment within the first OOIACP instance;
running the IoC factory CLI script in the customized environment, based on the context_in file;

retrieving a product suite image from a repository based on the context_in file, the product suite image comprising at least one of a directory of IAC files, a set of resources, a s et of modules, or a set of libraries;

executing one or more IAC commands against the product suite image;

generating component infrastructure, using the IAC commands, based on specifications in the product suite image;

logging into the generated component infrastructure; and for each successive layer of the IoC, retrieving one or more product workloads from the repository based on the context_in file; and performing lifecycling of the generated component infrastructure by running a create, read/retrieve, update, delete, list and batch ("CRUDLB") script on the generated component infrastructure based on the context_in file.

* * * * *